US011634791B2

(12) United States Patent
Tokuda et al.

(10) Patent No.: US 11,634,791 B2
(45) Date of Patent: Apr. 25, 2023

(54) COATED STEEL PRODUCT

(71) Applicant: NIPPON STEEL CORPORATION, Tokyo (JP)

(72) Inventors: Kohei Tokuda, Tokyo (JP); Mamoru Saito, Tokyo (JP); Jun Maki, Tokyo (JP); Takuya Mitsunobu, Tokyo (JP); Yasuto Goto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/619,268

(22) PCT Filed: Apr. 16, 2020

(86) PCT No.: PCT/JP2020/016794
§ 371 (c)(1),
(2) Date: Dec. 15, 2021

(87) PCT Pub. No.: WO2020/261723
PCT Pub. Date: Dec. 30, 2020

(65) Prior Publication Data
US 2022/0356547 A1    Nov. 10, 2022

(30) Foreign Application Priority Data

Jun. 27, 2019   (JP) .............................. JP2019-119451

(51) Int. Cl.
*B32B 15/01*  (2006.01)
*C22C 18/04*  (2006.01)
(Continued)

(52) U.S. Cl.
CPC ............ *C22C 18/04* (2013.01); *B32B 15/012* (2013.01); *B32B 15/013* (2013.01); *B32B 15/04* (2013.01);
(Continued)

(58) Field of Classification Search
CPC ..... B32B 15/013; B32B 15/012; B32B 15/04; B32B 15/043; B32B 15/18; C22C 38/00;
(Continued)

(56) References Cited

U.S. PATENT DOCUMENTS

2019/0390303 A1    12/2019  Tokuda et al.
2020/0002798 A1*    1/2020  Tokuda ..................... C23C 2/02
2022/0371302 A1*   11/2022  Saito ..................... C23C 28/021

FOREIGN PATENT DOCUMENTS

EP    2135968 A1   12/2009
EP    3575433 A1   12/2019
(Continued)

*Primary Examiner* — Michael E. La Villa
(74) *Attorney, Agent, or Firm* — Solaris Intellectual Property Group, PLLC

(57) ABSTRACT

A hot-dip coated steel product including: a steel product; and a coating layer including a Zn—Al—Mg alloy layer disposed on a surface of the steel product, in which the Zn—Al—Mg alloy layer includes a Zn phase, an Al phase, and a MgZn$_2$ phase, and contains a Mg—Sn intermetallic compound phase in the Zn phase, and the coating layer has a chemical composition satisfying a predetermined average composition, a total area proportion of the Al phase and the MgZn$_2$ phase is 70% or more, an area proportion of the Zn phase is 30% or less, an average value of cumulative circumferential lengths of the Al phase is less than 88 mm/mm$^2$, and a total frequency in number of the Al phase having a circumferential length of 50 μm or more is less than 100.

4 Claims, 6 Drawing Sheets

(51) Int. Cl.
*C23C 2/06* (2006.01)
*C23C 2/40* (2006.01)
*C22C 38/00* (2006.01)
*C23C 2/26* (2006.01)
*C23C 2/28* (2006.01)
*C22C 30/06* (2006.01)
*C22C 18/00* (2006.01)
*C23C 30/00* (2006.01)
*B32B 15/04* (2006.01)
*B32B 15/18* (2006.01)
*C23C 28/02* (2006.01)
*C23C 2/02* (2006.01)

(52) U.S. Cl.
CPC ............ *B32B 15/043* (2013.01); *B32B 15/18* (2013.01); *C22C 18/00* (2013.01); *C22C 30/06* (2013.01); *C22C 38/00* (2013.01); *C23C 2/06* (2013.01); *C23C 2/26* (2013.01); *C23C 2/28* (2013.01); *C23C 2/40* (2013.01); *C23C 28/025* (2013.01); *C23C 30/00* (2013.01); *C23C 30/005* (2013.01); *C23C 2/022* (2022.08); *C23C 2/024* (2022.08); *Y10T 428/12757* (2015.01); *Y10T 428/12799* (2015.01); *Y10T 428/12951* (2015.01); *Y10T 428/12972* (2015.01); *Y10T 428/12979* (2015.01)

(58) Field of Classification Search
CPC ......... C22C 30/06; C22C 18/04; C22C 18/00; C23C 2/06; C23C 2/26; C23C 2/28; C23C 2/40; C23C 2/022; C23C 2/024; C23C 28/025; C23C 30/00; C23C 30/005; Y10T 428/12757; Y10T 428/12799; Y10T 428/12972; Y10T 428/12979; Y10T 428/12951
See application file for complete search history.

(56) References Cited

FOREIGN PATENT DOCUMENTS

| | | |
|---|---|---|
| JP | 2001-207249 A | 7/2001 |
| WO | 2018/139619 A1 | 8/2018 |

* cited by examiner $L_{surface} = L_1 + L_2 + L_3 + L_4$ $L_{medium} = L_5 + L_6 + L_7 + L_8$ $L_{boarder} = L_9 + L_{10}$

COATED STEEL PRODUCT

TECHNICAL FIELD

The present disclosure relates to a coated steel product.

BACKGROUND ART

In recent years, there is a need for using various base steel products (steel products to be coated) as coated steel products. For example, an assumed case is that a steel product containing a large amount of alloy elements in a base metal and having various surface properties (a high-tensile steel product, a thick plate product (such as a hot-rolled steel sheet product), or the like)) is used as a base steel product.

However, the long-term object in the hot-dip coated steel product is to always provide coated steel sheets having the identical appearance without depending on the properties of the base metal.

In a case in which a surface state of a steel product changes, non-coating tends to occur on the surface of the coating layer, solidification segregation tends to occur at a specific place, which easily cause appearance defects (e.g., appearance defects such as a patchy pattern and a streak pattern).

Particularly, in a multi-element type coated steel product (a coated steel product containing three or more elements in a coating layer) in which the solidification phenomenon of the coating layer is complicated, such appearance defects more frequently occur as compared with a Zn coated steel product and a binary coated steel product. Therefore, the control of the appearance of the multi-element type coated steel product is an important item.

As an appearance control method, there is a method of pre-treating a base steel product in order to impart a uniform appearance to a coated steel product, such as a pre-treating method of grinding or pickling a base metal. In addition, in the coating treatment, there is also a method of imparting a uniform appearance to a coated steel product by controlling cooling conditions or adding small amounts of alloy element components.

Particularly, in order to impart a uniform appearance to a coated steel product, a method of forming spangles is often performed. In order to impart a specific appearance to the coated steel product, a technique of forming spangles on an Al—Zn-based coated steel sheet is actually used.

A Galvalume steel products that are widely spread in the market are Al—Zn-based coated steel products, and has a uniform appearance due to spangle formation, which lead to an effect of concealing defects and the like generated on the surface of the coating layer during production and controlled transportation.

In the Al—Zn-based coated steel product, a spangle is first formed when an Al phase is coarsely grown in a coating layer in a state where the Al concentration is sufficiently high.

In addition to the galvalume steel products, even in the case of a Zn-coated steel products (a dipped Zn coated steel product, a Zn-coated steel product for duct, or the like), the spangle formation may be performed.

In the Zn-based coated steel product, a spangle is first formed when the Zn phase is coarsely grown in the coating layer in a state where the Zn concentration is sufficiently high.

For example, Patent Literature 1 or the like discloses a technique for forming spangles on a coated steel product by growing a single phase of pure metal such as an Al phase or a Zn phase.

CITATION LIST

Patent Literature

Patent Literature 1: Japanese Patent Application Laid-Open (JP-A) No. 2001-207249

SUMMARY OF INVENTION

Technical Problem

However, in general, in the case of a coated steel product that is a multi-element type containing a large number of elements and has a coating layer having a low Al concentration (an Al amount of less than 35.0% by mass) in which the Al phase cannot occupy a sufficient volume in the coating layer, it is difficult to form spangles on the surface of the coating layer. Even in a case in which spangles can be formed, an effect of concealing appearance defects is low.

Therefore, an object of the present disclosure is to provide a coated steel product in which spangles are formed and appearance defects are effectively concealed by the spangles, even though the coated steel product has a coating layer which is a multi-element type containing at least Zn, Al, and Mg and has an Al concentration of less than 35.0% by mass.

Solution to Problem

Specific means for solving the problem includes the following aspects.

(1) A hot-dip coated steel product including: a steel product; and a coating layer including a Zn—Al—Mg alloy layer disposed on a surface of the steel product, in which the Zn—Al—Mg alloy layer includes a Zn phase, an Al phase, and a $MgZn_2$ phase, and contains a Mg—Sn intermetallic compound phase in the Zn phase, and the coating layer consists of, in terms of an average composition and % by mass:

Zn: 45.00% or more;
Al: more than 5.0% and less than 35.0%;
Mg: more than 3.0% and less than 15.0%;
Sn: from 0.01% to less than 5.00%;
Bi: from 0% to less than 1.0%;
In: from 0% to less than 0.5%;
Ca: from 0% to less than 3.00%;
Y: from 0% to less than 0.5%;
La: from 0% to less than 0.5%;
Ce: from 0% to less than 0.5%;
Si: from 0% to less than 2.5%;
Cr: from 0% to less than 0.25%;
Ti: from 0% to less than 0.25%;
Ni: from 0% to less than 0.25%;
Co: from 0% to less than 0.25%;
V: from 0% to less than 0.25%;
Nb: from 0% to less than 0.25%;
Cu: from 0% to less than 0.25%;
Mn: from 0% to less than 0.25%;
Fe: from 0% to 5.0%;
Sr: from 0% to less than 0.5%;
Sb: from 0% to less than 0.5%;
Pb: from 0% to less than 0.5%;

B: from 0% to less than 0.5%; and
impurities, and
in which the coating layer has a chemical composition that satisfies the following Formulae 1 to 5:

$$Bi+In<Sn; \quad \text{Formula 1:}$$

$$Y+La+Ce<Ca; \quad \text{Formula 2:}$$

$$0 \leq Cr+Ti+Ni+Co+V+Nb+Cu+Mn<0.25; \quad \text{Formula 3:}$$

$$0 \leq Sr+Sb+Pb+B<0.5; \text{ and} \quad \text{Formula 4:}$$

$$0.0034 \times (Al)^2 + 0.0964 \times (Al) + 2.4323 \leq (Mg) \leq -0.0062 \times (Al)^2 + 0.65 \times (Al) - 0.0937, \quad \text{Formula 5:}$$

wherein, in Formulae 1 to 5, each element symbol represents a content of each element in terms of % by mass,
wherein, in a backscattered electron image of the Zn—Al—Mg alloy layer obtained in a case in which a field of view of 1000 μm×700 μm is observed with a scanning electron microscope at a magnification of 500 times after a surface of the Zn—Al—Mg alloy layer is polished to an extent of one-half of a layer thickness, a total area proportion of the Al phase and the $MgZn_2$ phase is 70% or more, and an area proportion of the Zn phase is 30% or less, and
wherein, in a backscattered electron image of the Zn—Al—Mg alloy layer obtained in a case in which a field of view of 1000 μm×700 μm is observed with the scanning electron microscope at a magnification of 500 times after a surface of the Zn—Al—Mg alloy layer is polished to an extent of one-half of a layer thickness, an average value of cumulative circumferential lengths of the Al phase is less than 88 mm/mm² and a total frequency in number of the Al phase having a circumferential length of 50 μm or more is less than 100.

(2) The coated steel product according to (1), in which, in a backscattered electron image of the coating layer obtained by observing a cross-section of the coating layer, the cross-section being cut in a thickness direction, at a field of view of 250 μm×700 μm and a magnification of 500 times with the scanning electron microscope, a proportion of lengths occupied by the Al phase and the $MgZn_2$ phase at a surface side of the Zn—Al—Mg alloy layer ($L_{surface}$), a proportion of lengths occupied by the Al phase and the $MgZn_2$ phase at a thickness center of the Zn—Al—Mg alloy layer ($L_{medium}$), and a proportion of lengths occupied by the Al phase and the $MgZn_2$ phase at a steel product side of the Zn—Al—Mg alloy layer ($L_{boarder}$) satisfy the following Formulae 6 and 7:

$$0.90 \leq (L_{surface})/(L_{boarder}); \text{ and} \quad \text{Formula 6:}$$

$$(L_{medium})/(L_{boarder}) \leq 1.10. \quad \text{Formula 7:}$$

(3) The coated steel product according to (1) or (2), wherein the coating layer has a Mg concentration of 5% or more, in terms of an average composition and % by mass, and satisfies the following Formulae 8 to 11:

$$0.01 \leq Sn<0.25; \quad \text{Formula 8:}$$

$$0.05<Ca<0.5; \quad \text{Formula 9:}$$

$$Sn+0.02 \leq Ca \text{ in a case in which } 0.01 \leq Sn \leq 0.05; \text{ and} \quad \text{Formula 10:}$$

$$Sn<Ca \text{ in a case in which } 0.05<Sn<0.25; \quad \text{Formula 11:}$$

wherein, in Formulae 8 to 11, each element symbol represents a content of each element in terms of % by mass.

Advantageous Effects of Invention

According to the disclosure, it is possible to provide a coated steel product in which spangles are formed and appearance defects are effectively concealed by the spangles, even though the coated steel product has a coating layer which is a multi-element type containing at least Zn, Al, and Mg and has an Al concentration of less than 35.0% by mass.

DESCRIPTION OF EMBODIMENTS

Figure 1:
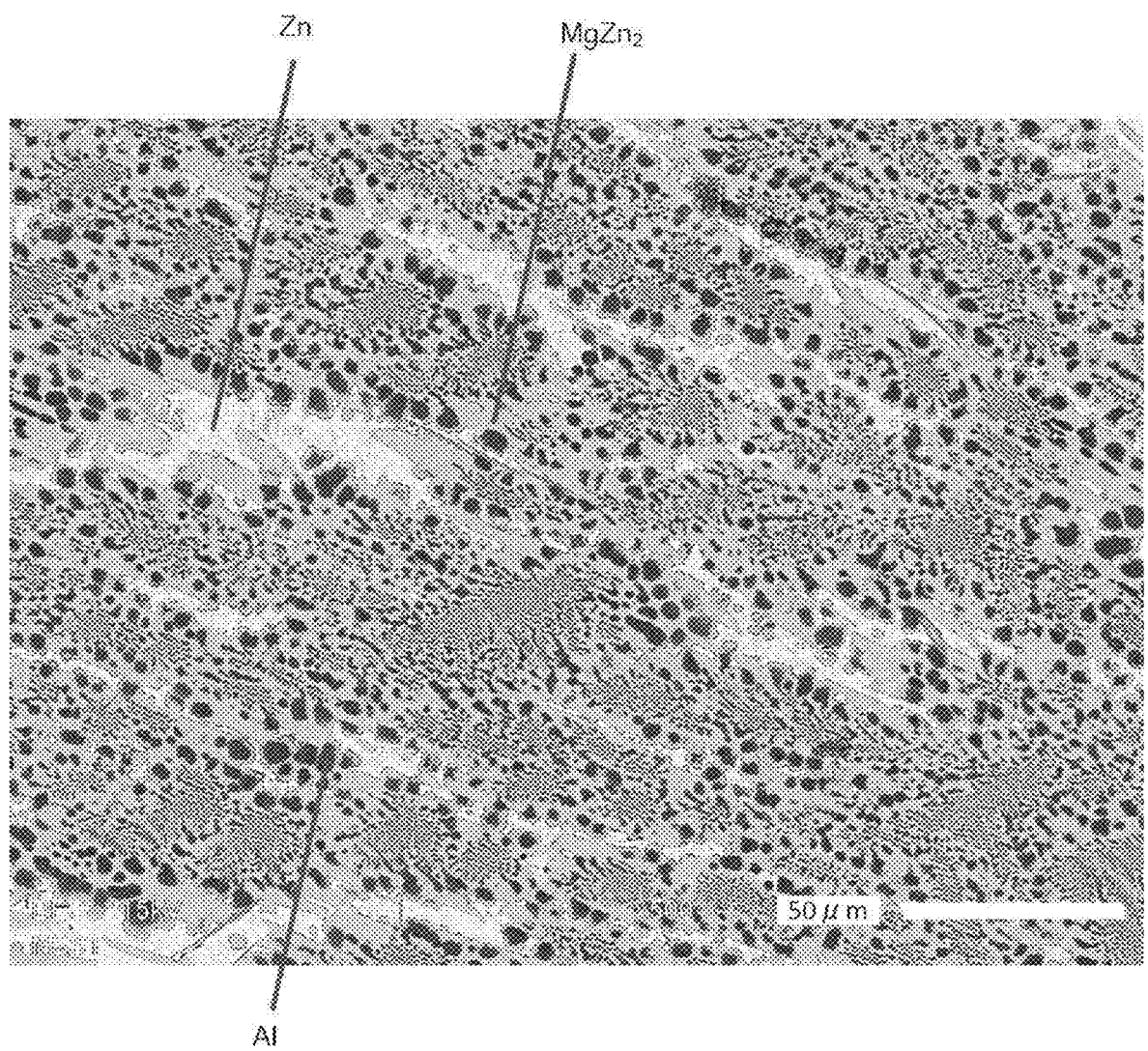
FIG. 1 is an SEM backscattered electron image (magnification: 500 times) showing one example of a surface of a Zn—Al—Mg alloy layer of a coated steel product of the disclosure (a surface of a layer on which spangles are formed).

Hereinafter, one example of the disclosure will be described.

In the present specification, the "%" indication of the content of each element of a chemical composition means "% by mass".

A numerical range expressed using "to" means a range that includes the numerical values before and after "to" as the lower limit and the upper limit.

A numerical range when the numerical value described before or after "to" is added with "over" or "less than" means a range which does not include the numerical value as the lower limit or the upper limit.

The content of an element of a chemical composition may be expressed as the element concentration (e.g., Zn concentration or Mg concentration).

The term "step" refers not only to an independent step but also to a step that is not clearly distinguished from other steps as long as the intended purpose of the step is achieved.

The "X % or X+element symbol (e.g., 19% Al or 19 Al)" indicates that the target element concentration is X % (e.g., the Al concentration is 19%). Note that the Zn concentration indicated with "X % or X+element symbol" is the balance concentration. For example, the "Zn-10Al-5.1Mg-0.1Ca" indication or the "Zn-10% Al-5.1% Mg-0.1% Ca" indication means that the Al concentration is 10%, the Mg concentration is 5.1%, the Ca concentration is 0.1%, and the Zn concentration is the balance.

The term "cross-section of a layer" refers to a cross-section obtained by cutting the layer along the thickness direction.

The term "surface of a layer" refers to a surface facing the outer side of a steel sheet, the surface facing the thickness direction of the layer.

The term "spangle" is a pattern which has a certain level of metallic luster and in which a geometric pattern formed by a visually recognizable metal solidification reaction is iteratively repeated.

The coated steel product of the disclosure is a hot-dip coated steel product including: a steel product; and a coating layer including a Zn—Al—Mg alloy layer disposed on a surface of the steel product, in which the Zn—Al—Mg alloy layer includes a Zn phase, an Al phase, and a $MgZn_2$ phase, and contains a Mg—Sn intermetallic compound phase in the Zn phase.

Further, the coated steel product of the disclosure has a predetermined average composition and a chemical composition satisfying Formulae 1 to 5, which will be described later, whereby even in a case in which the coated steel product of the disclosure has a coating layer which is a multi-element type containing at least Zn, Al, and Mg and has an Al concentration of less than 35.0% by mass, it is possible to obtain a coated steel product in which spangles are formed and appearance defects are effectively concealed by the spangles.

Here, the coated steel product of the disclosure has been found by the following findings.

First, a Zn—Al—Mg-based coated steel product has been mainly used for current Zn-based coating that is highly resistant to corrosion. However, in order to control the spangle appearance, it is necessary to consider the action of Mg, rather than an Al—Zn-based coated steel product (a spangle produced by the growth of an Al phase) typified by a conventional galvalume steel product. Therefore, a technique for forming spangles to make the spangle appearance uniform has not been found.

With the expanded production of the Zn—Al—Mg-based coated steel product, various steel types have been used as coating base materials. However, when an element other than Fe is contained in steel as a coating base material, an unexpected appearance change may occur on the coating surface, and appearance defects may be caused. Particularly, partial spots and defects are conspicuous in the coating surface with luster equivalent to metal specular surface luster. In the spangle pattern represented by galvalume, fine spots, defects, and the like are less noticeable than metallic luster.

In the Zn—Al—Mg-based coated steel product, a technique for forming spangles is established, so that it is possible to provide a Zn—Al—Mg-based coated steel product in which the uniformity of the appearance is secured without depending on the components of the base metal. Thus, a wide variety of steel is applicable, and the application of the Zn—Al—Mg-based coated steel product can be expanded.

As a result of examination by the inventors, the following findings have been obtained.

The spangle formed region is confirmed by producing a Zn—Al—Mg-based coated steel product in which a series of component compositions are changed. In a case in which the composition around the eutectic line in the phase diagram is selected, there is a region of coating chemical composition in which spangles are easily formed.

In a case in which a coated steel product is produced under a predetermined condition with a predetermined chemical composition, it is possible to form uniform fine spangles on a coated steel sheet and produce a Zn—Al—Mg-based coated steel product excellent in uniform appearance at a visually observable level.

In other words, in a case in which a coated steel product is produced under a predetermined condition with a predetermined chemical composition, an "Al—$MgZn_2$ eutectic structure" that plays the same role as an Al phase on the surface of a coating layer is formed in the coating layer at a certain area fraction, and grows toward the coating surface from the interface between the coating layer and the steel product. Consequently, it is possible to form uniform fine spangles on a coated steel sheet, and it is possible to produce a Zn—Al—Mg-based coated steel product excellent in uniform appearance at a visually observable level.

A specific example thereof will be described below.

For example, in a case in which a Zn—Al—Mg-based coated steel product (composition of coating layer: Zn-10%, 15%, 20% or 25%, Al-x % Mg-0, 1% or 1.5% Sn—) is produced by changing the Mg concentration of the coating layer, there is a region where a um-sized fine spangle (i.e., a fine spangle different from a spangle to be formed with a mm-size, such as an Al—Zn-based coated steel product) is formed on the appearance, particularly depending on the Mg concentration.

As a result obtained by changing the Al concentration and the Mg concentration and confirming them, the region formed by fine spangles is formed in a composition region close to the liquid phase eutectic line in the Zn—Al—Mg phase diagram.

In the range in which the Mg concentration and the Al concentration are not appropriate, the solidification reaction of the coating layer does not occur on the eutectic line of the Al phase-$MgZn_2$ phase, so no spangle is formed.

Further, the inventors have studied in detail the structure of the coating layer in which spangles are formed. Thus, the following findings have been obtained.

Figure 2:
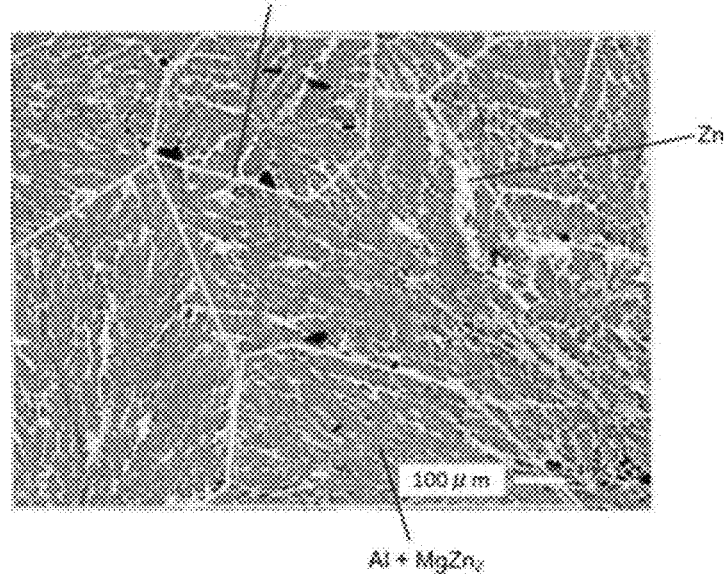
FIG. 2 is an SEM backscattered electron image (magnification: 100 times) showing one example of a surface of a Zn—Al—Mg alloy layer of a coated steel product of the disclosure (a surface of a layer on which spangles are formed).

First, when the surface of the coating layer is observed, in the "surface of the coating layer" in which spangles are formed, all of the Al phase-$MgZn_2$ phase form a feathery structure, and a petal-like (spangle) Al—$MgZn_2$ phase having a um size is formed on the surface (see FIG. 1 and FIG. 2).

Figure 4:
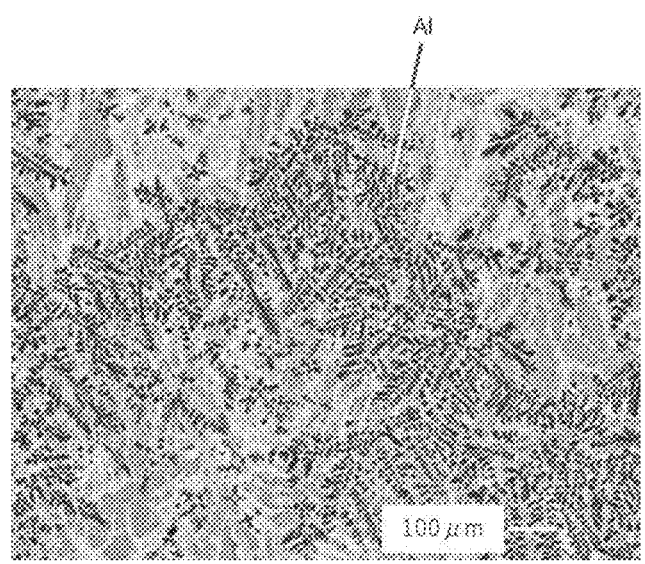
FIG. 4 is an SEM backscattered electron image (magnification: 500 times) showing one example of a surface of a Zn—Al—Mg alloy layer of a conventional coated steel product (a surface of a layer on which no spangle is formed).

In the "surface of the coating layer" in which no spangle is formed, a coarse dendritic Al phase is present (see FIG. 4), whereas in the "surface of the coating layer" in which spangles are formed, no coarse dendritic Al phase is present, and the entire surface includes fine Al phase-$MgZn_2$ phase and a Zn phase (see FIG. 1 and FIG. 2).

As described above, there is a clear difference between the Al phase-$MgZn_2$ phase and the existing products in terms of all the Al phases having a fine size and the proportion of the areas of the Al phase-$MgZn_2$ phase (feathery structure) present on the surface of the coating layer.

From these findings, it has been found that, in the coated steel product of the disclosure, the structure of the coating layer needs to have, for example, the following aspects.

—Aspect of Structure (1)—

In a backscattered electron image of a Zn—Al—Mg alloy layer obtained in a case in which a field of view of 1000 µm×700 µm is observed with a scanning electron microscope at a magnification of 500 times after the surface of the Zn—Al—Mg alloy layer is polished to an extent of one-half of the layer thickness, the total area proportion of an Al phase and a MgZn$_2$ phase is 70% or more, and the area proportion of a Zn phase is 30% or less.

—Aspect of Structure (2)—

In a backscattered electron image of a Zn—Al—Mg alloy layer obtained in a case in which a field of view of 1000 μm×700 μm is observed with a scanning electron microscope at a magnification of 500 times after the surface of the Zn—Al—Mg alloy layer is polished to an extent of one-half of the layer thickness, an average value of cumulative circumferential lengths of the Al phase is less than 88 mm/mm$^2$ and the total frequency in number of the Al phase having a circumferential length of 50 μm or more is less than 100.

As described above, it has been found that even in a case in which the coated steel product of the disclosure has a coating layer which is a multi-element type containing at least Zn, Al, and Mg and has an Al concentration of less than 35.0% by mass, it is possible to obtain a coated steel product in which spangles are formed and appearance defects are effectively concealed by the spangles.

In the coated steel product in which spangles are formed, an aesthetic appearance is imparted to the appearance of the surface of the coating layer, and a significant appearance defect is suppressed.

Figure 3:
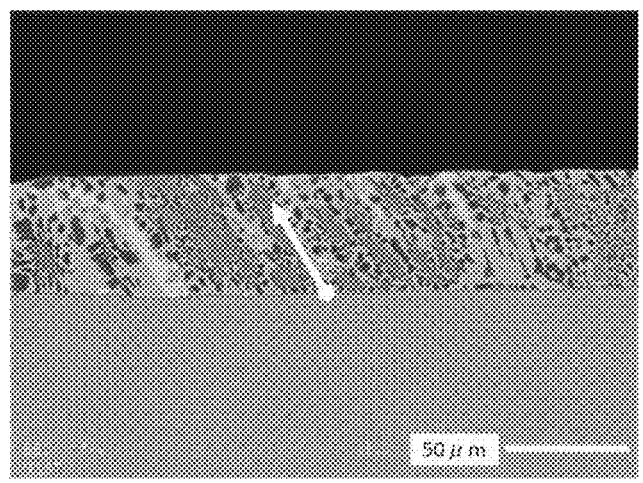
FIG. 3 is an SEM backscattered electron image (magnification: 500 times) showing one example of a cross-section of the Zn—Al—Mg alloy layer of the coated steel product of the disclosure (a cross-section of a layer on which spangles are formed).

Further, when the cross-section of the coating layer is observed, in the "cross-section of the coating layer" in which spangles are formed, the formation of the Al phase-MgZn$_2$ phase starting from the interface between the steel product of the base metal and the coating layer as well as the penetrating growth from the interface to the surface are confirmed (see the arrow in FIG. 3).

Figure 5:
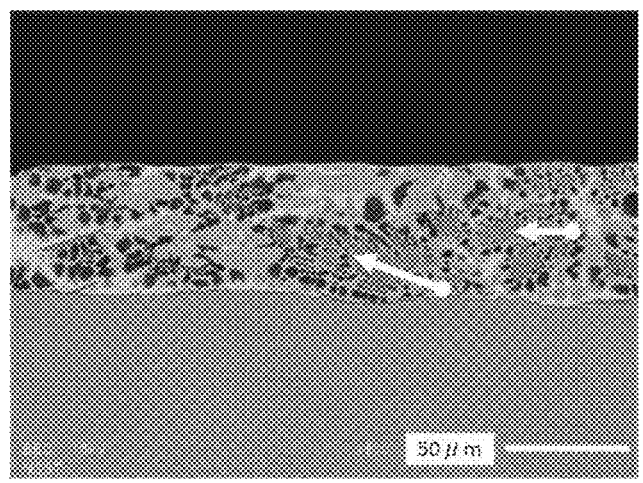
FIG. 5 is an SEM backscattered electron image (magnification: 500 times) showing one example of a cross-section of the Zn—Al—Mg alloy layer of the conventional coated steel product (a cross-section of a layer on which no spangle is formed).

In the "cross-section of the coating layer" in which no spangle is formed, it is confirmed that the Al phase-MgZn$_2$ phase are grown in random directions (see the arrows in FIG. 5).

As described above, there is a clear difference in form between the Al phase-MgZn$_2$ phase and the existing products.

—Aspect of Structure (3)—

The Zn—Al—Mg alloy layer includes an Al phase, a MgZn$_2$ phase, and a Zn phase. In a backscattered electron image of the coating layer obtained by observing a cross-section of the coating layer, the cross-section being cut in a thickness direction, at a field of view of 250 μm×700 μm and a magnification of 500 times with a scanning electron microscope, a proportion of lengths occupied by the Al phase and the MgZn$_2$ phase at a surface side of the Zn—Al—Mg alloy layer ($L_{surface}$), a proportion of lengths occupied by the Al phase and the MgZn$_2$ phase at a thickness center of the Zn—Al—Mg alloy layer ($L_{medium}$), and a proportion of lengths occupied by the Al phase and the MgZn$_2$ phase at a steel product side of the Zn—Al—Mg alloy layer ($L_{boarder}$) satisfy the following Formulae 6 and 7:

$0.9 \leq (L_{surface})/(L_{boarder})$; and   Formula 6:

$(L_{medium})/(L_{boarder}) \leq 1.1$.   Formula 7:

In FIG. 1 to FIG. 5, Zn represents a Zn phase, Al represents an Al phase, and MgZn$_2$ represents a MgZn$_2$ phase.

Hereinafter, details of the coated steel product of the disclosure will be described.

(Steel Product)

A steel product to be coated (also referred to herein as "coating base material") will be described.

Basically, the shape of the steel product is preferably a plate shape. However, the steel product is not particularly limited as long as it is a steel product that can be coated by an oxidation-reduction method as well as a steel wire, a steel rod, and a steel pipe. Examples of the steel product include steel products produced by forming processing, welding or the like, such as steel civil engineering construction materials (such as fence conduits, corrugated pipes, drainage ditch lids, shield for wind-blown sand prevention plates, bolts, wire mesh, guard rails, and water blocking walls), home electric appliance members (such as housings of air conditioner outdoor units), and automobile parts (such as undercarriage members). For example, various plastic forming techniques, such as pressing, roll forming, bending, and pressing can be used for forming processing.

The material of the steel product is not particularly limited. For example, various steel products such as general steel, Ni-pre-coated steel, Al-killed steel, extremely low carbon steel, high carbon steel, various high-tensile steels, and some high alloy steels (such as steel containing a strengthening element such as Ni or Cr) are available.

The steel product is not particularly limited in terms of conditions for the steel product production method, the steel sheet production method, or the like (such as the hot rolling method, acid pickling method, or cold rolling method).

The steel product may be a pre-coated steel product. The pre-coated steel product is obtained by, for example, an electrolytic treatment method or an immersion coating method. In the electrolytic treatment method, a pre-coated steel product is obtained by immersing a pre-coating base material in a sulphate bath or a chloride bath containing metal ions of various pre-coating components and performing an electrolytic treatment. In the immersion coating method, a pre-coated steel product is obtained by immersing a coating base material in an aqueous solution which contains metal ions of various pre-coating components and whose pH is adjusted with sulfuric acid to substitute the metal, and precipitating the metal.

Representative examples of the pre-coated steel product include Ni-pre-coated steels, Fe-pre-coated steels, and Fe—Ni-pre-coated steels.

(Coating Layer)

Next, a coating layer will be described.

The coating layer includes a Zn—Al—Mg alloy layer. The coating layer may include an Al—Fe alloy layer in addition to the Zn—Al—Mg alloy layer. The Al—Fe alloy layer is provided between the steel product and the Zn—Al—Mg alloy layer.

That is, the coating layer may have a single layer structure of a Zn—Al—Mg alloy layer or a layered structure including a Zn—Al—Mg alloy layer and an Al—Fe alloy layer. In the case of the layered structure, the Zn—Al—Mg alloy layer is a layer constituting the surface of the coating layer.

In this regard, although an about 50 nm-thick oxide film of an element constituting the coated metal layer is formed on the surface of the coating layer, the oxide film is thin with respect to the thickness of the entire coating layer and is deemed not to correspond to the coating layer.

Here, the thickness of the Zn—Al—Mg alloy layer is, for example, 2 μm or more and 95 μm or less (preferably 5 μm or more and 75 μm or less).

Meanwhile, the thickness of the entire coating layer is, for example, about 100 μm or less. Since the thickness of the entire coating layer depends on the coating conditions, the upper limit and the lower limit of the thickness of the entire coating layer are not particularly limited. For example, the thickness of the entire coating layer is associated with the viscosity and specific gravity of a coating bath in an ordinary hot-dip coating method. Further, the coating weight is adjusted by a drawing speed of a steel sheet (coating base sheet) and the intensity of wiping. It is therefore considered that the lower limit of the thickness of the entire coating layer is about 2 μm.

Here, due to the weight and uniformity of a coating metal, a coating layer which can be produced by the hot-dip coating method has a thickness of about 95 μm.

The thickness of a coating layer can be freely determined depending on the drawing speed from a coating bath and wiping conditions, indicating that the formation of a coating layer having a thickness of from 2 to 95 μm is not particularly difficult in terms of production.

Next, a chemical composition of a coating layer will be described.

The component composition of a Zn—Al—Mg alloy layer contained in a coating layer is substantially maintained even in a case in which the component composition ratio of the coating bath corresponds to the Zn—Al—Mg alloy layer. In the hot-dip coating method, a reaction for forming an Al—Fe alloy layer is completed in a coating bath. Usually, such an Al—Fe alloy layer formation causes only slight decreases in the Al and Zn components of a Zn—Al—Mg alloy layer.

Even in the case of a coating layer which is a multi-element type containing at least Zn, Al, and Mg and has an Al concentration of less than 35.0% by mass, the chemical composition of the coating layer is as follows: in order to realize the formation of spangles and concealment of appearance defects by the spangles.

That is, the chemical composition of the coating layer includes, in terms of an average composition and % by mass:

Zn: 45.00% or more;
Al: more than 5.0% and less than 35.0%;
Mg: more than 3.0% and less than 15.0%;
Sn: from 0.01% to less than 5.00%;
Bi: from 0% to less than 1.0%;
In: from 0% to less than 0.5%;
Ca: from 0% to less than 3.00%;
Y: from 0% to less than 0.5%;
La: from 0% to less than 0.5%;
Ce: from 0% to less than 0.5%;
Si: from 0% to less than 2.5%;
Cr: from 0% to less than 0.25%;
Ti: from 0% to less than 0.25%;
Ni: from 0% to less than 0.25%;
Co: from 0% to less than 0.25%;
V: from 0% to less than 0.25%;
Nb: from 0% to less than 0.25%;
Cu: from 0% to less than 0.25%;
Mn: from 0% to less than 0.25%;
Fe: from 0% to 5.0%;
Sr: from 0% to less than 0.5%;
Sb: from 0% to less than 0.5%;
Pb: from 0% to less than 0.5%;
B: from 0% to less than 0.5%; and
impurities.

In this regard, the chemical composition of the coating layer satisfies the following Formulae 1 to 5:

$$Bi+In<Sn; \quad \text{Formula 1:}$$

$$Y+La+Ce<Ca; \quad \text{Formula 2:}$$

$$Cr+Ti+Ni+Co+V+Nb+Cu+Mn<0.25; \quad \text{Formula 3:}$$

$$0\leq Sr+Sb+Pb+B<0.5; \text{ and} \quad \text{Formula 4:}$$

$$0.0034\times(Al)^2+0.0964\times(Al)+2.4323\leq(Mg)\leq-0.0062\times(Al)^2+0.65\times(Al)-0.0937; \quad \text{Formula 5:}$$

wherein, in Formulae 1 to 5, each element symbol represents a content of each element in terms of % by mass.

In the chemical composition of the coating layer, Bi, In, Ca, Y, La, Ce, Si, Cr, Ti, Ni, Co, V, Nb, Cu, Mn, Fe, Sr, Sb, Pb, and B are optional components. Namely, the content of these elements is 0%, and these elements need not be contained in the coating layer. In a case in which these optional components are contained, the content of each of the optional elements is preferably in the range described below.

Here, the chemical composition of the coating layer is the average chemical composition of the entire coating layer (in a case in which the coating layer has a single layer structure of a Zn—Al—Mg alloy layer, a case in which the coating layer has the average chemical composition of a Zn—Al—Mg alloy layer and the coating layer has a layered structure of an Al—Fe alloy layer and a Zn—Al—Mg alloy layer, or a case in which the coating layer has the average chemical composition of an Al—Fe alloy layer and a Zn—Al—Mg alloy layer combined together).

Usually, in the hot-dip coating method, the chemical composition of the Zn—Al—Mg alloy layer is substantially the same as the chemical composition of the coating bath because the formation reaction of the coating layer is almost completed in the coating bath in almost every case. In the hot-dip coating method, the Al—Fe alloy layer is instantaneously formed and grown immediately after being immersed in the coating bath. The formation reaction of the Al—Fe alloy layer is completed in the coating bath, and the thickness of the Al—Fe alloy layer is often sufficiently smaller than that of the Zn—Al—Mg alloy layer.

Therefore, unless a special heat treatment such as a heating/alloying treatment is performed after coating, the average chemical composition of the entire coating layer is substantially equal to the chemical composition of the Zn—Al—Mg alloy layer. It is possible to ignore the components of the Al—Fe alloy layer or the like.

Hereinafter, each element of the coating layer will be described.

Zn: 45.00% or More

Zn is an element necessary for achieving sacrificial corrosion protection ability as well as plain surface corrosion resistance. Regarding the Zn concentration in consideration of the atomic composition ratio, as the coating layer is composed together with low-specific gravity elements such as Al and Mg, Zn needs to have the largest proportion in the atomic composition ratio.

In the light of other elements that need to be contained, the coating (Zn-based coating) mainly includes 45.00% or more of Zn.

When the Zn concentration is less than 45.00%, the melting point of the coating bath tends to increase, Fe diffusion from a base metal becomes active, and it tends to be difficult to maintain the appearance of the spangle itself in the first place. Therefore, the Zn concentration is set to 45.00% or more. The Zn concentration is preferably 70.00% or more. The upper limit of the Zn concentration is the concentration of elements other than Zn and balance other than impurities.

Al: More than 5.0% and Less than 35.0%

Al is an element necessary for containing other elements excluding Zn in the coating layer (particularly, a Zn—Al—Mg layer). Originally, other elements are hardly contained in the Zn coating layer (Zn layer), and for example, elements such as Mg, Ca, and Si cannot be added at a high concentration. However, Al is contained in the Zn coating layer (Zn layer), so that it is possible to produce a Zn—Al—Mg alloy layer containing these elements.

Al forms an Al phase that imparts plain surface corrosion resistance and plastic deformability, and also contributes to the formation of an Al—Fe alloy layer. Al is an essential element for ensuring adhesiveness.

When the Al concentration is 5.0% or less, it tends to be difficult for a coating layer to contain alloy elements that impart properties, in addition to Mg and Ca. Further, a low Al density results in the formation of an Al phase in a large phase amount with respect to the mass-based content as compared to Zn.

Since Al forms a core of a spangle as a main constituent phase in the formation of the spangle, the lower limit of the Al concentration is essential. When the Al concentration is 5.0% or less, the Zn—Al—Mg alloy layer tends to mainly consist of a Zn phase. Further, a Zn phase grows as a primary crystal, and thus no spangle is formed by the feathery structure of the Zn—Al—Mg-based coating. Accordingly, even if spangles are formed, the effect of concealing appearance defects by the spangles is low, and the lower limit of the Al concentration is more than 5.0%.

In addition, this may lead to a significant reduction in plain surface corrosion resistance, from the viewpoint of properties. From the viewpoint of corrosion resistance, it is not preferable that a Zn phase becomes the first phase of the Zn—Al—Mg alloy layer. In a case in which a Zn phase becomes the first phase as described later, a Zn—Al—$MgZn_2$ ternary eutectic structure having poor plain surface corrosion resistance and poor formability is likely to be formed, resulting in a tendency to deteriorate the plain surface corrosion resistance and the formability.

In addition, when the Al concentration is 5.0% or less, a $MgZn_2$ phase having poor plastic deformability tends to grow coarsely as a primary crystal in the Zn—Al—Mg alloy layer, and the formability of the coating layer tends to significantly deteriorate.

Therefore, the lower limit of the Al concentration is set to more than 5.0% (preferably 10.0% or more).

The reason why the Al concentration increases is the same reason as the above-described decrease in the Zn concentration, and is that the melting point of the coating bath tends to increase, Fe diffusion from the base metal becomes active, and it tends to be difficult to maintain the appearance of the spangle itself in the first place.

From the viewpoint of properties, the proportion of an Al phase rapidly increases in the Zn—Al—Mg alloy layer, and the proportions of a Zn phase and a $MgZn_2$ phase necessary for imparting sacrificial corrosion protection ability decrease. Consequently, the plain surface corrosion resistance and formability are improved.

However, as a result of an increase in the Al concentration, the resulting configuration is close to a configuration with lack of sacrificial corrosion protection ability. Further, when the Al concentration excessively increases, a wide variety of elements are incorporated into an Al phase as described above, and thus a Zn phase including a Mg—Sn metallic compound phase is not formed. In a case in which a coating layer is formed by the hot-dip coating method, the thickness of an Al—Fe alloy layer tends to increase. As a result, the Al phase contains large amounts of Mg and Zn, resulting in the formation of an Al phase, being very poor in corrosion resistance and plastic deformability. The formation of such an Al phase is not preferable from the viewpoint of ensuring formability.

Therefore, the upper limit of the Al concentration is set to less than 35.0% (preferably 25.0% or less).

Mg: More than 3.0% and Less than 15.0%

Mg is also an essential element for forming spangles. When Mg is added to a coating layer, $MgZn_2$ that is a main component of the spangles, $Mg_2Sn$ that imparts sacrificial corrosion protection ability to Zn—Al—Mg-based coating, and the like are formed. From the viewpoint of properties, Mg is an element necessary for imparting sacrificial corrosion protection ability. The sacrificial corrosion protection ability of the $MgZn_2$ phase is inferior to that of the Mg—Sn metallic compound phase, and the $MgZn_2$ phase is a very fragile intermetallic compound phase. Therefore, the amount of the $MgZn_2$ phase is preferably small from the viewpoint of forming.

When the Mg concentration is 3.0% or less, the amount of the $MgZn_2$ phase for forming spangles is insufficient. Further, even in a case in which spangles are formed, the effect of concealing appearance defects by the spangles is low.

Furthermore, it is impossible to form a sufficient amount of the intermetallic compound phase (the Mg—Sn metallic compound phase and the $MgZn_2$ phase) necessary for imparting plain surface corrosion resistance and sacrificial corrosion prevention. Additionally, since the amount of the Zn phase increases, the Zn phase becomes the first phase (primary crystal precipitation region), and the constituent elements of the spangles change. The proportion of the Zn—Al—$MgZn_2$ ternary eutectic structure increases, which is not preferable from the viewpoints of formability and corrosion resistance.

Therefore, the lower limit of the Mg concentration is set to more than 3.0%.

Considering the formation amount of the Mg—Sn metallic compound phase, it is preferable that the Mg concentration is sufficiently high and Mg is contained at a concentration one-third or more the Sn concentration based on specific gravity calculation. Further, from the viewpoints of plain surface corrosion resistance and sacrificial corrosion protection ability, it is preferable that Mg is contained at a concentration one-third or more the Sn concentration. Therefore, the lower limit of the Mg concentration is preferably more than 5.0%.

In a case in which the Mg concentration is 15.0% or more, the amount of the $MgZn_2$ phase rapidly increases. In this case, even when there is no Al phase as the core of the feathery structure of the spangle, the $MgZn_2$ phase is easily formed as a primary crystal, and the appearance of the spangle itself is impaired.

Further, from the viewpoint of properties, the plastic deformability of the Zn—Al—Mg alloy layer is lost, and the formability is deteriorated.

Therefore, the upper limit of the Mg concentration is set to less than 15.0 (preferably less than 12.5%, and more preferably 10.0% or less).

Sn: From 0.01% to Less than 5.00%, Bi: From 0% to Less than 1.0%, in: From 0% to Less than 0.5%, Provided that Formula 1: Bi+In<Sn Sn is an element which is included in a Zn phase and is necessary for forming a Mg—Sn metallic compound phase that imparts high sacrificial corrosion protection ability. Here, Sn, Bi, and In do not form an intermetallic compound phase together with Al and Zn in a coating bath, and always bind to Mg to form an intermetallic compound phase. Specifically, in a case in which Sn, Bi, and In are separately contained, $Mg_2Sn$, $Mg_9Sn_5$, $Mg_3Bi_2$, and $Mg_3In$ are formed, respectively. When Sn, Bi, and In are contained at 0.01% or more, formation of these intermetallic compound phases is observed.

These elements also play a role in spangle formation. Specifically, in addition to Sn, Bi and In form a compound together with Mg, and when these elements are present as precipitates in the solidification process, a eutectic structure is formed with the Zn phase, the liquid phase becomes stable. It is possible to lower the final solidification temperature as compared with a case in which the final solidification temperature is not close to a range of from 5 to 30° C. This means that the formation of the feathery structure (spangle) mainly including the $MgZn_2$ phase and the Al phase needs longer time, and the feathery structure is easily grown. As a result, a clear spangle appearance is easily obtained. Although the feathery structure is formed even when Sn, Bi, and In are not contained, the spangle appearance is easily obtained in the presence of Sn, Bi, and In in the production method.

Noted that a compound formed of Sn is likely to lower the melting point as compared with Bi and In. These effects are confirmed when Sn is contained at 0.01%. Further, when Sn is contained at 5.00% or more, the $Mg_2Sn$ phase grows coarsely, and these compounds obscure the spangle formation and the appearance is deteriorated.

Furthermore, from the viewpoint of properties, among the intermetallic compound phases, $Mg_2Sn$ is most excellent in consideration of the fact that $Mg_2Sn$ has plain surface corrosion resistance and sacrificial corrosion protection ability, and it is easily incorporated in a Zn phase which is soft enough to be processed and is rich in plastic deformability. $Mg_3Bi_2$ and $Mg_3In$ are slightly inferior to $Mg_2Sn$ in terms of a balance among properties such as plain surface corrosion resistance, sacrificial corrosion protection ability, and formability.

Therefore, for the formation of at least $Mg_2Sn$ as a Mg—Sn metallic compound phase, Sn is an essential element and the lower limit of the Sn concentration is set to 0.01% or more (preferably 0.05% or more, and more preferably 3.00% or more).

Although Bi and In are optional elements, when Bi and In are contained together with Sn, Sn in $Mg_2Sn$ is partially substituted by Bi and In. In other words, a substituted $Mg_2Sn$ phase (a type of Mg—Sn metallic compound phase) in which Sn is partially substituted by at least one of Bi or In is formed. The formation of the substituted $Mg_2Sn$ phase makes it possible to adjust the optimal amount of Mg to be dissolved for imparting plain surface corrosion resistance and sacrificial corrosion protection ability. In order to form the substituted $Mg_2Sn$ phase, Sn, Bi, and In need to be contained under conditions that satisfy Formula 1: Bi+In<Sn. Unless the conditions are satisfied, $Mg_3Bi_2$, $Mg_3In$ or the like is independently formed, resulting in deterioration of plain surface corrosion resistance and formability.

In a case in which Bi and In are contained, the lower limits of the Bi and In concentrations are each preferably 0.01% or more, more preferably 0.05% or more, still more preferably 0.1% or more, and most preferably 0.3% or more.

Large contents of Sn, Bi, and In cause an increase in the rate of Mg dissolved from the Zn—Al—Mg alloy layer, and the plain surface corrosion resistance is deteriorated. Particularly, large contents of Bi and In impair the formability of the coating layer. Therefore, it is preferable that these elements satisfy Sn<5.0%, Bi<1.0% and In<0.5% (preferably, Sn<5.0%, Bi<0.5%, and In<0.3%), respectively.

Ca: From 0% to Less than 3.00%, Y: From 0% to Less than 0.5%, La: From 0% to Less than 0.5%, Ce: From 0% to Less than 0.5%, Provided that Formula 2: Formula 2: Y+La+Ce<Ca When Ca is contained in a coating layer, an Al—Ca(—Si)-based layered compound is formed in the vicinity of the interface with the base metal. The compound has a high melting point and is first precipitated in the coating solidification process.

When the layer is formed at the interface between the coating layer and the base metal, Fe diffusion from the base metal into the coating layer in a molten state in the solidification process is suppressed, and the contamination of Fe in the components of the coating layer is less likely to occur. Further, there is an effect of canceling information on roughness such as unevenness of the surface of the base metal and the formation state of the oxidation film. As a result, the spangle formation is less likely to be affected by the base metal, and thus Ca is preferably contained.

It has been confirmed that the layered compound is formed on the interface with the base metal when Ca is contained at a concentration of 0.05%.

In a case in which the Ca concentration is 3.00% or more, a needle-like Al—Ca(—Si)-based compound that differs from an Al—Ca(—Si)-based layered compound is formed in a large amount, resulting in unclear spangles. Therefore, the Ca concentration is preferably set to less than 3.00%.

These similar effects are also confirmed for Y, La, and Ce. The concentrations of Y, La, and Ce are from 0 to less than 0.5%, and preferably from 0.05 to less than 0.5%.

From the viewpoint of properties, Mg in $Mg_2Sn$ is partially substituted by Ca, Y, La, and Ce. In other words, a substituted $Mg_2Sn$ phase (a type of Mg—Sn metallic compound phase) in which Mg is partially substituted by at least one of Ca, Y, La, or Ce is formed. The formation of the substituted $Mg_2Sn$ phase also makes it possible to adjust the optimal amount of Mg to be dissolved for imparting plain surface corrosion resistance and sacrificial corrosion protection ability.

In order to form this substituted $Mg_2Sn$ phase, it is preferable that the lower limit of the Ca concentration is 0.05% or more, the lower limit of the Y concentration is 0.1% or more, and the lower limit of each of La and Ce is 0.1% or more.

The Ca content can be up to less than 3.00%, each of the Y, La, and Ce contents can be up to less than 0.5% (preferably the Ca content can be up to 1.00% or less, and each of the Y, La, and Ce contents can be up to 0.3% or less). When the concentrations of Ca, Y, La, and Ce exceed these ranges, each of the Ca, Y, La, and Ce elements tends to form an intermetallic compound phase mainly composed thereof, resulting in deterioration of corrosion resistance and formability. Further, it is necessary to satisfy Formula 2: Y+La+Ce<Ca from the relationship of substitution positions in the Mg—Sn metallic compound phase. In a case in which the conditions are not met, each of the Y, La, and Ce elements forms the intermetallic compound phase mainly composed thereof, and plain surface corrosion resistance extremely deteriorates.

The effect of substitution causes $Mg_2Sn$ to undergo a structural change, resulting in excellent long-term sacrificial corrosion protection ability. Although it is difficult to make a clear distinction between substituted $Mg_2Sn$ phases (substituted $Mg_2Sn$ phases including a substitution with at least one of Bi, In, Ca, Y, La, or Ce), it is thought that the rate of Mg dissolved from a $Mg_2Sn$ phase can be appropriately controlled by substitution with any of the elements. Further, it is thought that the substitution with any of the elements causes a $Mg_2Sn$ phase to be changed to have a $Mg_9Sn_5$ structure. Bi, In, Ca, Y, La, or Ce (particularly Ca) is contained, which causes a substituted $Mg_2Sn$ phase to be simply formed, and also causes a $Mg_2Sn$ phase to have a change in its crystal form, thereby facilitating the formation of a $Mg_9Sn_5$ phase.

As described above, in a case in which a coating layer is designed so as to exert high sacrificial corrosion protection ability over a long period of time, it is preferable to allow the coating layer to contain these elements.

Si: From 0% to Less than 2.5%

When Si is also contained, a compound associated with the formation of an Al—Fe alloy layer (interface alloy layer) is formed. Al and Ca are combined to form an Al—Ca—Si compound. When Si is contained, the Al—Ca—Si compound is easily formed into a layer.

Even when Ca is not contained, there is a tendency that an Al—Fe—Si layer is formed near the interface and the diffusion of Fe is suppressed. The effect is confirmed when the Si concentration is 0.05% or more. When the Si concentration is 2.5% or more, Si binds to Mg to form a Mg—Si-based compound, which suppresses the spangle formation. Therefore, the appropriate Si concentration is preferably from 0.05 to less than 2.5%.

From the viewpoint of properties, Si is an element having a small atomic size, and a small amount of Si forms an interstitial solid solution in a Mg—Sn intermetallic compound phase. Therefore, Si does not serve as a substitutional-type element in a Mg—Sn intermetallic compound phase, as compared with atoms such as Ca, Y, La, Ce, Bi, and In, but forms an interstitial solid solution. This causes some changes in the crystal structure of the Mg—Sn metallic compound phase (e.g., a $Mg_2Sn$, MgCaSn phase, or $Mg_9Sn_5$ phase) while details are unconfirmed. Although slight changes in the crystal structure cannot be captured by XRD, TEM, or the like, it is often confirmed by EPMA that Si contained in a small amount is identified in the same position as the Mg—Sn metallic compound phase.

In general, it is known that a small amount of Si has an effect of suppressing the growth of an Al—Fe alloy layer, and also has a confirmed effect of improving corrosion resistance. Further, Si forms an interstitial solid solution in an Al—Fe alloy layer. The detailed description of the formation of an Al—Fe—Si intermetallic compound phase or the like in an Al Fe alloy layer will be described later.

Si also forms an interstitial solid solution in a Ca—Zn—Al intermetallic compound phase. The solid solution effect of Si in a Ca—Zn—Al intermetallic compound phase has not been confirmed. The amount of a Ca—Zn—Al intermetallic compound phase containing Si tends to relatively decrease in a Zn—Al—Mg alloy layer. In order to form a Zn—Al—Mg alloy layer taking advantage of the features of the Ca—Zn—Al intermetallic compound phase, it is preferable that the Si concentration is reduced.

Excess Si causes the solid solution structure of a Mg—Sn metallic compound phase to collapse, resulting in the formation of an intermetallic compound phase such as a $Mg_2Si$ phase in a Zn—Al—Mg alloy layer. Further, in a case in which at least one of Ca, Y, La, or Ce is contained, an intermetallic compound phase such as a $Ca_2Si$ or $Mg_2Si$ phase is formed.

In addition, Si forms a strong Si-containing oxide film on the surface of a Zn—Al—Mg alloy layer. This Si-containing oxide film has a structure in which the Zn—Al—Mg alloy layer is less likely to be dissolved, resulting in reduction of sacrificial corrosion protection ability. In particular, reduction of sacrificial corrosion protection ability at the initial stage of corrosion before the collapse of a Si-containing oxide film barrier gives a significant impact.

Therefore, the Si concentration is less than 2.5%. The Si concentration is preferably less than 0.5% and more preferably less than 0.3% from the viewpoints of plain surface corrosion resistance and sacrificial corrosion protection ability.

Here, Si forms a solid solution in a Mg—Sn metallic compound phase, which is an interstitial solid solution in a Mg—Sn metallic compound phase. Therefore, when Si is solid-solved in a Mg—Sn intermetallic compound phase, the crystal structure of the Mg—Sn metallic compound phase is distorted, which allows detection by XRD or the like. For this purpose, it is preferable that Si is contained in the coating layer at a concentration of 0.05% or more. When the Si concentration is 0.05% or more, Si contained in the Mg—Sn metallic compound phase becomes saturated. Even when Si is contained in a Mg—Sn intermetallic compound phase, sacrificial corrosion protection ability is ensured in long-term corrosion. Particularly, it tends to be preferable that Si is contained in a Mg—Sn metallic compound phase in terms of corrosion resistance in a processed portion. Similarly, it tends to be preferable in terms of sacrificial corrosion protection ability (particularly corrosion resistance for cut end surface).

Cr: From 0% to Less than 0.25%, Ti: From 0% to Less than 0.25%, Ni: From 0% to Less than 0.25%, Co: From 0% to Less than 0.25%, V: From 0% to Less than 0.25%, Nb: From 0% to Less than 0.25%, Cu: From 0% to Less than 0.25%, Mn: From 0% to Less than 0.25%, Provided that Formula 3: $0 \leq Cr+Ti+Ni+Co+V+Nb+Cu+Mn<0.25$ Although small amounts of Cr, Ti, Ni, Co, V, Nb, Cu, and Mn are not confirmed to have a clear effect on the spangle formation, these elements can be contained in a coating layer at low concentrations. It is assumed that large contents of these elements cause the formation of an intermetallic compound and adversely affect spangles, and a suitable concentration range of the elements is from 0 to 0.25%.

From the viewpoint of properties, Sn in $Mg_2Sn$ is partially substituted by small amounts of Cr, Ti, Ni, Co, V, Nb, Cu, and Mn. In other words, a substituted $Mg_2Sn$ phase (a type of Mg—Sn intermetallic compound phase) in which Sn is partially substituted by at least one of Cr, Ti, Ni, Co, V, Nb, Cu, or Mn is formed. The concentration of any of these element concentrations needs to be lower than the Sn concentration. It is difficult to confirm an obvious change in sacrificial corrosion protection ability, which is observed in, for example, a substituted $Mg_2Sn$ phase (a type of Mg—Sn metallic compound phase) including a substitution of Sn by Ca, Y, La, Ce, Bi, or In. However, Sn substituted as above further binds to another Mg to form a Mg—Sn metallic compound phase, and this allows the total amount of Mg—Sn metallic compound phase to increase. Besides, as it is possible to increase Mg to be consumed for the formation of a Mg—Sn metallic compound phase, the sacrificial corrosion protection effect is slightly increased, and the corrosion potential tends to shift to a relatively lower side.

Note that the amount of Sn that can be substituted is limited. In a case in which the concentration of any of the elements becomes 0.25% or more or the total concentration thereof does not satisfy $Cr+Ti+Ni+Co+V+Nb+Cu+Mn<0.25$, an intermetallic compound phase mainly composed of the elements contained is formed rather than a Mg—Sn metallic compound phase. This makes it impossible to ensure the sufficient formation of a Mg—Sn intermetallic compound phase. For example, an intermetallic compound phase containing only one Mg element, such as a MgCu$_2$ phase, is formed, resulting in reduction of sacrificial corrosion protection ability. In addition, a coupling reaction proceeds, and corrosion resistance is extremely deteriorated. The formability also becomes poor.

Therefore, the concentrations of Cr, Ti, Ni, Co, V, Nb, Cu, and Mn are set to less than 0.25% such that Formula 3: 0≤Cr+Ti+Ni+Co+V+Nb+Cu+Mn<0.25 is satisfied.

Fe: From 0% to 5.0%

In a case in which a coating layer is formed by the hot-dip coating method, a certain Fe concentration is contained in the Zn—Al—Mg alloy layer and the Al—Fe alloy layer.

It has been confirmed that Fe contained in a coating layer (particularly a Zn—Al—Mg alloy layer) at a concentration of up to 5.0% does not adversely affect the properties. In many cases, since Fe is mainly contained in an Al—Fe alloy layer, the Fe concentration usually increases as the thickness of this layer increases.

The Fe concentration largely depends on the thickness of the coating layer formed on the surface of a steel product. That is, when the thickness of the coating layer is small, a Fe portion that has reacted with the base metal relatively increases in the coating layer, and thus the Fe portion reaches 0.1% and may reach around 5.0% near the interface. A coating layer having a thickness of less than 10 μm may contain around 1% of Fe. In a coating layer having a thickness of 10 μm or more, an influence of a reactive layer between a base metal and the coating layer decreases, an influence of a coating bath component increases, and the concentration of Fe as a whole decreases. Usually, the concentration of Fe is less than 1%, and the concentration of Fe in a coating layer having a thickness of 20 μm is often around 0.1%.

The lower limit of the concentration of Fe may be 0.05% or more, 0.08% or more, or 0.10% or more.

Sr: From 0% to Less than 0.5%, Sb: From 0% to Less than 0.5%, Pb: From 0% to Less than 0.5%, B: From 0% to Less than 0.5%, Provided that Formula 4: 0≤Sr+Sb+Pb+B<0.5

Detailed effects of Sr, Sb, Pb, and B are unknown, but when Sr, Sb, Pb, and B are contained, a spangle becomes clear. It is assumed that fine grains become a nucleus of the spangle. It is relatively easy to allow these elements to be dissolved in a coating bath together with the Cr, Ti, Ni, Co, V, Nb, and Mn (however, Cu is excluded). When large amounts of Sr, Sb, Pb, and B are contained, an intermetallic compound is formed and the spangle becomes unclear, so an appropriate element concentration range is from 0 to less than 0.5%.

From the viewpoint of properties, it is unknown how Sr, Sb, Pb, and B influence the formation of an intermetallic compound phase such as a Mg—Sn metallic compound phase. Small amounts of these elements may be solid-solved in a Zn phase in a Zn—Al—Mg alloy layer and may also be detected in the Mg—Sn metallic compound phase. Therefore, the elements may play a role as a substitutional element. Although it is not particularly observed that these elements cause changes in the properties, the elements can change the appearance of a coating layer, thereby allowing a spangle pattern to be formed on the surface of the coating layer.

When the concentration of each of these elements is 0.5% or more, the element cannot be solid-solved in a Zn phase, although it does not affect the formation of the Mg—Sn metallic compound phase. Thus, various intermetallic compound phases are formed, resulting in deterioration of formability and corrosion resistance.

Therefore, the concentrations of Sr, Sb, Pb, and B are set to less than 0.5%. In addition, it is also necessary to satisfy Formula 4: 0≤Sr+Sb+Pb+B<0.5 as an index that prevents substitution for the formation of a Mg—Sn intermetallic compound phase while facilitating the formation of an intermetallic compound phase.

Impurities

Impurities are components that are contained in starting materials or mixed in production steps without an intention to add such components. For example, small amounts of components other than Fe are incidentally mixed as impurities in a coating layer due to atomic diffusion between a steel product (base metal) and a coating bath.

$$0.0034\times(Al)^2+0.0964\times(Al)+2.4323\leq(Mg)\leq-0.0062\times(Al)^2+0.65\times(Al)-0.0937;\quad \text{Formula 5:}$$

The region formed by fine spangles is formed in a composition region close to the liquid phase eutectic line in the Zn—Al—Mg phase diagram. In other words, the relationship between the Al concentration and the Mg concentration in the coating layer needs to be a composition region close to the liquid phase eutectic line in the Zn—Al—Mg phase diagram.

When the Mg concentration is less than "0.0034×(Al)$^2$+0.0964×(Al)+2.4323", the solidification reaction of the coating layer does not occur on the eutectic line of the Al phase-MgZn$_2$ phase, so no spangle is formed. Even in a case in which spangles are formed, the effect of concealing appearance defects by the spangles is low.

Similarly, when the Mg concentration exceeds "−0.0062×(Al)$^2$+0.65×(Al)−0.0937", the solidification reaction of the coating layer does not solidify on the eutectic line of the Al phase-MgZn$_2$ phase, so no spangle is formed. Even in a case in which spangles are formed, the effect of concealing appearance defects by the spangles is low.

Therefore, in the chemical composition of a coating layer that is a multi-element type containing at least Zn, Al, and Mg and has an Al concentration of less than 35.0% by mass, it is necessary to satisfy Formula 5: 0.0034×(Al)$^2$+0.0964×(Al)+2.4323≤(Mg)≤−0.0062 (Al)$^2$+0.65×(Al)−0.0937, in order to form fine spangles.

Next, phases that constitute a Zn—Al—Mg alloy layer will be described.

It is preferable that the Zn—Al—Mg alloy layer includes a Zn phase, an Al phase, and a MgZn$_2$ phase, and contains a Mg—Sn intermetallic compound phase in the Zn phase. That is, the Mg—Sn intermetallic compound phase is contained (i.e., included) in the Zn phase.

When the Mg—Sn intermetallic compound phase is present in the Zn phase of the Zn—Al—Mg alloy layer, corrosion resistance is exerted at a higher level.

Here, the Mg—Sn intermetallic compound phase encompasses intermetallic compound phases corresponding to the following (1) to (5). Note that the Mg—Sn intermetallic compound phase may forms an interstitial solid solution with an element such as Si.

(1) Mg$_2$Sn phase (2) Mg$_9$Sn$_5$ phase (3) Substituted Mg$_2$Sn phase and Mg$_9$Sn$_5$ phase (Mg$_2$Sn phase and Mg$_9$Sn$_5$ phase as a substituted phase) in which Sn is partially substituted by at least one of Bi, In, Cr, Ti, Ni, Co, V, Nb, Cu, or Mn (4) Substituted Mg$_2$Sn phase and Mg$_9$Sn$_5$ phase (Mg$_2$Sn phase and Mg$_9$Sn$_5$ phase as a substituted phase) in which Mg is partially substituted by at least one of Ca, Y, La, or Ce (5) Substituted Mg$_2$Sn phase and Mg$_9$Sn$_5$ phase (Mg$_2$Sn phase and Mg$_9$Sn$_5$ phase as a substituted phase) in which Mg is partially substituted by at least one of Ca, Y, La, or Ce, and Sn is partially substituted by at least one of Bi, In, Cr, Ti, Ni, Co, V, Nb, Cu, or Mn These substituted phases of $Mg_2Sn$ phase and $Mg_9Sn_5$ phase may be collectively referred to as "substituted phase of $Mg_2Sn$ phase."

The Mg—Sn intermetallic compound phase in the Zn—Al—Mg alloy layer can be confirmed by X-ray diffraction (XRD) using a Cu-Kα ray. The Mg—Sn intermetallic compound phase in the Zn phase can be confirmed by the observation of an electron beam backscattered image by SEM-EDS when the area fraction of each phase described later is determined.

Details of X-ray diffraction (XRD) are as follows.

Usually, the diffraction peak of $Mg_2Sn$ in XRD is represented by, for example, JCPDS cards: PDF #00-007-0274, #00-006-0190, and #00-002-1087. However, in a Zn—Al—Mg alloy layer, the optimum diffraction peak for identifying a Mg—Sn intermetallic compound phase is a diffraction peak at 22.8° which does not overlap diffraction peaks of a Zn phase, a $MgZn_2$ phase, and an Al phase. In addition to the diffraction peak at 22.8°, favorable diffraction peaks used for identifying a Mg—Sn intermetallic compound phase are diffraction peaks at 23.3° and 24.2°, which do not overlap diffraction peaks of the other constituent phases of a coating layer and are convenient for identifying a Zn—Al—Mg alloy.

Specifically, when based on an X-ray diffraction image of the surface of the Zn—Al—Mg alloy layer, the image being measured using a Cu-Kα ray with an X-ray output at 40 kV and 150 mA, intensity I (Mg—Sn intermetallic compound phase)=I (22.8° intensity (cps)) is 1000 cps or more, or is higher by 500 cps or more than background intensity at from 11° to 12° (cps), it can be an index for the sufficient presence of the Mg—Sn intermetallic compound phase in the Zn—Al—Mg alloy layer.

When the intensity is 500 cps or more, it is an index that the content of the Mg—Sn intermetallic compound phase is such an extent that the Mg—Sn intermetallic compound phase is dispersed in the Zn—Al—Mg alloy layer, and the higher the intensity, the more the Mg—Sn intermetallic compound phase is contained.

Recently, there is software that can perform, for example, background removal as a method of calculating the background intensity. From the obtained diffraction peak intensity data, 2θ and an intensity (cps) graph are generated to create an approximate line (straight line) of the flat portion confirmed at from 11° to 12°. Since no diffraction peak appears at 11° to 12° from the surface of the Zn—Al—Mg alloy layer, when simply taking an average value of intensity cps at from 11° to 12°, a background intensity at 11° to 12° is found.

Here, as illustrated in FIG. 1, every SEM image of the cross-section of a Zn—Al Mg alloy layer was taken as a backscattered electron image. Usually, phases constituting a Zn—Al—Mg alloy layer (such as an Al phase, a $MgZn_2$ phase, a Zn phase, and a Mg—Sn intermetallic compound phase) can be easily distinguished because the atomic numbers are obviously different.

—Aspect of Structure (1)—

Then, in a backscattered electron image of a Zn—Al—Mg alloy layer obtained in a case in which a field of view of 1000 μm×700 μm is observed with a scanning electron microscope at a magnification of 500 times after the surface of the Zn—Al—Mg alloy layer is polished to an extent of one-half of the layer thickness, the total area proportion of an Al phase and a $MgZn_2$ phase is 70% or more, and the area proportion of a Zn phase is 30% or less.

When the total area proportion of the Al phase and the $MgZn_2$ phase is too low, the number of the Al phase and the $MgZn_2$ phase contributing to the formation of spangles is small, and the spangles are less likely to be formed. Even in a case in which spangles are formed, the effect of concealing appearance defects by the spangles is low. Thus, the total area proportion of the Al phase and the $MgZn_2$ phase is 70% or more, preferably 75% or more, and more preferably 80% or more. There is no upper limit on the total area proportion of the Al phase and the $MgZn_2$ phase, and the spangles can be made clearer when the total area proportion is closer to 100%.

From the viewpoint of forming a core of a spangle, the area proportion of the Al phase is, for example, preferably from 10 to 50%, and more preferably from 20 to 40%. It is preferable that 30% is used as an index in the area proportion of the sum of the Al phase and the $MgZn_2$ phase.

When the area proportion of the Zn phase is too high, the number of the Al phase and the $MgZn_2$ phase contributing to the formation of spangles is relatively reduced, and the spangles are less likely to be formed. Even in a case in which spangles are formed, the effect of concealing appearance defects by the spangles is low. Thus, as the area proportion of the Zn phase is closer to, for example, 0%, clear spangles are more likely to be formed.

Since the observation surface is one-half of the coating thickness at the position in the coating layer, there is a possibility that the area proportion of the Zn phase can be set to 0% depending on the cross-section. However, it is difficult to set the area proportion of the Zn phase to 0% in the case of Zn—Al—Mg-based coating in the vicinity of the interface where a finally solidified portion is accumulated. When the area proportion of the Zn phase is 10% or less, the spangles can be observed quite clearly.

—Aspect of Structure (2)—

In addition, in a backscattered electron image of a Zn—Al—Mg alloy layer obtained in a case in which a field of view of 1000 μm×700 μm is observed with a scanning electron microscope at a magnification of 500 times after the surface of the Zn—Al—Mg alloy layer is polished to an extent of one-half of the layer thickness, an average value of cumulative circumferential lengths of Al phases is less than 88 mm/mm$^2$ and the total frequency in number of the Al phase having a circumferential length of 50 μm or more is less than 100.

When the average value of the cumulative circumferential lengths of the Al phase is too high, the Al phase is excessively coarsened, and it becomes difficult to form spangles. Even in a case in which spangles are formed, the effect of concealing appearance defects by the spangles is low. Thus, the average value of the cumulative circumferential lengths of the Al phase is less than 88 mm/mm$^2$, preferably 85 mm/mm$^2$ or less, and more preferably 80 mm/mm$^2$ or less. However, the lower limit of the average value of the cumulative circumferential lengths of the Al phase is usually 35 mm/mm$^2$ or more based on the integrated experimental results.

When the total frequency in number of the Al phase having a circumferential length of 50 μm or more is too large, a coarse Al phase and a fine Al phase are mixed, the variation in Al phase size increases, and it becomes difficult to form spangles. Even in a case in which spangles are formed, the effect of concealing appearance defects by the spangles is low. Thus, the total frequency in number of the Al phase having a circumferential length of 50 μm or more is less than 100, preferably 90 or less, and more preferably 80 or less. There is no lower limit, and the value closer to 0 is more preferable.

These numerical values are associated with the coating component and the coating method (cooling rate during solidification), and can be used as an index when producing uniform spangles. There is also a correlation with visual observation. These numerical ranges are clarified, whereby the clarified range is always used as a management index for forming clear spangles.

—Aspect of Structure (3)—

Preferably, in a backscattered electron image of the coating layer obtained by observing a cross-section of the coating layer, the cross-section being cut in a thickness direction, at a field of view of 250 μm×700 μm and a magnification of 500 times with the scanning electron microscope, a proportion of lengths occupied by the Al phase and the MgZn$_2$ phase at a surface side of the Zn—Al—Mg alloy layer ($L_{surface}$), a proportion of lengths occupied by the Al phase and the MgZn$_2$ phase at a thickness center of the Zn—Al—Mg alloy layer ($L_{medium}$), and a proportion of lengths occupied by the Al phase and the MgZn$_2$ phase at a steel product side of the Zn—Al—Mg alloy layer ($L_{boarder}$) satisfy the following Formulae 6 and 7:

$$0.90 \leq (L_{surface})/(L_{boarder}); \text{ and} \qquad \text{Formula 6:}$$

$$(L_{medium})/(L_{boarder}) \leq 1.10. \qquad \text{Formula 7:}$$

The fact that the proportion of lengths occupied by the Al phase and the MgZn$_2$ phase at a surface side of the Zn—Al—Mg alloy layer ($L_{surface}$) is too long as compared with the proportion of lengths occupied by the Al phase-MgZn$_2$ phase at a steel product side of the Zn—Al—Mg alloy layer ($L_{boarder}$) indicates that the Al phase MgZn$_2$ phase have not grown in a uniform direction, from the interface direction to the surface direction, but have grown in random orientations, or the spangle size has decreased or increased. Therefore, the appearance of the spangle is not clear and is not uniform in many cases. Thus, even in a case in which spangles are formed, the effect of concealing appearance defects by the spangles tends to be low.

Meanwhile, in a case in which the proportion of lengths occupied by the Al phase and the MgZn$_2$ phase at a thickness center of the Zn—Al—Mg alloy layer ($L_{medium}$) is too short as compared with the proportion of lengths occupied by the Al phase-MgZn$_2$ phase at a steel product side of the Zn—Al—Mg alloy layer ($L_{boarder}$), it also indicates that the Al-phase and the MgZn$_2$ phase are not continuously grown on the surface of the coating layer from the direction of the interface with the base metal. Accordingly, spangles are not uniform, resulting in variations in random orientation or spangle size. Therefore, it becomes difficult to form spangles. Even in a case in which the spangles are formed, the effect of concealing appearance defects by the spangles tends to be low.

Hence, the Al phase and MgZn$_2$ phase preferably have a structure in which the Al phase and MgZn$_2$ phase in the cross-section of the Zn—Al—Mg alloy layer are continuously grown at a constant angle from the interface direction toward the surface.

Therefore, respective lengths occupied by the Al phase and the MgZn$_2$ phase preferably satisfy Formulae 6 and 7.

Further, the lengths occupied by the Al phase and the MgZn$_2$ phase more preferably satisfy the following Formulae 6-1 and 7-1, and still more preferably satisfy the following Formulae 6-2 and 7-2, from the viewpoint of forming spangles.

$$0.95 \leq (L_{surface})/(L_{boarder}) \leq 1.05 \qquad \text{Formula 6-1:}$$

$$0.95 \leq (L_{medium})/(L_{boarder}) \leq 1.05 \qquad \text{Formula 7-1:}$$

$$0.97 \leq (L_{surface})/(L_{boarder}) \leq 1.03 \qquad \text{Formula 6-2:}$$

$$0.97 \leq (L_{medium})/(L_{boarder}) \leq 1.03 \qquad \text{Formula 7-2:}$$

Here, the proportion of lengths occupied by the Al phase and the MgZn$_2$ phase at a surface side of the Zn—Al—Mg alloy layer ($L_{surface}$) means a proportion (%) occupied by the Al phase and the MgZn$_2$ phase overlapping on the contour line of the layer surface (surface opposite to the steel product side) when observing the cross-section of the Zn—Al—Mg alloy layer. In other words, it means a proportion (%) of lengths of the Al phase and the MgZn$_2$ phase overlapping on the length of the contour line of the observed layer surface with respect to this length of the contour line.

The proportion of lengths occupied by the Al phase and the MgZn$_2$ phase at a thickness center of the Zn—Al—Mg alloy layer ($L_{medium}$) means a proportion (%) occupied by the Al phase and the MgZn$_2$ phase overlapping on a line connecting positions at one-half of the layer thickness, the line being drawn when the cross-section of the Zn—Al—Mg alloy layer is observed. In other words, it means a proportion (%) of lengths of the Al phase and the MgZn$_2$ phase overlapping on a line connecting positions at one-half of the observed layer thickness with respect to the length of this line.

In addition, the proportion of lengths occupied by the Al phase and the MgZn$_2$ phase at a steel product side of the Zn—Al—Mg alloy layer ($L_{boarder}$) means a proportion (%) occupied by the Al phase and the MgZn$_2$ phase overlapping on the contour line of the interface between the Zn—Al—Mg alloy layer and the steel product (in the case of including the Al—Fe alloy layer, the interface between the Zn—Al—Mg alloy layer and the Al—Fe alloy layer) when observing the cross-section of the Zn—Al—Mg alloy layer. In other words, it means a proportion (%) of lengths of the Al phase and the MgZn$_2$ phase overlapping on the contour line of the observed layer interface with respect to the length of this contour line.

(Spangle Appearance Maintaining Ability)

In the Zn—Al—Mg coated steel product of the disclosure, spangles are formed by very fine unevenness caused by the Al phase and the MgZn$_2$ phase, whereby the appearance has a high metallic luster and a bright white color due to diffuse reflected light. As long as the surface state of the coating layer is maintained, high luster is maintained, and aesthetic appearance is also maintained.

Depending on the chemical composition described above, the blending of the element components diffused on the surface of the coating layer may change, and the maintenance period of aesthetic appearance may change. In other words, an element having high sacrificial corrosion protection ability and high antirust effect diffuses to the surface of the coating layer, and then the element reacts with oxygen in the air to form a thin oxide film. Depending on this thickness, changes occur in maintenance of metallic luster. In other words, in a case in which the thickness of the oxide film is large, the metallic luster becomes poor, and the appearance turns slightly cloudy. Further, in a humid environment in which there is moisture in the air and an oxide film is not sufficiently formed with oxygen, an extremely thin corrosion product is formed, a thin film having a black appearance such as an oxygen-deficient oxide film (e.g., a MgO$_{1-x}$ film, an Al$_2$O$_{3-x}$ film, or a ZnO$_{1-x}$ film) is formed. The oxide film may even turn light black.

However, whitening and blackening can be prevented by strictly observing an appropriate chemical composition in the coating layer components.

Basically, in a case in which the Mg concentration is low, the appearance change is excellent, but it is difficult to maintain the metallic luster particularly when the Mg concentration is 5.0% or more. In a case in which the Mg concentration is high, Mg which is easily dissolved and oxidized in the coating layer preferentially forms an oxide, thereby inducing generation of black oxides such as $Al_2O_3$, and $ZnO_{1-x}$. Further, Mg itself also forms a thin oxide/hydroxide such as $MgO_{1-x}$ or $Mg(OH)_2$ (white), which causes the metallic luster to be poor.

Furthermore, in a case in which Sn or the like for improving sacrificial corrosion protection ability is contained in the coating layer (in a case in which the Sn concentration is 0.01% or more), a change in appearance of the coating layer becomes remarkable, and a spangle boundary where these elements are accumulated becomes blackened, and appearance deterioration easily occurs. In addition, there may be a period during which a mottled pattern is visible due to the formation of white and black corrosion products.

The influence on the change in appearance tends to depend on the Sn concentration on the surface of the coating layer. Sn easily forms a compound with Mg, Ca, or Si (a solid solution of $Mg_2Sn$, Ca is substituted with Mg, and Si is assumed to be solid-solved between atoms, but the exact chemical formula is unknown). Although Sn tends to accumulate on the surface of the coating layer in a normal production method, it is possible to control Sn that is excessively accumulated on the surface of the coating layer in the case of containing these elements. Usually, depending on the solidification temperature of the coating layer, $Mg_2Sn$ is formed in the finally solidified portion. It is assumed that the melting point at the time of solidification increases due to the inclusion of Ca, the melting point at the time of solidification further increases due to the solid-solved Si, and the timing of precipitation increases due to the presence of solidified nuclei.

However, since the concentration for forming a solid solution is limited, it is necessary to limit the concentration of each element.

First, the Sn concentration is preferably limited to less than 0.25%. When the Sn concentration is 0.25% or more, the degree of discoloration tends to be large even in a case in which a $Mg_2Sn$ compound or a solid solution is accumulated on the surface of the coating layer.

When the Ca concentration is more than 0.05%, a $Mg_2Sn$ solid solution that is less likely to be discolored tends to be formed. The Ca concentration is preferably 0.07% or more.

However, excessive content of Ca causes compounds that are not associated with Sn, such as a Ca—Zn—Al-based compound, to be easily formed. These compounds may lead to poor appearance such as dull luster in the appearance of the coating layer, whereby luster becomes poor. Therefore, the upper limit of the Ca concentration is preferably less than 0.5%, and more preferably 0.45% or less.

When the Sn concentration is 0.01% or more and 0.05% or less, the value of the Sn concentration+0.02 is preferably the Ca concentration or less. The reason for this is as follows. The number of Ca atoms incorporated into $Mg_2Sn$ is determined. Accordingly, for example, when the Sn concentration is higher than the Ca concentration, the amount of $Mg_2Sn$ unable to incorporate Ca increases, and the degree of discoloration tends to increase. Particularly, in a case in which the Sn concentration is low, Sn tends to form some solid solution in an Al phase, and Sn appears in the Al phase with aging. Accordingly, in a case in which the Sn concentration is low, Sn atoms and Ca atoms form some solid solution in respective phases such as an Al phase, a Zn phase, and a $MgZn_2$ phase, and there is a possibility that the entire $Mg_2Sn$ phase cannot exactly incorporate Ca as a solid solution. Therefore, when the Sn concentration is 0.01% or more and 0.05% or less, it is preferable that the Ca concentration is 0.02% or more with respect to the Sn concentration.

In a case in which the Sn concentration is more than 0.05% and less than 0.25%, the Sn concentration is preferably lower than the Ca concentration. This is because, in this Sn concentration range, the Sn concentration and the Ca concentration are sufficient as compared with the solid solubility limit of each phase, whereby it is possible to suppress the formation of $Mg_2Sn$ being a cause for discoloration, to the extent of the Ca concentration approximately equivalent to the Sn concentration.

As described above, from the viewpoint of maintaining the appearance of the spangle, it is preferable that the coating layer has an average composition and a Mg concentration of 5.0% or more in terms of % by mass, and satisfies the following Formulae 8 to 11:

$$0.01 \leq Sn < 0.25; \quad \text{Formula 8:}$$

$$0.05 < Ca < 0.5; \quad \text{Formula 9:}$$

$$Sn+0.02 \leq Ca \text{ in a case in which } 0.01 \leq Sn \leq 0.05; \text{ and} \quad \text{Formula 10:}$$

$$Sn < Ca \text{ in a case in which } 0.05 < Sn < 0.25; \quad \text{Formula 11:}$$

wherein, in Formulae 8 to 11, each element symbol represents a content of each element in terms of % by mass.

Here, Si is not as effective as Ca, but when Si is contained in an amount of 0.05% or more, an effect on appearance is exhibited. In addition to the formation of a solid solution, when forming a coating layer on a steel product, Si tends to be particularly accumulated near the interface with the steel product and also tends to be formed on the surface of the coating layer. Thus, it is convenient to change the element distribution on the surface of the coating layer. In a case in which Ca is not contained, but Si is contained as a single component, this effect is hardly obtained. Rather, since the surface discoloration of the coating layer increases, it is preferable to allow the coating layer to contain Ca as a single component or both Ca and Si.

Further, the ease of discoloration of the surface of the coating layer can be confirmed by leaving a coated steel product in a humid atmosphere under a specific environment. A sample of the coated steel product is left inside a thermo-hygrostat for a certain period of time, and it is only necessary to grasp the appearance; the degree of discoloration before and after the test; $\Delta E^* a^* b^* = ((a^*)^2 + (b^*)^2)^{1/2}$ (e.g., in an SCI mode) using a spectrophotometric colorimeter.

When evaluating the sacrificial corrosion protection ability (elution rate of Mg due to addition of Sn or the like) and the plain surface corrosion resistance (corrosion rate of the coating layer itself), the resistance to discoloration of the coating layer surface, the range of Sn concentration, and the range of Ca concentration tend to coincide with one another, and these composition ranges are excellent.

It is preferable that, for example, a cut end surface of 3.2 mm is created in the coated steel product, and the width of white rust formed around the cut end surface portion and the area proportion of red rust on the cut end surface portion after a predetermined corrosion test is measured as a balance index between sacrificial corrosion protection ability and plain surface corrosion resistance.

In the coated steel product of the disclosure, a difference ΔE in color space (L*a*b* color system) of CIELAB (in accordance with JIS Z 8729) before and after the test, as measured in the appearance investigation shown in Examples, is preferably 5 or less, more preferably 3 or less, and still more preferably 2 or less.

In a case in which the sacrificial corrosion protection ability is strong and the plain surface corrosion resistance is weak, the width of white rust formed around the end surface increases (deterioration of the plain surface corrosion resistance is observed). However, red rust is hardly formed on the cut end surface portion.

In a case in which the sacrificial corrosion protection ability is weak and the plain surface corrosion resistance is high, the cut end surface portion is covered with red rust, but the width of white rust formed around the end surface decreases.

In any case, unless corrosion protection ability is appropriately controlled, the corrosion resistance cannot be balanced from a long-term viewpoint. Thus, reduction of red rust formed on the cut end surface portion and appropriate control of the width of white rust formed on the cut end surface lead to excellent long-term corrosion resistance.

Next, an Al—Fe alloy layer will be described.

An Al—Fe alloy layer is formed on the surface of a steel product (specifically between a steel product and a Zn—Al—Mg alloy layer), and the $Al_5Fe$ phase is a layer of the main phase of the structure. An Al—Fe alloy layer is formed by atomic diffusion between a base metal (steel product) and a coating bath. In a case in which the hot-dip coating method is used as a production method, an Al—Fe alloy layer is likely to be formed in a coating layer containing Al as an element. Since the coating bath contains Al at a certain concentration or more, an $Al_5Fe$ is formed as the most dominant phase. However, atomic diffusion takes time, and a portion near the base metal may have a high Fe concentration. Thus, the Al—Fe alloy layer may partially contain small amounts of an AlFe phase, an $Al_3Fe$ phase, an $Al_5Fe_2$ phase, and the like. Further, since the coating bath also contains a certain concentration of Zn, the Al—Fe alloy layer also contains a small amount of Zn.

As for corrosion resistance, there is no significant difference among an $Al_5Fe$, an $Al_3Fe$ phase, an AlFe phase, and an $Al_5Fe_2$ phase. The term "corrosion resistance" used herein means corrosion resistance at a site that is not affected by welding. The thickness of the Al—Fe alloy layer in the coating layer is small, and the corrosion resistance is lower than that of the Zn—Al—Mg alloy layer. Thus, there is no significant difference in corrosion resistance of the entire coating layer even when the ratio of these phases varies.

Here, in a case in which Si is contained in the coating layer, Si is particularly easily incorporated into the Al—Fe alloy layer, which may result in an Al—Fe—Si intermetallic compound phase. There is an AlFeSi phase as an intermetallic compound phase to be identified. For example, α-, β-, q1-, and q2-AlFeSi phases exist as isomers. Thus, these AlFeSi phases and the like may be detected in the Al—Fe alloy layer. The Al—Fe alloy layer containing these AlFeSi phases and the like is also referred to as "Al—Fe—Si alloy layer".

The Al—Fe—Si alloy layer is smaller in thickness than the Zn—Al—Mg alloy layer and thus has only a small impact on corrosion resistance of the entire coating layer.

In addition, in a case in which various pre-coated steel products are used as a coating base material (such as a coating base sheet), the structure of the Al—Fe alloy layer may change depending on the pre-coating adhesive amount. Specifically, there are cases such as a case in which a pure metal layer used for pre-coating remains around the Al—Fe alloy layer, a case in which an intermetallic compound phase (e.g., an $Al_3Ni$ phase) in which the components of an Zn—Al—Mg alloy layer and pre-coating components are bound to each other forms an alloy layer, a case in which an Al—Fe alloy layer in which some of Al atoms and Fe atoms are substituted by other atoms is formed, and a case in which an Al—Fe—Si alloy layer in which some of Al atoms, Fe atoms, and Si atoms are substituted by other atoms is formed. In any case, these alloy layers are also smaller in thickness than the Zn—Al—Mg alloy layer and thus have only a small impact on corrosion resistance of the entire coating layer.

In other words, the Al—Fe alloy layer is a layer including alloy layers in the above-described various aspects, in addition to an alloy layer mainly composed of the $Al_5Fe$ phase.

The thickness of the Al—Fe alloy layer is, for example, 0 μm or more and 5 μm or less (usually, 100 nm or more and 5 μm or less).

This means that the Al—Fe alloy layer is not necessarily formed. However, usually, when a coating layer with a chemical composition as specified in the disclosure is formed by the hot-dip coating method, an Al—Fe alloy layer having a thickness of 100 nm or more is formed between the steel product and the Zn—Al—Mg alloy layer. The lower limit of the thickness of the Al—Fe alloy layer is not particularly limited. It has been found that the Al—Fe alloy layer is inevitably formed when forming a hot-dip coating layer containing Al. In addition, it is empirically determined that a thickness of around 100 nm is the thickness in a case in which the formation of an Al—Fe alloy layer is most suppressed, which is a thickness that ensures sufficient adhesion between a coating layer and a base metal (steel product). It is difficult to form an Al—Fe alloy layer thinner than 100 nm with the hot-dip coating method because the Al concentration is high unless special measures are taken. However, in a case in which the Al—Fe alloy layer has a thickness of less than 100 nm or no Al—Fe alloy layer is formed, it is assumed that a large impact is not given to coating performance.

In a case in which the thickness of the Al—Fe alloy layer is more than 5 the Al component of a Zn—Al—Mg alloy layer to be formed on the Al—Fe alloy layer is insufficient. Further, the adhesion and formability of the coating layer tend to extremely deteriorate. Thus, it is preferable that the thickness of the Al—Fe alloy layer is limited to 5 μm or less.

Note that the Al—Fe alloy layer is also closely associated with the Al concentration and the Sn concentration. In general, as the Al concentration and the Sn concentration increase, the growth rate tends to increase.

The Al—Fe alloy layer is often composed mainly of an $Al_5Fe$ phase. Thus, an example of the chemical composition of the Al—Fe alloy layer is a composition including Fe: from 25 to 35%, Al: from 65 to 75%, Zn: 5% or less, and balance: impurities.

Usually, the Zn—Al—Mg alloy layer is greater in thickness than the Al—Fe alloy layer. Thus, the Al—Fe alloy layer as a coated steel sheet contributes to plain surface corrosion resistance to a smaller extent than the Zn—Al—Mg alloy layer. However, the Al—Fe alloy layer contains Al and Zn as corrosion-resistant elements, at certain concentrations or more, as estimated from the component analysis results. Thus, the Al—Fe alloy layer has certain levels of sacrificial corrosion protection ability and corrosion barrier effects on the base metal (steel product).

Here, it is difficult to confirm to what extent a thin Al—Fe alloy layer alone contributes to corrosion resistance by quantitative measurement. However, for example, in a case in which the Al—Fe alloy layer has a sufficient thickness, it is possible to evaluate corrosion resistance of the Al—Fe alloy layer alone by precisely removing a Zn—Al—Mg alloy layer on the Al—Fe alloy layer by cutting from the surface of a coating layer using end milling or the like and conducting a corrosion test. The Al—Fe alloy layer contains an Al component and a small amount of a Zn component. In a case in which an Al—Fe alloy layer is present, red rust is formed as spots, and the entire surface of the layer is not covered with red rust, unlike a case in which a base metal (steel product) is exposed without an Al—Fe alloy layer.

In addition, when a cross-section of the coating layer which has reached a stage immediately before red rust formation on the base metal (steel product) is observed during the corrosion test, it can be confirmed that even though the Zn—Al—Mg alloy layer as the upper layer is dissolved and rusted, the Al—Fe alloy layer is exclusively left to prevent corrosion of the base metal (steel product). This is because the Al—Fe alloy layer is electrochemically superior to the Zn—Al—Mg layer, but inferior to the base metal (steel product). From these facts, it can be judged that the Al—Fe alloy layer also has a certain level of corrosion resistance.

From the viewpoint of corrosion, it is more preferable that the Al—Fe alloy layer is thicker. This is effective for delaying the time of red rust formation. However, since a thick Al—Fe alloy layer causes significant deterioration in coating formability, the thickness is preferably equal to or less than a certain thickness. An appropriate thickness is known from the viewpoint of formability. The Al—Fe alloy layer preferably has a thickness of 5 µm or less, whereby cracks generated from the Al—Fe alloy layer for coating during a V-bending test or the like and the amount of powdering are reduced. The thickness is more preferably 2 µm or less.

(Various Measurement Methods Regarding Characteristics of Coating Layer)

Next, various measurement methods regarding the characteristics of a coating layer will be described.

—Chemical Composition of Coating Layer—

The chemical composition of a coating layer is measured by the following method.

First, an acid solution is obtained by exfoliating and dissolving a coating layer with an acid containing an inhibitor that suppresses corrosion of a base metal (steel product). Then, by measuring the obtained acid solution by ICP analysis, it is possible to obtain the chemical composition of the coating layer (in a case in which the coating layer has a single layer structure of a Zn—Al—Mg alloy layer, a case in which the coating layer has the chemical composition of a Zn—Al—Mg alloy layer and the coating layer has a layered structure of an Al Fe alloy layer and a Zn—Al—Mg alloy layer, a case in which the coating layer has the chemical composition of an Al—Fe alloy layer and a Zn—Al—Mg alloy layer combined together). The acid species is not particularly limited as long as an acid can dissolve the coating layer. The chemical composition is measured as an average chemical composition.

—Area Fraction of Each Phase—

The area fraction of each phase is measured utilizing a backscattered electron image of the Zn—Al—Mg alloy layer obtained in a case in which the surface of the Zn—Al—Mg alloy layer is polished to an extent of one-half of the layer thickness and then a field of view of 1000 µm×700 µm is observed with a scanning electron microscope at a magnification of 500 times. A specific example thereof will be described below.

First, a sample is collected from a coated steel product to be measured. However, the sample is taken from a non-defect portion of the coating layer other than the vicinity of a punched end surface portion (2 mm from the end surface) of the coated steel product.

Next, the surface of the coating layer (specifically, a Zn—Al—Mg alloy layer) of the sample is polished in the thickness direction of the coating layer (hereinafter also referred to as "Z-axis direction").

In polishing the surface of the coating layer in the Z-axis direction, the surface of the Zn—Al—Mg alloy layer is polished to an extent of one-half of the layer thickness. In this polishing, the surface of the Zn—Al—Mg alloy layer is dry-polished with a No. 1200 polishing sheet, and then subjected to final-polishing using a final liquid containing alumina having an average grain size of 3 µm, a final liquid containing alumina having an average grain size of 1 µm, and a final liquid containing colloidal silica in this order.

The polishing test piece is preferably embedded in a resin and polished.

Regarding an index of the depth, when a Vickers dent indicating a tip angle or the like is driven into the resin around the coated steel sheet and the Vickers dent completely disappears, the depth from the polished surface can be measured. Therefore, there is no error, and the polishing distance can be easily measured. In a case in which the length of a diagonal line of the Vickers dent is determined, the distance in the depth direction is determined by calculating tan θ/2 of the tip angle and using it.

Next, the polished surface of the Zn—Al—Mg alloy layer sample is observed with a scanning electron microscope (SEM) at a magnification of 500 times to obtain a backscattered electron image of the Zn—Al—Mg alloy layer (hereinafter also referred to as "SEM backscattered electron image"). SEM observation conditions are as follows: acceleration voltage: 15 kV, emission current: 10 nA, and field size: 1000 µm×700 µm.

In order to identify each phase included in the Zn—Al—Mg alloy layer, FE-SEM equipped with EDS (energy dispersive X-ray analyzer) or TEM (transmission electron microscope) is used. In the case of using TEM, the polished surface of the same Zn—Al—Mg alloy layer sample to be measured is processed by FIB (focused ion beam). After processing by FIB, a TEM electron diffraction image of the polished surface of the Zn—Al—Mg alloy layer is obtained. Then, the metal contained in the Zn—Al—Mg alloy layer is identified.

Next, the SEM backscattered electron image is compared with the identification results of the FE-SEM or TEM electron diffraction image, and each phase included in the Zn—Al—Mg alloy layer is identified in the SEM backscattered electron image. In identifying each phase included in the Zn—Al—Mg alloy layer, it is recommended that EDS point analysis is performed, and the results of the EDS point analysis are compared with the identification results of the TEM electron diffraction image. An EPMA system may be used for identifying each phase. In a case in which there is a mapping image, the position of each element can be easily identified, and thus it is particularly convenient when distinguishing the $MgZn_2$ phase from the Mg—Sn compound.

Next, in the SEM backscattered electron image, the three values of lightness, hue, and contrast of the gray scale indicated by each phase in the Zn—Al—Mg alloy layer are determined. The three values of lightness, hue, and contrast indicated by each phase reflect the atomic number of the element contained in each phase. Therefore, usually, a phase having large contents of Al and Mg with small atomic numbers tends to have a black color, and a phase having a large content of Zn tends to have a white color.

Based on the above-described EDS matching results, computer image processing is performed so as to change the color only in the range of the above-described three values indicated by each phase contained in the Zn—Al—Mg alloy layer, in order to achieve consistency with the SEM backscattered electron image (for example, the area (number of pixels) of each phase in the visual field is calculated by displaying only a specific phase as a white image). This image processing for each phase is performed, whereby the area fraction of each phase in the Zn—Al—Mg alloy layer in the SEM backscattered electron image is determined.

The area fraction of each phase of the Zn—Al—Mg alloy layer is determined to be the average value of area fraction of each phase obtained by the above-described operation in at least three fields of view or more.

Here, as illustrated in FIG. 1, every SEM image of the cross-section of a Zn—Al Mg alloy layer was taken as a backscattered electron image. Usually, phases constituting a Zn—Al—Mg alloy layer (such as an Al phase, a $MgZn_2$ phase, a Zn phase, and a Mg—Sn intermetallic compound phase) can be easily distinguished because the atomic numbers are obviously different.

In a case in which it is difficult to distinguish each phase, electron beam diffraction by TEM or EDS point analysis is performed.

In addition, each of an Al phase, a $MgZn_2$ phase, and a Zn phase is often observed with a grain size of 1 μm or more and easily identified using EDS.

—Average Value of Cumulative Circumferential Lengths of Al Phase/Total Frequency in Number of Al Phase Having Circumferential Length of 50 μm or More—

The average value of cumulative circumferential lengths of the Al phase and the total frequency in number of the Al phase having a circumferential length of 50 μm or more are measured utilizing a backscattered electron image of the Zn—Al—Mg alloy layer obtained in a case in which the surface of the Zn—Al—Mg alloy layer is polished to an extent of one-half of the layer thickness, and then a field of view of 1000 μm×700 μm is observed with a scanning electron microscope at a magnification of 500 times. A specific example thereof will be described below.

An SEM backscattered electron image is obtained in a similar manner to the method of measuring the area fraction of each phase. Then, based on the above-described EDS matching results, image processing (binarization) that changes the color only in the range of the above-described three values indicated by an Al phase contained in the Zn—Al—Mg alloy layer is performed so as to achieve consistency with the SEM backscattered electron image (for example, the area (number of pixels) of each phase in the visual field is calculated by displaying only the Al phase as a white image). This image processing is performed, whereby the Al phase in the Zn—Al—Mg alloy layer in the SEM backscattered electron image is identified.

As an example, a method of identifying an Al phase in an SEM backscattered electron image (gray scale image stored with 8 bits, 256 color display) using a binary processing function based on two thresholds of WinROOF 2015 (image analysis software) manufactured by Mitani Corporation will be described. Note that, in the gray scale image stored with 8 bits, a luminosity of 0 corresponds to black, and a maximum value of 255 corresponds to white. It has been found from identification results by FE-SEM and TEM that, in the case of the SEM backscattered electron image described above, the Al phase is accurately identified when luminosity thresholds are set to 10 and 95. Therefore, the image is processed so that color variations occur in the luminosity range of from 10 to 95, and the Al phase is identified. Image analysis software other than WinROOF 2015 may be used for the binarization processing.

Next, the circumferential length of the Al phase identified by image processing is accumulated using an automatic shape feature analyzing function of WinROOF 2015 (image analysis software) manufactured by Mitani Corporation, and cumulative circumferential lengths of the Al phase is obtained. Then, the cumulative circumferential lengths of the Al phase per unit area ($mm^2$) are calculated by dividing the cumulative circumferential lengths of the Al phase by the area of the field of view.

This operation is performed in three fields of view, and the arithmetic average of the cumulative circumferential lengths of the Al phase per unit area ($mm^2$) is defined as the "average value of the cumulative circumferential lengths of the Al phase".

Among the individual Al phases identified by image processing, the number of the Al phases having a circumferential length of 50 μm or more is counted. The sum is calculated.

This operation is performed in three fields of view, and the arithmetic average of all the Al phases having a circumferential length of 50 μm or more is defined as "total frequency in number of the Al phase having a circumferential length of 50 μm or more".

—Lengths Occupied by Al Phase and $MgZn_2$ Phase ($L_{surface}$, $L_{medium}$, and $L_{boarder}$)—

Respective lengths occupied by the Al phase and the $MgZn_2$ phase ($L_{surface}$, $L_{medium}$, and $L_{boarder}$) are measured utilizing a backscattered electron image of a coating layer obtained by observing a cross-section of the coating layer, the cross-section being cut in a thickness direction, at a field of view of 250 μm×700 μm and a magnification of 500 times with the scanning electron microscope. A specific example thereof will be described below.

First, a sample is collected from a coated steel product to be measured. However, the sample is taken from a non-defect portion of the coating layer other than the vicinity of a punched end surface portion (2 mm from the end surface) of the coated steel product.

Next, a cross-section (a cross-section cut in the thickness direction) of the coating layer of the sample is processed using CP (CROSS SECTION POLISHER) or processed by polishing. After the processing, the cross-section of the coating layer sample (specifically, a Zn—Al—Mg alloy layer) is observed with a scanning electron microscope (SEM) at a magnification of 500 times to obtain a backscattered electron image of the Zn—Al—Mg alloy layer (hereinafter, also referred to as "SEM backscattered electron image"). SEM observation conditions are as follows: acceleration voltage: 15 kV, emission current: 10 nA, and field size: 250 μm×700 μm.

Next, in a similar manner to the method of measuring the area fraction of each phase, based on the above-described EDS matching results, image processing is performed so as to change the color only in the range of the above-described three values indicated by an Al phase and a $MgZn_2$ contained in the Zn—Al—Mg alloy layer, in order to achieve consistency with the SEM backscattered electron image (for example, the area (number of pixels) of each phase in the visual field is calculated by displaying only the Al phase and the $MgZn_2$ phase as distinguishable color images). This image processing is performed, whereby the Al phase and the $MgZn_2$ phase in the Zn—Al—Mg alloy layer in the SEM backscattered electron image are identified.

In the SEM backscattered electron image subjected to image processing, a proportion of lengths of the Al phase and the $MgZn_2$ phase overlapping on the contour line of the surface of the Zn—Al—Mg alloy layer ($L_{surface}$), with respect to the length of the contour line of the surface of the Zn—Al—Mg alloy layer, is determined.

Further, a proportion of lengths of the Al phase and the $MgZn_2$ phase overlapping on a line connecting positions at one-half of the thickness of the Zn—Al—Mg alloy layer ($L_{medium}$), with respect to the length of the line, is determined.

Furthermore, a proportion of lengths of the Al phase and the $MgZn_2$ phase overlapping on the contour line of the interface between the Zn—Al—Mg alloy layer and the steel product ($L_{boarder}$) (in the case of including the Al—Fe alloy layer, the interface between the Zn—Al—Mg alloy layer and the Al—Fe alloy layer), with respect to the contour line of the interface, is determined.

Figure 6:
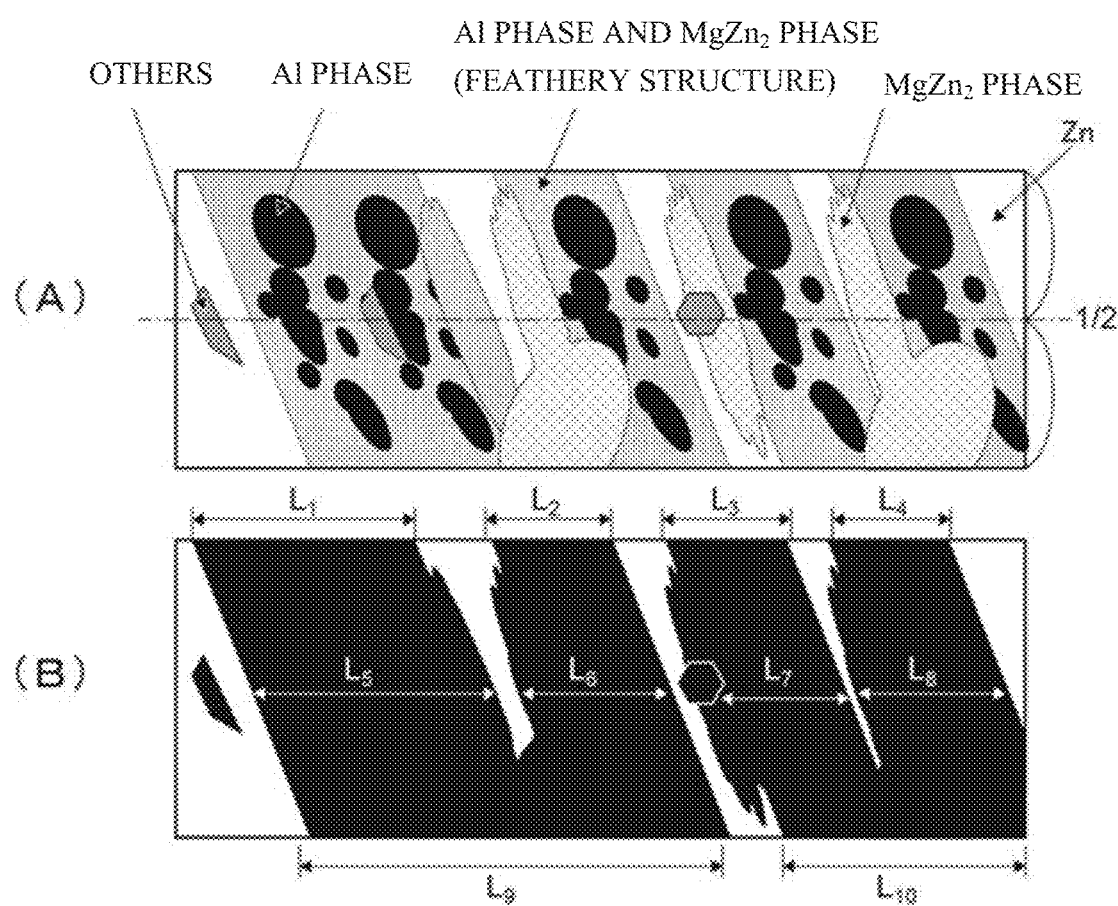
FIGS. 6A and 6B are pattern diagrams for explaining a method of measuring a proportion of lengths occupied by an Al phase and a $MgZn_2$ phase.

In addition, as illustrated in FIG. 6, a structure having a proportion of constant black color (see FIG. 6 (A)) may be binarized by contrast. This is because the Zn—Al—Mg alloy layer includes the Zn phase, the Al phase, and the $MgZn_2$ phase as main constituent phases, and thus only the Zn phase can be distinguished (see FIG. 6 (B)).

Since the magnification is 500 times, when it is not possible to distinguish the intermetallic compound phase, the Al phase, and the $MgZn_2$ phase among the phases of less than 5 μm, conversion into the Al phase and the $MgZn_2$ phase does not cause a problem. This is because the proportion when eventually divided is small. Further, when a phase having a clear size (phase of 5 μm or more) is clearly a phase other than the Al phase and the $MgZn_2$ phase, in a case in which the phase is not surrounded by 360° inside the Al phase or the $MgZn_2$ phase, conversion is performed by excluding the phase from the length.

Here, the interface between the Zn—Al—Mg alloy layer and the steel product and the contour line of the surface of the Zn—Al—Mg alloy layer are preferably a place that can be approximated by a straight line as much as possible. The inclination of the straight line is set within ±2 degrees, and the ratio of the Al phase and the $MgZn_2$ phase in contact with the straight line is determined. A line substantially parallel to the coating layer, at the top and bottom, left and right, and center of the contour line of each of the surface and the interface, corresponds to the center line (i.e., a line connecting positions at one-half of the thickness of the Zn—Al—Mg alloy layer).

This operation is performed in three fields of view, and proportions of lengths of the Al phase and the $MgZn_2$ phase are defined a proportion of lengths occupied by the Al phase and the $MgZn_2$ phase at a surface side of the Zn—Al—Mg alloy layer ($L_{surface}$), a proportion of lengths occupied by the Al phase and the $MgZn_2$ phase at a thickness center of the Zn—Al—Mg alloy layer ($L_{medium}$), and a proportion of lengths occupied by the Al phase and the $MgZn_2$ phase at a steel product side of the Zn—Al—Mg alloy layer ($L_{boarder}$), respectively.

The thickness of the Al—Fe alloy layer is measured as follows.

After embedding the sample in the resin, the sample is polished, and the coating layer of the sample (cross-section cut along the thickness direction of the coating layer) is subjected to SEM backscattered electron imaging, followed by measuring the thickness at optional five points of the identified Al—Fe alloy layer in the SEM backscattered electron image (where a field of view in which the Al—Fe alloy layer is visually recognized at a magnification of 5000 times and a field size of 50 μm in length×200 μm in width). The arithmetic average of the five points is defined as the thickness of the interface alloy layer.

—X-Ray Diffraction (XRD) Measurement Conditions—

Regarding the X-ray diffraction (XRD) intensity, Cu, Co, and the like can be used for the radiation source. However, it is eventually required to calculate and change the diffraction angle according to the Cu radiation source. The X-ray output at 40 kV and 150 mA is set. The measurement range is preferably from 5° to 90°, and the step is preferably about 0.01°. In order to achieve the intensity (cps) at a particular diffraction angle, an average value of around ±0.05° is obtained. In other words, for example, for an intensity of 23.3°, an average value of from 22.25° to 22.35° is obtained. It is necessary to obtain each intensity index by not taking measures such as background removal for clarifying the peak before calculating the average value of intensity.

In order to remove an influence of an oxidation layer as an outermost layer, a coating layer is cut at a depth of 1 μm from a surface, and an X-ray diffraction (XRD) intensity of the surface of the coating layer is measured.

Specific measurement conditions are, for example, as follows.

As a measuring apparatus, for example, an X-ray diffractometer (RINT 1500) and RINT 1000 wide angle goniometer manufactured by Rigaku Corporation is used.

The measurement conditions are, for example, an X-ray output at 40 kV and 150 mA, a scan speed of 2°/min, a step of 0.01°, a scan range of from 5 to 90°, an incident slit of 1°, and a light receiving slit of 1° and 0.15 mm.

(Method of Producing Coated Steel Product)

Next, one example of a method of producing the coated steel product of the disclosure will be described.

The coated steel product of the disclosure is obtained by forming a coating layer on the surface (one surface or both surfaces) of a coating base material (such as a coating base sheet) by the hot-dip coating method.

Specifically, a steel product is subjected to hot-dip coating treatment under the conditions that after raising the steel product from the hot-dip coating bath, the average rate of cooling from the liquidus temperature ($T_{melt}$) of the coating bath to −20° C. of the liquidus temperature (to $T_{melt}$ when $T_{melt}$ is 390° C. or less) is set to 12° C./sec or more by gas impingement cooling, and the average rate of cooling from 370° C. to 150° C. is set to less than 12° C./sec by impinging gas or natural cooling.

Here, the temperature of the hot-dip coating bath is preferably at least the melting point of the coating bath+10° C. or more.

In a case in which a steel product is raised from the hot-dip coating bath and cooled by gas impingement cooling under the conditions that the average rate of cooling from the liquidus temperature ($T_{melt}$) of the coating bath to −20° C. of the liquidus temperature (to $T_{melt}$ when $T_{melt}$ is 390° C. or less) is 12° C./sec or more, the steel product becomes a subcooled state. In general, the formation of nuclei is dominant when the degree of supercooling is high, and growth is dominant when the degree of supercooling is low. Solidification of this coating also follows a general phenomenon of metal deposition. Hence, spangles need to have an appropriate number of nuclei formed and further grow, the cooling rate and the range thereof are control conditions in order to provide a certain degree of supercooling.

However, an excessive level of supercooling results in increase in formation of nuclei, and a level of supercooling closer to the liquidus temperature results in an increase in possibility of precipitation of solidification. Thus, solidification cannot be controlled, and solidification may start from the surface. Therefore, it is preferable to set the upper limit and the lower limit of the average cooling rate in a specific temperature range.

Specifically, in a range of from 410 to 370° C., the average cooling rate is set to 12° C./sec or more and less than 15° C./sec. In other words, since the cooling rate is gradually and gently changed around 390° C., the average cooling rate in the above range needs to be used when cooling in a range of from 410° C. to 370° C., in order to reliably form appropriate spangles on the surface of the coating layer. In a case in which the average cooling rate is out of the above range, the appearance of the surface of the coating layer greatly changes.

Then, after the steel product is raised from the hot-dip coating bath, the steel product is cooled under the conditions that the average rate of cooling from 370° C. to 150° C. is set to less than 12° C./sec by gas impingement cooling or natural cooling, whereby the coating component is slowly cooled. In a case in which the coating component is not slowly cooled from 370° C. to 150° C., the cooling rate is too high, the number of nuclei formed increases, the spangles do not grow (do not appear), and a fine structure is formed.

In the case of not performing cooling under the conditions that the average rate of cooling from 370° C. to 150° C. is set to 4° C./sec or more, this causes precipitation of a compound phase (such as a $Mg_2Zn_{11}$ phase or a $MgZn$ phase) which is likely to be decomposed from a $MgZn_2$ phase into an intermetallic compound which makes the appearance unclear and suppresses the spangle formation in this temperature range. In other words, in the case of being held in a high temperature region for a long time, a compound phase close to the original equilibrium phase is precipitated, so the gray $MgZn_2$ phase illustrated in FIG. 1 is decomposed and the spangle boundary becomes unclear. Thus, the spangle formation is adversely affected. Further, there is an undesirable influence on corrosion resistance.

Furthermore, when the cooling rate is continuously decreased, a large change does not occur in the solidification direction and the nucleus growth direction. However, when the cooling rate is increased (for example, the cooling rate is increased from 7° C./sec to 10° C./sec), irregularities occur in the growth direction, which adversely affects the spangle formation and greatly changes the appearance of the surface of the coating layer. Thus, it is necessary to control subsequent cooling after cooling at 370° C. so that the cooling rate is gradually decreased. In other words, it is necessary not to increase the cooling rate in the process at a temperature of from 370° C. to 150° C.

In particular, a slight increase in the cooling rate tends to adversely affect $(L_{surface})/(L_{boarder})$ in Formula 6, $(L_{medium})/(L_{boarder})$ in Formula 7.

Further, the cooling rate is preferably set to less than 10° C./sec in a temperature of from 325° C. to 300° C. This is because the crystal is more likely to grow at a higher temperature. Hence, it is preferable to slowly cool the crystal in a higher temperature region where the crystal easily grows.

As described above, in the subsequent cooling after cooling at 370° C., the cooling rate that is too slow is not preferable in terms of appearance because the decomposition of the $MgZn_2$ phase proceeds, and the cooling rate that is too fast also adversely affects the spangle formation. Thus, it is necessary to appropriately manage the cooling rate.

Consequently, a coated steel product in which spangles are formed is obtained.

Here, the coated steel product is reheated to remelt the coating layer thereof, whereby all constituent phases disappear and the coated steel product is in the form of liquid phase. Therefore, for example, even in the case of using a coated steel product which has been treated once by quenching or the like, it is possible to obtain the coated steel product of the disclosure in the step of appropriate cooling treatment by reheating in an off-line mode. In this case, it is preferable to set the temperature for reheating the coating layer to immediately above the melting point of a coating bath, which is in a temperature range in which the Al—Fe alloy layer does not excessively grow.

The spangle formation is greatly affected by a solidification reaction (cooling rate) of coating, a position where solidified nuclei are likely to be formed, a heat releasing direction, and the like. In a case in which the cooling rate is maintained, it is easy to form spangles, but an error occurs between samples depending on the line shape, and the spangles are not necessarily formed in the same manner.

This is because the spangle formation may change depending on the gas impinged during cooling and the easiness of cooling of the surface of the coating layer (seasonal factor). In other words, it is difficult to control the spangle formation since the coating layer is solidified starting from the interface of the base metal of the coating layer and the surface of the coating layer, but the spangle growth starting from the surface of the coating layer greatly affects the spangle pattern. Accordingly, the formation and growth of spangles starting from the interface of the base metal of the coating layer is a means of constantly stabilizing the spangle pattern.

In order to solidify the coating layer only by the formation and growth of spangles at the interface of the base metal of the coating layer, it is preferable to cancel the occurrence of solidification of the coating layer surface as a core. In the canceling process, the surface of the coated steel product is firstly reheated. After the heating, the coating layer is exposed again to a high temperature atmosphere from the region where the temperature is less than 370° C., reheated to a coating layer surface temperature of from $T_{melt}$ to $T_{melt}-20°$ C., and held for less than 5 seconds, whereby the solidification of the surface of the coating layer is reliably canceled. Then, the coating layer is cooled again according to the temperature history, so that it is possible to form a coating layer mainly resulted from formation and growth of solidified nuclei at the interface, and the spangle pattern is stabilized in any case. In a case in which the coating layer is held for 5 seconds or more, all the coating layers are dissolved, and thus it is necessary to perform the cooling step again after short time holding.

In addition, the average rate of cooling from the liquidus temperature ($T_{melt}$) of the coating bath to 370° C. (within $T_{melt}+10°$ C. when $T_{melt}$ is 390° C. or less) may be set to $12\pm5°$ C./sec in a cooling rate shift temperature range.

The ability to form spangles varies depending on the selection of the appropriate chemical composition of the coating layer. As described above, the chemical composition of the coating layer is preferably close to the Al—$MgZn_2$ eutectic line. In other words, as the Mg concentration of the coating layer is closer to the median of Formula 5, the ability to form spangles is higher, and various methods can be applied without being limited to the above methods. Conversely, when the Mg concentration of the coating layer deviates from the median of Formula 5, the ability to form spangles decreases, and the production method is limited. Unless the production method is the above-described method, it is not possible to form spangles.

Hereinafter, a post-treatment that can be applied to the coated steel product of the disclosure will be described.

A film may be formed on the coating layer of the coated steel product of the disclosure. A film having one or more layers can be formed. Examples of a film formed immediately above the coating layer include, for example, a chromate film, a phosphate film, and a chromate-free film. Chromate treatment, phosphate treatment, and chromate-free treatment for forming these films can be carried out by known methods.

Examples of chromate treatment include electrolytic chromate treatment to form a chromate film by electrolysis, reactive chromate treatment to form a film using a reaction with a material and then wash away an excess treatment solution, and coating-type chromate treatment to apply a treatment solution to a coated object and dry the solution to form a film without washing with water. Any of the treatments can be adopted.

An example of electrolytic chromate treatment is electrolytic chromate treatment using chromic acid, silica sol, a resin (such as phosphoric acid, acrylic resin, vinyl ester resin, vinyl acetate acrylic emulsion, carboxyl styrene butadiene latex, or diisopropanolamine modified epoxy resin), and hard silica.

Examples of the phosphate treatment include zinc phosphate treatment, zinc calcium phosphate treatment, and manganese phosphate treatment.

The chromate-free treatment is particularly suitable because it is free of environmental burden. Examples of the chromate-free treatment include electrolytic chromate-free treatment to form a chromate-free film by electrolysis, reactive chromate-free treatment to form a film using a reaction with a material and then wash away an excess treatment solution, and coating-type chromate-free treatment to apply a treatment solution to a coated object and dry the solution to form a film without washing with water. Any of the treatments can be adopted.

In addition, one or more layers of an organic resin film may be provided on the film immediately above the coating layer. The organic resin is not limited to a specific type, and examples thereof include polyester resin, polyurethane resin, epoxy resin, acrylic resin, polyolefin resin, and denatured products of these resins. Here, the term "denatured product" refers to a resin obtained by reacting a reactive functional group contained in the structure of any of these resins with a different compound (such as a monomer or a crosslinking agent) containing a functional group capable of reacting with the functional group.

As such an organic resin, one or more types of organic resins (non-denatured) may be mixed for use, or one or more types of organic resins obtained by denaturing at least one different organic resin in the presence of at least one organic resin may be mixed for use. In addition, an organic resin film may optionally contain a coloring pigment and an antirust pigment. It is also possible to use a water-based organic resin obtained by dissolving or dispersing the resin in water.

EXAMPLES

Hereinafter, the disclosure will be described more specifically with reference to Examples. However, each of the Examples does not limit the disclosure.

Example A

In order to obtain coating layers of the chemical compositions shown in Tables 1 and 2, a predetermined amount of pure metal ingot was used and melted in a vacuum melting furnace, followed by initial make-up of coating bath in the air. For producing coated steel sheets, a batch type hot dip coating apparatus was used.

As a coating base sheet, a 3.2-mm-thick hot-rolled steel sheet (mill scale material) (chemical composition: C concentration=0.16%, Si concentration=0.01%, Mn concentration=0.44%, P concentration=0.017%, S concentration=0.008%), specified in JIS G 3131, was used.

Degreasing and pickling (specifically, the steel sheet was pickled by immersing the steel sheet in a 10% aqueous HCl solution at 70° C. for 5 minutes) were performed on the hot-rolled steel sheet immediately before the coating step, as a result of which the mill scale on the surface was peeled off. The hot-rolled steel sheet from which the mill scale on the surface had been peeled off was washed with water and dried, and then the hot-rolled steel sheet was brought into a state in which there were no significant appearance defects.

In any coated steel sheet production, the same reduction treatment method was applied to the coating base sheet until immersion in the coating bath. In other words, the coating base sheet was heated from room temperature to 800° C. by electric heating in a $N_2$—$H_2$ (5%) environment (dew point of −40° C. or less, oxygen concentration of less than 25 ppm), retained for 60 seconds, cooled to the coating bath temperature+10° C. by $N_2$ gas spraying, and immediately immersed in the coating bath. The immersion time of any coated steel product in the coating bath was set to 5 seconds. The $N_2$ gas wiping pressure was adjusted and the coating step was performed so that the thickness of the coating layer was 30 μm (±1 μm), whereby a coated steel sheet was produced.

Then, the following five coating steps were performed according to Tables 1 and 2.

Production method A: The coating bath temperature was adjusted to the liquidus temperature ($T_{melt}$) of the coating bath+a temperature of from 20° C. to 50° C. Then, a coating base sheet is subjected to hot-dip coating treatment under the conditions that after raising the coating base sheet from the hot-dip coating bath, the average rate of cooling from the liquidus temperature of the coating bath to −20° C. of the liquidus temperature is set to 12° C./sec or more (from 12 to 30° C./sec) by impinging gas, and the average rate of cooling from 370° C. to 150° C. is set to less than 12° C./sec and 4° C./sec or more by impinging gas or natural cooling (acceptable range).

In this regard, the average cooling rate in a temperature range of from 410° C. to 370° C. was 12° C. or more and less than 15° C./sec.

Further, the cooling rate from 370° C. to the completion of the production of the coated steel sheet was controlled to be decreased and not to be increased in the cooling process.

Production method B: The coating bath temperature is set to the liquidus temperature ($T_{melt}$) of the coating bath+a temperature of from 0° C. to 20° C. Then, a coating base sheet is subjected to hot-dip coating treatment under the conditions that after raising the coating base sheet from the hot-dip coating bath, the average rate of cooling from the liquidus temperature ($T_{melt}$) of the coating bath to −20° C. of the liquidus temperature (to $T_{melt}$ when $T_{melt}$ is 390° C. or less) is set to 12° C./sec or more (from 12 to 30° C./sec) by impinging gas, and the average rate of cooling from 370° C. to 150° C. is set to less than 12° C./sec and 4° C./sec or more by impinging gas or natural cooling.

In this regard, the average cooling rate in a temperature range of from 410° C. to 370° C. was 12° C. or more and less than 15° C./sec.

Further, the cooling rate from 370° C. to the completion of the production of the coated steel sheet was controlled to be decreased and not to be increased in the cooling process.

Production method B1: The coating bath temperature is set to the liquidus temperature ($T_{melt}$) of the coating bath+a temperature of from 0° C. to 20° C. Then, a coating base sheet is subjected to hot-dip coating treatment under the conditions that after raising the coating base sheet from the hot-dip coating bath, the average rate of cooling from the liquidus temperature ($T_{melt}$) of the coating bath to −20° C. of the liquidus temperature (to $T_{melt}$ when $T_{melt}$ is 390° C. or less) is set to 12° C./sec or more (from 12 to 30° C./sec) by impinging gas, the average rate of cooling from 370° C. to 300° C. is set to less than 12° C./sec and 4° C./sec or more by impinging gas or natural cooling, and the gas pressure is increased during the process so that the average rate of cooling from 300° C. to 150° C. is within a range of from 12 to 15° C./sec.

In this regard, the average cooling rate in a temperature range of from 410° C. to 370° C. was 12° C. or more and less than 15° C./sec.

Production method B2: The coating bath temperature is set to the liquidus temperature ($T_{melt}$) of the coating bath+a temperature of from 0° C. to 20° C. Then, a coating base sheet is subjected to hot-dip coating treatment under the conditions that after raising the coating base sheet from the hot-dip coating bath, the average rate of cooling from the liquidus temperature ($T_{melt}$) of the coating bath to −20° C. of the liquidus temperature (to $T_{melt}$ when $T_{melt}$ is 390° C. or less) is set to 12° C./sec or more (from 12 to 30° C./sec) by impinging gas, and the average rate of cooling from 370° C. to 150° C. is set to less than 4° C./sec by cooling in an infrared heating furnace.

In this regard, the average cooling rate in a temperature range of from 410° C. to 370° C. was 12° C. or more and less than 15° C./sec.

Further, the cooling rate from 370° C. to the completion of the production of the coated steel sheet was controlled to be decreased and not to be increased in the cooling process.

Production method C: The coating bath temperature is set to the liquidus temperature ($T_{melt}$) of the coating bath+a temperature of from 0° C. to 20° C. Then, a coating base sheet is subjected to hot-dip coating treatment under the conditions that after raising the coating base sheet from the hot-dip coating bath, the average rate of cooling from the liquidus temperature ($T_{melt}$) of the coating bath to −20° C. of the liquidus temperature (to $T_{melt}$ when $T_{melt}$ is 390° C. or less) is set to less than 12° C./sec (from 0.1 to 11.9° C./sec) by impinging gas or natural cooling, and the average rate of cooling from 370° C. to 150° C. is set to less than 12° C./sec and 4° C./sec or more by impinging gas or natural cooling.

Production method D: The coating bath temperature is set to the liquidus temperature ($T_{melt}$) of the coating bath+a temperature of from 0° C. to 20° C. Then, a coating base sheet is subjected to hot-dip coating treatment under the conditions that after raising the coating base sheet from the hot-dip coating bath, the average rate of cooling from the liquidus temperature ($T_{melt}$) of the coating bath to −20° C. of the liquidus temperature (to $T_{melt}$ when $T_{melt}$ is 390° C. or less) is set to 12° C./sec or more (from 12 to 30° C./sec) by impinging gas, and the average rate of cooling from 370° C. to 150° C. is set to less than 12° C./sec or more (from 12 to 20° C./sec) by impinging gas.

Production method E: The coating bath temperature is set to the liquidus temperature ($T_{melt}$) of the coating bath+a temperature of from 0° C. to 20° C. Then, a coating base sheet is subjected to hot-dip coating treatment under the conditions that after raising the coating base sheet from the hot-dip coating bath, the average rate of cooling from the liquidus temperature ($T_{melt}$) of the coating bath to −20° C. of the liquidus temperature (to $T_{melt}$ when $T_{melt}$ is 390° C. or less) is set to 12° C./sec or more (from 12 to 30° C./sec) by impinging gas, and the average rate of cooling from 370° C. to 150° C. is set to 12° C./sec or more (from 12 to 20° C./sec) by impinging mist.

Production method F: The coating bath temperature is set to the liquidus temperature ($T_{melt}$) of the coating bath+a temperature of from 0° C. to 20° C. Then, a coating base sheet is subjected to hot-dip coating treatment under the conditions that after raising the coating base sheet from the hot-dip coating bath, the average rate of cooling from the liquidus temperature ($T_{melt}$) of the coating bath to 150° C. of the liquidus temperature is set to 12° C./sec or more (from 12 to 30° C./sec) by impinging mist.

Production method G: The coating bath temperature is set to the liquidus temperature ($T_{melt}$) of the coating bath+20° C. Then, a coating base sheet is subjected to hot-dip coating treatment under the conditions that after raising the coating base sheet from the hot-dip coating bath, the average rate of cooling from the liquidus temperature ($T_{melt}$) of the coating bath to −20° C. of the liquidus temperature (to $T_{melt}$ when $T_{melt}$ is 390° C. or less) is set to 12° C./sec or more (from 30 to 50° C./sec) by impinging mist, and the average rate of cooling from 370° C. or more is set to less than 12° C./sec (from 0.1 to 11.9° C./sec) by impinging gas or natural cooling.

(Evaluation)
—Various Measurements—

A sample was cut out from each resulting coated steel sheet. Then, the following items were measured according to the method described above.

Total area proportion of the Al phase and the $MgZn_2$ phase (written as "Al+$MgZn_2$" in Tables)

Area proportion of the Zn phase (written as "Zn" in Tables)

Area proportion of the structure other than the Al phase, the $MgZn_2$ phase, and the Zn phase (written as "others" in Tables)

Average value of cumulative circumferential lengths of Al phase (written as "Al phase circumferential length" in Tables)

Total frequency in number of the Al phase having a circumferential length of 50 μm or more (written as "frequency in number of Al phase" in Tables). Note that the total frequency in number of the Al phase was written in Tables on the basis of NG=more than 100, G3=less than 100, G2=less than 50, and G1=less than 10.

Proportion of lengths occupied by the Al phase and the $MgZn_2$ phase at the surface side of the Zn—Al—Mg alloy layer ($L_{surface}$)

Proportion of lengths occupied by the Al phase and the $MgZn_2$ phase at a thickness center of the Zn—Al—Mg alloy layer ($L_{medium}$)

Proportion of lengths occupied by the Al phase and the MgZn$_2$ phase at a steel product side of the Zn—Al—Mg alloy layer (L$_{boarder}$)

When (L$_{surface}$)/(L$_{boarder}$) satisfied Formula 6, it was written as "OK", and when (L$_{surface}$)/(L$_{boarder}$) did not satisfy Formula 6, it was written as "NG".

Similarly, when (L$_{medium}$)/(L$_{boarder}$) satisfied Formula 7, it was written as "OK", and when (L$_{medium}$)/(L$_{boarder}$) did not satisfy Formula 7, it was written as "NG".

Further, when the chemical composition of the coating layer satisfied Formula 5, it was written as "OK", and when the chemical composition did not satisfy Formula 7, it was written as "NG".

A 20×20 mm square was cut out from each resulting coated steel sheet and an X-ray diffraction image from the surface of the coating layer was obtained. Measurement conditions included the use of an X-ray diffractometer (RINT 1500) and RINT 1000 wide angle goniometer, manufactured by Rigaku Corporation with an X-ray output at 40 kV and 150 mA, a scan speed of 2°/min, and a step of 0.01°, and a scan range of from 5° to 90°. The incident slit was 1°, and the light receiving slit was 1° and 0.15 mm. The coated steel sheet used for identifying the Mg—Sn intermetallic compound, in which an XRD diffraction peak intensity was observed to be 1000 cps or more at 22.8° or an intensity difference of 500 cps was confirmed as compared with the background, was defined as "OK". In all of the resulting coated steel sheets, the Mg—Sn intermetallic compound was detected.

From the observation of the SEM backscattered electron image, it was confirmed that the Mg—Sn intermetallic compound was contained in the Zn phase in all the resulting coated steel sheets.

—Determination of Presence of Spangles—

Each resulting coated steel sheet was visually observed to determine the presence of spangles.

In a case in which the coated steel sheet is visually observed and spangles are formed at an area proportion of 90% or more in a region of at least 100 mm×100 mm, it is considered that the coated steel sheet has spangles, and the result is expressed as "OK" in the table.

Meanwhile, in a case in which, as a result of the visual observation of the coated steel sheet, at least the area proportion of the region of 100 mm×100 mm was 90% or more, the coated steel sheet had a metal specular surface, a portion corresponding to the metal specular surface (surface which had a relatively high specular reflectance and was slightly unclear like a mirror surface and in which an image of an object on the coated steel sheet was reflected on the coating surface, or had a low reflectance appearance (a poor white or gray appearance in which the reflectance was low and no image was reflected), or a portion corresponding to the spangle was not visually confirmed, it was determined that there was no spangle, and it was written as "NG" in Tables.

—Effect of Concealing Appearance Defects (Investigation of 10×10 Grid)—

In order to determine the presence of spangles, the observed region of 100 mm×100 mm was further divided into 100 square grids with sizes of 10 mm×10 mm. Further, in a case in which non-coating, a metal specular surface, a portion corresponding to the metal specular surface, a low reflectance appearance portion, dripping due to wiping spots, an uneven pattern, and the like are visually confirmed at one or more places with a size of 1 mm or more even when spangles are formed inside each grid, the case is counted as 1. Based on the index, a count number of 5 or more is rated as "B", a count number of from 5 to 3 is rated as "G3", a count number of 3 or 2 is rated as "G2", and a count number of 1 or 0 is rated as "G1".

—Investigation of Appearance—

Each resulting coated steel sheet was cut into a size of 100×100 mm, and each cut sample was left to stand in an environment of 72 hours, 95% RH, and 40° C. The color space (L*a*b* color system) of CIELAB (in accordance with JIS Z 8729) before and after the test was measured. Then, evaluation was performed according to the following criteria.

As a measuring apparatus, a spectrophotometric colorimeter manufactured by Konica Minolta, Inc. (CM 2500d, measurement diameter; 8 φ, light source; 10°/D65 in an SCI mode) was used.

A++: ΔE* is less than 2.
A+: ΔE* is 2 or more and 3 or less.
A: ΔE* is more than 3 and 5 or less.
B: ΔE* is more than 5.

—Investigation of Corrosion Resistance Balance—

Each resulting coated steel sheet was cut into a size of 3.2 mm×100×50 mm, and each cut sample was subjected to 30 cycles of a JASO test in accordance with a neutral salt water spray cycle test (JIS H 8502). Of the cut end surface portion and the four end surfaces of the sample, the upper surface and the lower surface were subjected to sealing coating, and the side surface was polished until mirror finishing was completed. The vertical surface of the cut end surface portion was subjected to image analysis to measure the red rust formation area percentage in a width of 3.2×100 mm (the cut end surface portion had 300 mesh, and occurrence of red rust was visually observed). Further, the maximum distance of formed white rust from the cut end surface portion as the surface for coating evaluation was measured. Then, evaluation was performed according to the following criteria.

A++: Red rust formation area is less than 15%
A++: Maximum distance of formed white rust is less than 1 mm
A+: Red rust formation area is less than 25%
A+: Maximum distance of formed white rust is less than 2 mm
A: Red rust formation area is less than 35%
A: Maximum distance of formed white rust is less than 3 mm
B: Red rust formation area is 35% or more
B: Maximum distance of formed white rust is 3 mm or more In the evaluation based on the above criteria, either the red rust formation area or the maximum distance of formed white rust, whichever is worse, is adopted.

TABLE 1-1

| No. | Classification | Tmelt (° C.) | Production method | Zn | Al | Mg | Sn group |||| Ca group ||||
|---|---|---|---|---|---|---|---|---|---|---|---|---|---|---|
| | | | | | | | Sn | Bi | In | Ca | Y | La | Ce | Si |
| 1 | Comparative Example | 385 | B | 91.4 | 5 | 3 | 0.5 | 0 | 0 | 0 | 0 | 0 | 0 | 0 |
| 2 | Comparative Example | 385 | B | 90.9 | 5 | 3.5 | 0.5 | 0 | 0 | 0 | 0 | 0 | 0 | 0 |
| 3 | Comparative Example | 380 | B | 90.4 | 6 | 3 | 0.5 | 0 | 0 | 0 | 0 | 0 | 0 | 0 |
| 4 | Example | 380 | B | 90.15 | 6 | 3.5 | 0.05 | 0 | 0 | 0 | 0 | 0 | 0 | 0 |

TABLE 1-1-continued

|  |  | Tmelt | Production |  |  |  | Sn group | | | Ca group | | | | |
| No. | Classification | (° C.) | method | Zn | Al | Mg | Sn | Bi | In | Ca | Y | La | Ce | Si |
| --- | --- | --- | --- | --- | --- | --- | --- | --- | --- | --- | --- | --- | --- | --- |
| 5 | Example | 380 | B | 89.82 | 6 | 3.5 | 0.08 | 0 | 0 | 0 | 0 | 0 | 0 | 0 |
| 6 | Example | 380 | B | 90 | 6 | 3.5 | 0.1 | 0 | 0 | 0 | 0 | 0 | 0 | 0 |
| 7 | Example | 380 | B | 90.17 | 6 | 3.5 | 0.13 | 0 | 0 | 0 | 0 | 0 | 0 | 0.1 |
| 8 | Example | 380 | B | 90.15 | 6 | 3.5 | 0.15 | 0 | 0 | 0 | 0 | 0 | 0 | 0.1 |
| 9 | Example | 380 | B | 90.1 | 6 | 3.5 | 0.2 | 0 | 0 | 0 | 0 | 0 | 0 | 0.1 |
| 10 | Example | 380 | B | 90 | 6 | 3.5 | 0.35 | 0 | 0 | 0 | 0 | 0 | 0 | 0.05 |
| 11 | Example | 380 | B | 89.95 | 6 | 3.5 | 0.4 | 0 | 0 | 0 | 0 | 0 | 0 | 0.05 |
| 12 | Example | 380 | B | 89.9 | 6 | 3.5 | 0.45 | 0 | 0 | 0 | 0 | 0 | 0 | 0.05 |
| 13 | Example | 380 | A | 89.9 | 6 | 3.5 | 0.5 | 0 | 0 | 0 | 0 | 0 | 0 | 0 |
| 14 | Example | 380 | B | 89.9 | 6 | 3.5 | 0.5 | 0 | 0 | 0 | 0 | 0 | 0 | 0 |
| 15 | Comparative Example | 380 | C | 89.9 | 6 | 3.5 | 0.5 | 0 | 0 | 0 | 0 | 0 | 0 | 0 |
| 16 | Comparative Example | 380 | D | 89.9 | 6 | 3.5 | 0.5 | 0 | 0 | 0 | 0 | 0 | 0 | 0 |
| 17 | Comparative Example | 380 | E | 89.9 | 6 | 3.5 | 0.5 | 0 | 0 | 0 | 0 | 0 | 0 | 0 |
| 18 | Comparative Example | 380 | F | 89.9 | 6 | 3.5 | 0.5 | 0 | 0 | 0 | 0 | 0 | 0 | 0 |
| 19 | Comparative Example | 380 | G | 89.9 | 6 | 3.5 | 0.5 | 0 | 0 | 0 | 0 | 0 | 0 | 0 |
| 20 | Comparative Example | 380 | B | 89.4 | 6 | 4 | 0.5 | 0 | 0 | 0 | 0 | 0 | 0 | 0 |
| 21 | Example | 390 | C | 87.4 | 8 | 4 | 0.5 | 0 | 0 | 0 | 0 | 0 | 0 | 0 |
| 22 | Comparative Example | 420 | B | 86.3 | 8 | 5 | 0.5 | 0 | 0 | 0.1 | 0 | 0 | 0 | 0 |
| 23 | Example | 410 | B | 84.9 | 10 | 4 | 0.5 | 0 | 0 | 0.1 | 0 | 0 | 0 | 0.1 |
| 24 | Example | 420 | B | 83.9 | 10 | 5 | 0.5 | 0 | 0 | 0.1 | 0 | 0 | 0 | 0.1 |
| 25 | Comparative Example | 440 | B | 82.9 | 10 | 6 | 0.5 | 0 | 0 | 0.1 | 0 | 0 | 0 | 0.1 |
| 26 | Comparative Example | 420 | B | 82 | 12 | 4 | 1 | 0 | 0 | 0.3 | 0 | 0 | 0 | 0.3 |
| 27 | Example | 430 | B | 80 | 12 | 6 | 1 | 0 | 0 | 0.3 | 0 | 0 | 0 | 0.3 |
| 28 | Comparative Example | 450 | B | 78 | 12 | 8 | 1 | 0 | 0 | 0.3 | 0 | 0 | 0 | 0.3 |
| 29 | Comparative Example | 440 | B | 79.6 | 14 | 4 | 1 | 0 | 0 | 0.5 | 0 | 0 | 0 | 0.5 |
| 30 | Example | 450 | B | 77.6 | 14 | 6 | 1 | 0 | 0 | 0.5 | 0 | 0 | 0 | 0.5 |
| 31 | Example | 450 | B | 78.3 | 14 | 6 | 0.8 | 0 | 0 | 0.2 | 0 | 0 | 0 | 0.3 |
| 32 | Example | 450 | B | 78.5 | 14 | 6 | 0.6 | 0 | 0 | 0.2 | 0 | 0 | 0 | 0.3 |
| 33 | Example | 450 | B | 78.7 | 14 | 6 | 0.4 | 0 | 0 | 0.2 | 0 | 0 | 0 | 0.3 |
| 34 | Comparative Example | 470 | B | 75.6 | 14 | 8 | 1 | 0 | 0 | 0.5 | 0 | 0 | 0 | 0.5 |
| 35 | Comparative Example | 440 | B | 77.7 | 16 | 4 | 1 | 0 | 0 | 0.5 | 0 | 0 | 0 | 0.2 |
| 36 | Example | 460 | B | 74.7 | 16 | 7 | 1 | 0 | 0 | 0.5 | 0 | 0 | 0 | 0.2 |
| 37 | Comparative Example | 480 | B | 71.7 | 16 | 10 | 1 | 0 | 0 | 0.5 | 0 | 0 | 0 | 0.2 |
| 38 | Example | 470 | B | 77.33 | 17 | 5.5 | 0.01 | 0 | 0 | 0.01 | 0 | 0 | 0 | 0.05 |
| 39 | Example | 470 | B | 77.28 | 17 | 5.5 | 0.01 | 0 | 0 | 0.03 | 0.01 | 0.01 | 0.01 | 0.05 |
| 40 | Example | 470 | B | 77.29 | 17 | 5.5 | 0.03 | 0 | 0 | 0.03 | 0 | 0 | 0 | 0.05 |
| 41 | Example | 470 | B | 77.24 | 17 | 5.5 | 0.03 | 0 | 0 | 0.05 | 0.01 | 0.01 | 0.01 | 0.05 |
| 42 | Example | 470 | B | 77.25 | 17 | 5.5 | 0.05 | 0 | 0 | 0.05 | 0 | 0 | 0 | 0.05 |
| 43 | Example | 470 | B | 77.23 | 17 | 5.5 | 0.05 | 0 | 0 | 0.07 | 0 | 0 | 0 | 0.05 |
| 44 | Example | 470 | B | 77.17 | 17 | 5.5 | 0.05 | 0 | 0 | 0.13 | 0 | 0 | 0 | 0.05 |
| 45 | Example | 470 | B | 77.1 | 17 | 5.5 | 0.05 | 0 | 0 | 0.2 | 0 | 0 | 0 | 0.05 |
| 46 | Example | 470 | B | 77 | 17 | 5.5 | 0.05 | 0 | 0 | 0.3 | 0 | 0 | 0 | 0.05 |
| 47 | Example | 470 | B | 76.85 | 17 | 5.5 | 0.05 | 0 | 0 | 0.45 | 0 | 0 | 0 | 0.05 |
| 48 | Example | 470 | B | 76.8 | 17 | 5.5 | 0.05 | 0 | 0 | 0.5 | 0 | 0 | 0 | 0.05 |
| 49 | Example | 460 | B | 75.65 | 18 | 6 | 0.15 | 0 | 0 | 0.05 | 0 | 0 | 0 | 0.05 |
| 50 | Example | 460 | B | 75.63 | 18 | 6 | 0.15 | 0 | 0 | 0.07 | 0 | 0 | 0 | 0.05 |
| 51 | Comparative Example | 460 | B1 | 75.63 | 18 | 6 | 0.15 | 0 | 0 | 0.07 | 0 | 0 | 0 | 0.05 |
| 52 | Comparative Example | 460 | B2 | 75.63 | 18 | 6 | 0.15 | 0 | 0 | 0.07 | 0 | 0 | 0 | 0.05 |
| 53 | Example | 460 | B | 75.57 | 18 | 6 | 0.15 | 0 | 0 | 0.13 | 0 | 0 | 0 | 0.05 |
| 54 | Example | 460 | B | 75.5 | 18 | 6 | 0.15 | 0 | 0 | 0.2 | 0 | 0 | 0 | 0.05 |
| 55 | Example | 460 | B | 75.4 | 18 | 6 | 0.15 | 0 | 0 | 0.3 | 0 | 0 | 0 | 0.05 |
| 56 | Example | 460 | B | 75.25 | 18 | 6 | 0.15 | 0 | 0 | 0.45 | 0 | 0 | 0 | 0.05 |
| 57 | Example | 460 | B | 75.2 | 18 | 6 | 0.15 | 0 | 0 | 0.5 | 0 | 0 | 0 | 0.05 |
| 58 | Example | 450 | B | 72.2 | 19 | 6 | 1.5 | 0 | 0 | 0.5 | 0 | 0 | 0 | 0.2 |
| 59 | Example | 450 | B | 73.4 | 19 | 6 | 0.7 | 0 | 0 | 0.2 | 0 | 0 | 0 | 0.1 |
| 60 | Example | 450 | B | 73.6 | 19 | 6 | 0.5 | 0 | 0 | 0.2 | 0 | 0 | 0 | 0.1 |
| 61 | Example | 450 | B | 73.8 | 19 | 6 | 0.3 | 0 | 0 | 0.2 | 0 | 0 | 0 | 0.1 |
| 62 | Example | 450 | B | 73.9 | 19 | 6 | 0.2 | 0 | 0 | 0.2 | 0 | 0 | 0 | 0.1 |
| 63 | Example | 450 | B | 74 | 19 | 6 | 0.1 | 0 | 0 | 0.2 | 0 | 0 | 0 | 0.1 |
| 64 | Example | 450 | B | 74.05 | 19 | 6 | 0.05 | 0 | 0 | 0.2 | 0 | 0 | 0 | 0.1 |
| 65 | Example | 460 | B | 69.2 | 19 | 9 | 1.5 | 0 | 0 | 0.5 | 0 | 0 | 0 | 0.2 |
| 66 | Example | 470 | B | 73.05 | 20 | 6.5 | 0.2 | 0 | 0 | 0.05 | 0 | 0 | 0 | 0.1 |
| 67 | Example | 470 | B | 73.03 | 20 | 6.5 | 0.2 | 0 | 0 | 0.07 | 0 | 0 | 0 | 0.1 |
| 68 | Example | 470 | B | 72.95 | 20 | 6.5 | 0.2 | 0 | 0 | 0.13 | 0 | 0.01 | 0.01 | 0.1 |
| 69 | Example | 470 | B | 72.88 | 20 | 6.5 | 0.2 | 0 | 0 | 0.2 | 0 | 0.01 | 0.01 | 0.1 |
| 70 | Example | 470 | B | 72.78 | 20 | 6.5 | 0.2 | 0 | 0 | 0.3 | 0 | 0.01 | 0.01 | 0.1 |
| 71 | Example | 471 | B | 72.9 | 20 | 6.5 | 0.2 | 0 | 0 | 0.3 | 0 | 0 | 0 | 0 |

TABLE 1-2

| No. | Classification | Cr group | | | | | | | | Sr group | | | | Total of Cr group | Total of Sr group | XRD Mg2Sn |
|---|---|---|---|---|---|---|---|---|---|---|---|---|---|---|---|---|
| | | Cr | Ti | Ni | Co | V | Nb | Cu | Mn | Fe | Sr | Sb | Pb | B | | | |
| 1 | Comparative Example | 0 | 0 | 0 | 0 | 0 | 0 | 0 | 0 | 0.1 | 0 | 0 | 0 | 0 | 0 | 0 | OK |
| 2 | Comparative Example | 0 | 0 | 0 | 0 | 0 | 0 | 0 | 0 | 0.1 | 0 | 0 | 0 | 0 | 0 | 0 | OK |
| 3 | Comparative Example | 0 | 0 | 0 | 0 | 0 | 0 | 0 | 0 | 0.1 | 0 | 0 | 0 | 0 | 0 | 0 | OK |
| 4 | Example | 0 | 0.1 | 0 | 0 | 0 | 0 | 0 | 0 | 0.1 | 0 | 0 | 0.1 | 0 | 0 | 0.1 | OK |
| 5 | Example | 0 | 0 | 0.1 | 0 | 0 | 0 | 0 | 0 | 0.1 | 0 | 0 | 0.4 | 0 | 0 | 0.4 | OK |
| 6 | Example | 0.1 | 0 | 0 | 0 | 0 | 0 | 0 | 0 | 0.1 | 0 | 0 | 0.2 | 0 | 0 | 0.2 | OK |
| 7 | Example | 0 | 0 | 0 | 0 | 0 | 0 | 0 | 0 | 0.1 | 0 | 0 | 0 | 0 | 0 | 0 | OK |
| 8 | Example | 0 | 0 | 0 | 0 | 0 | 0 | 0 | 0 | 0.1 | 0 | 0 | 0 | 0 | 0 | 0 | OK |
| 9 | Example | 0 | 0 | 0 | 0 | 0 | 0 | 0 | 0 | 0.1 | 0 | 0 | 0 | 0 | 0 | 0 | OK |
| 10 | Example | 0 | 0 | 0 | 0 | 0 | 0 | 0 | 0 | 0.1 | 0 | 0 | 0 | 0 | 0 | 0 | OK |
| 11 | Example | 0 | 0 | 0 | 0 | 0 | 0 | 0 | 0 | 0.1 | 0 | 0 | 0 | 0 | 0 | 0 | OK |
| 12 | Example | 0 | 0 | 0 | 0 | 0 | 0 | 0 | 0 | 0.1 | 0 | 0 | 0 | 0 | 0 | 0 | OK |
| 13 | Example | 0 | 0 | 0 | 0 | 0 | 0 | 0 | 0 | 0.1 | 0 | 0 | 0 | 0 | 0 | 0 | OK |
| 14 | Example | 0 | 0 | 0 | 0 | 0 | 0 | 0 | 0 | 0.1 | 0 | 0 | 0 | 0 | 0 | 0 | OK |
| 15 | Comparative Example | 0 | 0 | 0 | 0 | 0 | 0 | 0 | 0 | 0.1 | 0 | 0 | 0 | 0 | 0 | 0 | OK |
| 16 | Comparative Example | 0 | 0 | 0 | 0 | 0 | 0 | 0 | 0 | 0.1 | 0 | 0 | 0 | 0 | 0 | 0 | OK |
| 17 | Comparative Example | 0 | 0 | 0 | 0 | 0 | 0 | 0 | 0 | 0.1 | 0 | 0 | 0 | 0 | 0 | 0 | OK |
| 18 | Comparative Example | 0 | 0 | 0 | 0 | 0 | 0 | 0 | 0 | 0.1 | 0 | 0 | 0 | 0 | 0 | 0 | OK |
| 19 | Comparative Example | 0 | 0 | 0 | 0 | 0 | 0 | 0 | 0 | 0.1 | 0 | 0 | 0 | 0 | 0 | 0 | OK |
| 20 | Comparative Example | 0 | 0 | 0 | 0 | 0 | 0 | 0 | 0 | 0.1 | 0 | 0 | 0 | 0 | 0 | 0 | OK |
| 21 | Example | 0 | 0 | 0 | 0 | 0 | 0 | 0 | 0 | 0.1 | 0 | 0 | 0 | 0 | 0 | 0 | OK |
| 22 | Comparative Example | 0 | 0 | 0 | 0 | 0 | 0 | 0 | 0 | 0.1 | 0 | 0 | 0 | 0 | 0 | 0 | OK |
| 23 | Example | 0.1 | 0 | 0 | 0 | 0 | 0 | 0 | 0 | 0.1 | 0.2 | 0 | 0 | 0 | 0.1 | 0.2 | OK |
| 24 | Example | 0.1 | 0 | 0 | 0 | 0 | 0 | 0 | 0 | 0.1 | 0.2 | 0 | 0 | 0 | 0.1 | 0.2 | OK |
| 25 | Comparative Example | 0.1 | 0 | 0 | 0 | 0 | 0 | 0 | 0 | 0.1 | 0.2 | 0 | 0 | 0 | 0.1 | 0.2 | OK |
| 26 | Comparative Example | 0 | 0.1 | 0 | 0 | 0 | 0 | 0 | 0 | 0.1 | 0 | 0.2 | 0 | 0 | 0.1 | 0.2 | OK |
| 27 | Example | 0 | 0.1 | 0 | 0 | 0 | 0 | 0 | 0 | 0.1 | 0 | 0.2 | 0 | 0 | 0.1 | 0.2 | OK |
| 28 | Comparative Example | 0 | 0.1 | 0 | 0 | 0 | 0 | 0 | 0 | 0.1 | 0 | 0.2 | 0 | 0 | 0.1 | 0.2 | OK |
| 29 | Comparative Example | 0 | 0 | 0.1 | 0 | 0 | 0 | 0 | 0 | 0.1 | 0 | 0 | 0.2 | 0 | 0.1 | 0.2 | OK |
| 30 | Example | 0 | 0 | 0.1 | 0 | 0 | 0 | 0 | 0 | 0.1 | 0 | 0 | 0.2 | 0 | 0.1 | 0.2 | OK |
| 31 | Example | 0 | 0 | 0.1 | 0 | 0 | 0 | 0 | 0 | 0.1 | 0 | 0 | 0.2 | 0 | 0.1 | 0.2 | OK |
| 32 | Example | 0 | 0 | 0.1 | 0 | 0 | 0 | 0 | 0 | 0.1 | 0 | 0 | 0.2 | 0 | 0.1 | 0.2 | OK |
| 33 | Example | 0 | 0 | 0.1 | 0 | 0 | 0 | 0 | 0 | 0.1 | 0 | 0 | 0.2 | 0 | 0.1 | 0.2 | OK |
| 34 | Comparative Example | 0 | 0 | 0.1 | 0 | 0 | 0 | 0 | 0 | 0.1 | 0 | 0 | 0.2 | 0 | 0.1 | 0.2 | OK |
| 35 | Comparative Example | 0 | 0 | 0 | 0.1 | 0 | 0 | 0 | 0 | 0.1 | 0 | 0.4 | 0 | 0 | 0.1 | 0.4 | OK |
| 36 | Example | 0 | 0 | 0 | 0.1 | 0 | 0 | 0 | 0 | 0.1 | 0 | 0.4 | 0 | 0 | 0.1 | 0.4 | OK |
| 37 | Comparative Example | 0 | 0 | 0 | 0.1 | 0 | 0 | 0 | 0 | 0.1 | 0 | 0.4 | 0 | 0 | 0.1 | 0.4 | OK |
| 38 | Example | 0 | 0 | 0 | 0 | 0 | 0 | 0 | 0 | 0.1 | 0 | 0 | 0 | 0 | 0 | 0 | OK |
| 39 | Example | 0 | 0 | 0 | 0 | 0 | 0 | 0 | 0 | 0.1 | 0 | 0 | 0 | 0 | 0 | 0 | OK |
| 40 | Example | 0 | 0 | 0 | 0 | 0 | 0 | 0 | 0 | 0.1 | 0 | 0 | 0 | 0 | 0 | 0 | OK |
| 41 | Example | 0 | 0 | 0 | 0 | 0 | 0 | 0 | 0 | 0.1 | 0 | 0 | 0 | 0 | 0 | 0 | OK |
| 42 | Example | 0 | 0 | 0 | 0 | 0 | 0 | 0 | 0 | 0.1 | 0 | 0 | 0 | 0 | 0 | 0 | OK |
| 43 | Example | 0 | 0 | 0 | 0 | 0 | 0 | 0 | 0 | 0.1 | 0 | 0 | 0 | 0 | 0 | 0 | OK |
| 44 | Example | 0 | 0 | 0 | 0 | 0 | 0 | 0 | 0 | 0.1 | 0 | 0 | 0 | 0 | 0 | 0 | OK |
| 45 | Example | 0 | 0 | 0 | 0 | 0 | 0 | 0 | 0 | 0.1 | 0 | 0 | 0 | 0 | 0 | 0 | OK |
| 46 | Example | 0 | 0 | 0 | 0 | 0 | 0 | 0 | 0 | 0.1 | 0 | 0 | 0 | 0 | 0 | 0 | OK |
| 47 | Example | 0 | 0 | 0 | 0 | 0 | 0 | 0 | 0 | 0.1 | 0 | 0 | 0 | 0 | 0 | 0 | OK |
| 48 | Example | 0 | 0 | 0 | 0 | 0 | 0 | 0 | 0 | 0.1 | 0 | 0 | 0 | 0 | 0 | 0 | OK |
| 49 | Example | 0 | 0 | 0 | 0 | 0 | 0 | 0 | 0 | 0.1 | 0 | 0 | 0 | 0 | 0 | 0 | OK |
| 50 | Example | 0 | 0 | 0 | 0 | 0 | 0 | 0 | 0 | 0.1 | 0 | 0 | 0 | 0 | 0 | 0 | OK |
| 51 | Comparative Example | 0 | 0 | 0 | 0 | 0 | 0 | 0 | 0 | 0.1 | 0 | 0 | 0 | 0 | 0 | 0 | OK |
| 52 | Comparative Example | 0 | 0 | 0 | 0 | 0 | 0 | 0 | 0 | 0.1 | 0 | 0 | 0 | 0 | 0 | 0 | OK |
| 53 | Example | 0 | 0 | 0 | 0 | 0 | 0 | 0 | 0 | 0.1 | 0 | 0 | 0 | 0 | 0 | 0 | OK |
| 54 | Example | 0 | 0 | 0 | 0 | 0 | 0 | 0 | 0 | 0.1 | 0 | 0 | 0 | 0 | 0 | 0 | OK |
| 55 | Example | 0 | 0 | 0 | 0 | 0 | 0 | 0 | 0 | 0.1 | 0 | 0 | 0 | 0 | 0 | 0 | OK |
| 56 | Example | 0 | 0 | 0 | 0 | 0 | 0 | 0 | 0 | 0.1 | 0 | 0 | 0 | 0 | 0 | 0 | OK |
| 57 | Example | 0 | 0 | 0 | 0 | 0 | 0 | 0 | 0 | 0.1 | 0 | 0 | 0 | 0 | 0 | 0 | OK |
| 58 | Example | 0 | 0 | 0 | 0 | 0.1 | 0 | 0 | 0 | 0.1 | 0 | 0 | 0 | 0.4 | 0.1 | 0.4 | OK |
| 59 | Example | 0 | 0 | 0 | 0 | 0.1 | 0 | 0 | 0 | 0.1 | 0 | 0 | 0 | 0.4 | 0.1 | 0.4 | OK |
| 60 | Example | 0 | 0 | 0 | 0 | 0.1 | 0 | 0 | 0 | 0.1 | 0 | 0 | 0 | 0.4 | 0.1 | 0.4 | OK |
| 61 | Example | 0 | 0 | 0 | 0 | 0.1 | 0 | 0 | 0 | 0.1 | 0 | 0 | 0 | 0.4 | 0.1 | 0.4 | OK |
| 62 | Example | 0 | 0 | 0 | 0 | 0.1 | 0 | 0 | 0 | 0.1 | 0 | 0 | 0 | 0.4 | 0.1 | 0.4 | OK |
| 63 | Example | 0 | 0 | 0 | 0 | 0.1 | 0 | 0 | 0 | 0.1 | 0 | 0 | 0 | 0.4 | 0.1 | 0.4 | OK |
| 64 | Example | 0 | 0 | 0 | 0 | 0.1 | 0 | 0 | 0 | 0.1 | 0 | 0 | 0 | 0.4 | 0.1 | 0.4 | OK |
| 65 | Example | 0 | 0 | 0 | 0 | 0.1 | 0 | 0 | 0 | 0.1 | 0 | 0 | 0 | 0.4 | 0.1 | 0.4 | OK |
| 66 | Example | 0 | 0 | 0 | 0 | 0 | 0 | 0 | 0 | 0.1 | 0 | 0 | 0 | 0 | 0 | 0 | OK |
| 67 | Example | 0 | 0 | 0 | 0 | 0 | 0 | 0 | 0 | 0.1 | 0 | 0 | 0 | 0 | 0 | 0 | OK |
| 68 | Example | 0 | 0 | 0 | 0 | 0 | 0 | 0 | 0 | 0.1 | 0 | 0 | 0 | 0 | 0 | 0 | OK |
| 69 | Example | 0 | 0 | 0 | 0 | 0 | 0 | 0 | 0 | 0.1 | 0 | 0 | 0 | 0 | 0 | 0 | OK |
| 70 | Example | 0 | 0 | 0 | 0 | 0 | 0 | 0 | 0 | 0.1 | 0 | 0 | 0 | 0 | 0 | 0 | OK |
| 71 | Example | 0 | 0 | 0 | 0 | 0 | 0 | 0 | 0 | 0.1 | 0 | 0 | 0 | 0 | 0 | 0 | OK |

TABLE 1-3

| | | Determination regarding Formulae 1 to 5 | | | | | | |
|---|---|---|---|---|---|---|---|---|
| No. | Classification | Sn − (Bi + In) | Ca − (Y + La + Ce) | −0.25 + Cr + Ti + Ni + Co + V + Nb + Cu + Mn | −0.5 + Sr + Sb + Pb + B | Formula 5 Lower limit | Formula 5 Upper limit | Determination regarding Formula 5 |
| 1 | Comparative Example | 0.5 | 0 | −0.25 | −0.5 | 2.9993 | 3.0013 | OK |
| 2 | Comparative Example | 0.5 | 0 | −0.25 | −0.5 | 2.9993 | 3.0013 | NG |
| 3 | Comparative Example | 0.5 | 0 | −0.25 | −0.5 | 3.1331 | 3.5831 | NG |
| 4 | Example | 0.05 | 0 | −0.25 | −0.4 | 3.1331 | 3.5831 | OK |
| 5 | Example | 0.08 | 0 | −0.25 | −0.1 | 3.1331 | 3.5831 | OK |
| 6 | Example | 0.1 | 0 | −0.25 | −0.3 | 3.1331 | 3.5831 | OK |
| 7 | Example | 0.13 | 0 | −0.25 | −0.5 | 3.1331 | 3.5831 | OK |
| 8 | Example | 0.15 | 0 | −0.25 | −0.5 | 3.1331 | 3.5831 | OK |
| 9 | Example | 0.2 | 0 | −0.25 | −0.5 | 3.1331 | 3.5831 | OK |
| 10 | Example | 0.35 | 0 | −0.25 | −0.5 | 3.1331 | 3.5831 | OK |
| 11 | Example | 0.4 | 0 | −0.25 | −0.5 | 3.1331 | 3.5831 | OK |
| 12 | Example | 0.45 | 0 | −0.25 | −0.5 | 3.1331 | 3.5831 | OK |
| 13 | Example | 0.5 | 0 | −0.25 | −0.5 | 3.1331 | 3.5831 | OK |
| 14 | Example | 0.5 | 0 | −0.25 | −0.5 | 3.1331 | 3.5831 | OK |
| 15 | Comparative Example | 0.5 | 0 | −0.25 | −0.5 | 3.1331 | 3.5831 | OK |
| 16 | Comparative Example | 0.5 | 0 | −0.25 | −0.5 | 3.1331 | 3.5831 | OK |
| 17 | Comparative Example | 0.5 | 0 | −0.25 | −0.5 | 3.1331 | 3.5831 | OK |
| 18 | Comparative Example | 0.5 | 0 | −0.25 | −0.5 | 3.1331 | 3.5831 | OK |
| 19 | Comparative Example | 0.5 | 0 | −0.25 | −0.5 | 3.1331 | 3.5831 | OK |
| 20 | Comparative Example | 0.5 | 0 | −0.25 | −0.5 | 3.1331 | 3.5831 | NG |
| 21 | Example | 0.5 | 0 | −0.25 | −0.5 | 3.4211 | 4.7095 | OK |
| 22 | Comparative Example | 0.5 | 0.1 | −0.25 | −0.5 | 3.4211 | 4.7095 | NG |
| 23 | Example | 0.5 | 0.1 | −0.15 | −0.3 | 3.7363 | 5.7863 | OK |
| 24 | Example | 0.5 | 0.1 | −0.15 | −0.3 | 3.7363 | 5.7863 | OK |
| 25 | Comparative Example | 0.5 | 0.1 | −0.15 | −0.3 | 3.7363 | 5.7863 | NG |
| 26 | Comparative Example | 1 | 0.3 | −0.15 | −0.3 | 4.0787 | 6.8135 | NG |
| 27 | Example | 1 | 0.3 | −0.15 | −0.3 | 4.0787 | 6.8135 | OK |
| 28 | Comparative Example | 1 | 0.3 | −0.15 | −0.3 | 4.0787 | 6.8135 | NG |
| 29 | Comparative Example | 1 | 0.5 | −0.15 | −0.3 | 4.4483 | 7.7911 | NG |
| 30 | Example | 1 | 0.5 | −0.15 | −0.3 | 4.4483 | 7.7911 | OK |
| 31 | Example | 0.8 | 0.2 | −0.15 | −0.3 | 4.4483 | 7.7911 | OK |
| 32 | Example | 0.6 | 0.2 | −0.15 | −0.3 | 4.4483 | 7.7911 | OK |
| 33 | Example | 0.4 | 0.2 | −0.15 | −0.3 | 4.4483 | 7.7911 | OK |
| 34 | Comparative Example | 1 | 0.5 | −0.15 | −0.3 | 4.4483 | 7.7911 | NG |
| 35 | Comparative Example | 1 | 0.5 | −0.15 | −0.1 | 4.8451 | 8.7191 | NG |
| 36 | Example | 1 | 0.5 | −0.15 | −0.1 | 4.8451 | 8.7191 | OK |
| 37 | Comparative Example | 1 | 0.5 | −0.15 | −0.1 | 4.8451 | 8.7191 | NG |
| 38 | Example | 0.01 | 0.01 | −0.25 | −0.5 | 5.0537 | 9.1645 | OK |
| 39 | Example | 0.01 | 0 | −0.25 | −0.5 | 5.0537 | 9.1645 | OK |
| 40 | Example | 0.03 | 0.03 | −0.25 | −0.5 | 5.0537 | 9.1645 | OK |
| 41 | Example | 0.03 | 0.02 | −0.25 | −0.5 | 5.0537 | 9.1645 | OK |
| 42 | Example | 0.05 | 0.05 | −0.25 | −0.5 | 5.0537 | 9.1645 | OK |
| 43 | Example | 0.05 | 0.07 | −0.25 | −0.5 | 5.0537 | 9.1645 | OK |
| 44 | Example | 0.05 | 0.13 | −0.25 | −0.5 | 5.0537 | 9.1645 | OK |
| 45 | Example | 0.05 | 0.2 | −0.25 | −0.5 | 5.0537 | 9.1645 | OK |
| 46 | Example | 0.05 | 0.3 | −0.25 | −0.5 | 5.0537 | 9.1645 | OK |
| 47 | Example | 0.05 | 0.45 | −0.25 | −0.5 | 5.0537 | 9.1645 | OK |
| 48 | Example | 0.05 | 0.5 | −0.25 | −0.5 | 5.0537 | 9.1645 | OK |
| 49 | Example | 0.15 | 0.05 | −0.25 | −0.5 | 5.2691 | 9.5975 | OK |
| 50 | Example | 0.15 | 0.07 | −0.25 | −0.5 | 5.2691 | 9.5975 | OK |
| 51 | Comparative Example | 0.15 | 0.07 | −0.25 | −0.5 | 5.2691 | 9.5975 | OK |
| 52 | Comparative Example | 0.15 | 0.07 | −0.25 | −0.5 | 5.2691 | 9.5975 | OK |
| 53 | Example | 0.15 | 0.13 | −0.25 | −0.5 | 5.2691 | 9.5975 | OK |

TABLE 1-3-continued

| | | | | | | | | |
|---|---|---|---|---|---|---|---|---|
| 54 | Example | 0.15 | 0.2 | −0.25 | −0.5 | 5.2691 | 9.5975 | OK |
| 55 | Example | 0.15 | 0.3 | −0.25 | −0.5 | 5.2691 | 9.5975 | OK |
| 56 | Example | 0.15 | 0.45 | −0.25 | −0.5 | 5.2691 | 9.5975 | OK |
| 57 | Example | 0.15 | 0.5 | −0.25 | −0.5 | 5.2691 | 9.5975 | OK |
| 58 | Example | 1.5 | 0.5 | −0.15 | −0.1 | 5.4913 | 10.0181 | OK |
| 59 | Example | 0.7 | 0.2 | −0.15 | −0.1 | 5.4913 | 10.0181 | OK |
| 60 | Example | 0.5 | 0.2 | −0.15 | −0.1 | 5.4913 | 10.0181 | OK |
| 61 | Example | 0.3 | 0.2 | −0.15 | −0.1 | 5.4913 | 10.0181 | OK |
| 62 | Example | 0.2 | 0.2 | −0.15 | −0.1 | 5.4913 | 10.0181 | OK |
| 63 | Example | 0.1 | 0.2 | −0.15 | −0.1 | 5.4913 | 10.0181 | OK |
| 64 | Example | 0.05 | 0.2 | −0.15 | −0.1 | 5.4913 | 10.0181 | OK |
| 65 | Example | 1.5 | 0.5 | −0.15 | −0.1 | 5.4913 | 10.0181 | OK |
| 66 | Example | 0.2 | 0.05 | −0.25 | −0.5 | 5.7203 | 10.4263 | OK |
| 67 | Example | 0.2 | 0.07 | −0.25 | −0.5 | 5.7203 | 10.4263 | OK |
| 68 | Example | 0.2 | 0.11 | −0.25 | −0.5 | 5.7203 | 10.4263 | OK |
| 69 | Example | 0.2 | 0.18 | −0.25 | −0.5 | 5.7203 | 10.4263 | OK |
| 70 | Example | 0.2 | 0.28 | −0.25 | −0.5 | 5.7203 | 10.4263 | OK |
| 71 | Example | 0.2 | 0.3 | −0.25 | −0.5 | 5.7203 | 10.4263 | OK |

| No. | Area proportion % | | | Al phase circumferential length (mm/mm$^2$) | Frequency in number of Al phase (Number) |
|---|---|---|---|---|---|
| | Al + MgZn2 | Zn | Others | | |
| 1 | 65 | 35 | 0 | 60 | NG |
| 2 | 65 | 35 | 0 | 100 | NG |
| 3 | 65 | 35 | 0 | 140 | NG |
| 4 | 70 | 30 | 0 | 80 | G1 |
| 5 | 70 | 30 | 0 | 85 | G1 |
| 6 | 70 | 30 | 0 | 80 | G1 |
| 7 | 70 | 30 | 0 | 80 | G1 |
| 8 | 70 | 30 | 0 | 80 | G1 |
| 9 | 70 | 30 | 0 | 80 | G1 |
| 10 | 70 | 30 | 0 | 80 | G1 |
| 11 | 70 | 30 | 0 | 80 | G1 |
| 12 | 70 | 30 | 0 | 80 | G1 |
| 13 | 70 | 30 | 0 | 80 | G1 |
| 14 | 70 | 30 | 0 | 80 | G1 |
| 15 | 65 | 35 | 0 | 85 | G3 |
| 16 | 65 | 35 | 0 | 85 | G2 |
| 17 | 65 | 35 | 0 | 85 | NG |
| 18 | 65 | 35 | 0 | 30 | NG |
| 19 | 65 | 35 | 0 | 40 | NG |
| 20 | 80 | 20 | 0 | 90 | NG |
| 21 | 70 | 30 | 0 | 30 | G2 |
| 22 | 75 | 25 | 0 | 110 | NG |
| 23 | 75 | 25 | 0 | 40 | G2 |
| 24 | 80 | 20 | 0 | 40 | G2 |
| 25 | 85 | 15 | 0 | 110 | NG |
| 26 | 80 | 20 | 0 | 120 | NG |
| 27 | 85 | 15 | 0 | 50 | G1 |
| 28 | 90 | 10 | 0 | 100 | NG |
| 29 | 80 | 20 | 0 | 110 | NG |
| 30 | 85 | 15 | 0 | 30 | G2 |
| 31 | 85 | 15 | 0 | 30 | G2 |
| 32 | 85 | 15 | 0 | 30 | G2 |
| 33 | 85 | 15 | 0 | 30 | G2 |
| 34 | 90 | 10 | 0 | 100 | NG |
| 35 | 85 | 15 | 0 | 100 | NG |
| 36 | 90 | 10 | 0 | 40 | G1 |
| 37 | 95 | 5 | 0 | 110 | NG |
| 38 | 90 | 10 | 0 | 40 | G1 |
| 39 | 90 | 10 | 0 | 40 | G1 |
| 40 | 90 | 10 | 0 | 40 | G1 |
| 41 | 90 | 10 | 0 | 40 | G1 |
| 42 | 90 | 10 | 0 | 40 | G1 |
| 43 | 90 | 10 | 0 | 40 | G1 |
| 44 | 90 | 10 | 0 | 40 | G1 |
| 45 | 90 | 10 | 0 | 40 | G1 |
| 46 | 90 | 10 | 0 | 40 | G1 |
| 47 | 90 | 10 | 0 | 40 | G1 |
| 48 | 90 | 10 | 0 | 40 | G1 |
| 49 | 90 | 10 | 0 | 40 | G1 |
| 50 | 90 | 10 | 0 | 40 | G1 |
| 51 | 80 | 20 | 0 | 50 | NG |
| 52 | 65 | 35 | 0 | 90 | G1 |
| 53 | 90 | 10 | 0 | 40 | G1 |
| 54 | 90 | 10 | 0 | 40 | G1 |
| 55 | 90 | 10 | 0 | 40 | G1 |

TABLE 1-3-continued

| | | | | | |
|---|---|---|---|---|---|
| 56 | 90 | 10 | 0 | 40 | G1 |
| 57 | 90 | 10 | 0 | 40 | G1 |
| 58 | 85 | 10 | 5 | 40 | G1 |
| 59 | 85 | 10 | 5 | 40 | G1 |
| 60 | 85 | 10 | 5 | 40 | G1 |
| 61 | 85 | 10 | 5 | 40 | G1 |
| 62 | 85 | 10 | 5 | 40 | G1 |
| 63 | 85 | 10 | 5 | 40 | G1 |
| 64 | 85 | 10 | 5 | 40 | G1 |
| 65 | 90 | 5 | 5 | 20 | G1 |
| 66 | 90 | 5 | 5 | 30 | G1 |
| 67 | 90 | 5 | 5 | 30 | G1 |
| 68 | 90 | 5 | 5 | 30 | G1 |
| 69 | 90 | 5 | 5 | 30 | G1 |
| 70 | 90 | 5 | 5 | 30 | G1 |
| 71 | 90 | 5 | 5 | 30 | G1 |

TABLE 1-4

| No. | Classification | Formula 6 Lsurface/Lboard | Determination | Formula 7 Lmedium/Lboard | Determination | Mg ≥ 5.0 | Formula 8 0.01 ≤ Sn < 0.25 |
|---|---|---|---|---|---|---|---|
| 1 | Comparative Example | 1.2 | OK | 1.15 | NG | NG | NG |
| 2 | Comparative Example | 0.87 | NG | 1.15 | NG | NG | NG |
| 3 | Comparative Example | 1.2 | OK | 1.06 | NG | NG | NG |
| 4 | Example | 1.05 | OK | 1.03 | OK | NG | OK |
| 5 | Example | 1.05 | OK | 1.02 | OK | NG | OK |
| 6 | Example | 1.05 | OK | 1.03 | OK | NG | OK |
| 7 | Example | 1.04 | OK | 1.02 | OK | NG | OK |
| 8 | Example | 1.05 | OK | 1.01 | OK | NG | OK |
| 9 | Example | 1.06 | OK | 1.04 | OK | NG | OK |
| 10 | Example | 1.06 | OK | 1.03 | OK | NG | NG |
| 11 | Example | 1.05 | OK | 1.04 | OK | NG | NG |
| 12 | Example | 1.05 | OK | 1.03 | OK | NG | NG |
| 13 | Example | 1.05 | OK | 1.03 | OK | NG | NG |
| 14 | Example | 1.03 | OK | 1.01 | OK | NG | NG |
| 15 | Comparative Example | 1.15 | OK | 1.14 | NG | NG | NG |
| 16 | Comparative Example | 0.88 | NG | 0.87 | OK | NG | NG |
| 17 | Comparative Example | 0.76 | NG | 0.81 | OK | NG | NG |
| 18 | Comparative Example | 0.9 | OK | 0.85 | OK | NG | NG |
| 19 | Comparative Example | 0.59 | NG | 0.88 | OK | NG | NG |
| 20 | Comparative Example | 0.48 | NG | 0.77 | OK | NG | NG |
| 21 | Example | 0.88 | NG | 0.95 | OK | NG | NG |
| 22 | Comparative Example | 0.8 | NG | 1.18 | NG | OK | NG |
| 23 | Example | 1.08 | OK | 1.05 | OK | NG | NG |
| 24 | Example | 1.07 | OK | 1.05 | OK | OK | NG |
| 25 | Comparative Example | 0.68 | NG | 0.88 | OK | NG | NG |
| 26 | Comparative Example | 0.67 | NG | 0.9 | OK | NG | NG |
| 27 | Example | 0.99 | OK | 1.05 | OK | NG | NG |
| 28 | Comparative Example | 0.85 | NG | 0.77 | OK | NG | NG |
| 29 | Comparative Example | 1.36 | OK | 1.25 | NG | NG | NG |
| 30 | Example | 1.08 | OK | 1.02 | OK | OK | NG |
| 31 | Example | 1.07 | OK | 1.02 | OK | OK | NG |
| 32 | Example | 1.05 | OK | 1.01 | OK | OK | NG |
| 33 | Example | 1.04 | OK | 1.05 | OK | OK | NG |
| 34 | Comparative Example | 1.23 | OK | 1.12 | NG | OK | NG |
| 35 | Comparative Example | 1.31 | OK | 1.17 | NG | NG | NG |
| 36 | Example | 1 | OK | 1.02 | OK | OK | NG |

TABLE 1-4-continued

| | | | | | | | |
|---|---|---|---|---|---|---|---|
| 37 | Comparative Example | 1.12 | OK | 1.35 | NG | OK | NG |
| 38 | Example | 1.02 | OK | 0.99 | OK | OK | OK |
| 39 | Example | 1.02 | OK | 1.02 | OK | OK | OK |
| 40 | Example | 1.03 | OK | 1.03 | OK | OK | OK |
| 41 | Example | 1.04 | OK | 1.01 | OK | OK | OK |
| 42 | Example | 1 | OK | 1.02 | OK | OK | OK |
| 43 | Example | 1.01 | OK | 1.03 | OK | OK | OK |
| 44 | Example | 1 | OK | 1.01 | OK | OK | OK |
| 45 | Example | 1.02 | OK | 1.03 | OK | OK | OK |
| 46 | Example | 1.03 | OK | 1.03 | OK | OK | OK |
| 47 | Example | 1.02 | OK | 1 | OK | OK | OK |
| 48 | Example | 1.02 | OK | 1.02 | OK | OK | OK |
| 49 | Example | 1.03 | OK | 1.03 | OK | OK | OK |
| 50 | Example | 1.03 | OK | 1.02 | OK | OK | OK |
| 51 | Comparative Example | 0.88 | NG | 1.13 | NG | OK | OK |
| 52 | Comparative Example | 0.88 | NG | 1.13 | NG | OK | OK |
| 53 | Example | 1.01 | OK | 1.01 | OK | OK | OK |
| 54 | Example | 1.02 | OK | 1.02 | OK | OK | OK |
| 55 | Example | 1.02 | OK | 1.01 | OK | OK | OK |
| 56 | Example | 1.01 | OK | 1.02 | OK | OK | OK |
| 57 | Example | 1.01 | OK | 1.02 | OK | OK | OK |
| 58 | Example | 0.98 | OK | 1.02 | OK | OK | NG |
| 59 | Example | 1.01 | OK | 1.01 | OK | OK | NG |
| 60 | Example | 1 | OK | 1.01 | OK | OK | NG |
| 61 | Example | 1.02 | OK | 1.01 | OK | OK | NG |
| 62 | Example | 1 | OK | 1.01 | OK | OK | OK |
| 63 | Example | 1.01 | OK | 1.02 | OK | OK | OK |
| 64 | Example | 1.03 | OK | 1.03 | OK | OK | OK |
| 65 | Example | 0.97 | OK | 1.01 | OK | OK | NG |
| 66 | Example | 1.02 | OK | 0.99 | OK | OK | OK |
| 67 | Example | 1.04 | OK | 1 | OK | OK | OK |
| 68 | Example | 1.05 | OK | 1.01 | OK | OK | OK |
| 69 | Example | 1.06 | OK | 1.02 | OK | OK | OK |
| 70 | Example | 1.02 | OK | 1.05 | OK | OK | OK |
| 71 | Example | 2.02 | OK | 2.05 | NG | OK | OK |

| No. | Formula 9 $0.05 < Ca < 0.5$ | Formulae 10 and 11 $Sn + 0.02 \leq Ca$ or $Sn < Ca$ | Presence of spangles | Investigation of $100 \times 100$ grid | Investigation of appearance | Corrosion resistance balance |
|---|---|---|---|---|---|---|
| 1 | NG | NG | OK | B | A++ | B |
| 2 | NG | NG | OK | B | A++ | B |
| 3 | NG | NG | NG | B | A++ | B |
| 4 | NG | NG | OK | G1 | A++ | B |
| 5 | NG | NG | OK | G1 | A++ | B |
| 6 | NG | NG | OK | G1 | A++ | B |
| 7 | NG | NG | OK | G1 | A++ | B |
| 8 | NG | NG | OK | G1 | A++ | B |
| 9 | NG | NG | OK | G1 | A++ | B |
| 10 | NG | NG | OK | G1 | A++ | B |
| 11 | NG | NG | OK | G1 | A++ | B |
| 12 | NG | NG | OK | G1 | A++ | B |
| 13 | NG | NG | OK | G1 | A++ | B |
| 14 | NG | NG | OK | G1 | A++ | B |
| 15 | NG | NG | NG | B | A++ | B |
| 16 | NG | NG | NG | B | A++ | B |
| 17 | NG | NG | NG | B | A++ | B |
| 18 | NG | NG | NG | B | A++ | B |
| 19 | NG | NG | NG | B | A++ | B |
| 20 | NG | NG | NG | B | A++ | B |
| 21 | NG | NG | OK | G3 | A++ | B |
| 22 | OK | NG | NG | B | B | B |
| 23 | OK | NG | OK | G2 | A++ | B |
| 24 | OK | NG | OK | G2 | B | B |
| 25 | OK | NG | OK | B | B | B |
| 26 | OK | NG | NG | B | A++ | B |
| 27 | OK | NG | OK | G1 | B | B |
| 28 | OK | NG | NG | B | B | B |
| 29 | NG | NG | NG | B | A++ | B |
| 30 | NG | NG | OK | G2 | B | B |
| 31 | OK | NG | OK | G2 | B | B |
| 32 | OK | NG | OK | G2 | B | B |
| 33 | OK | NG | OK | G2 | B | B |
| 34 | NG | NG | NG | B | B | B |
| 35 | NG | NG | NG | B | A++ | A++ |

TABLE 1-4-continued

| | | | | | | | |
|---|---|---|---|---|---|---|---|
| 36 | NG | NG | OK | G1 | B | B | |
| 37 | NG | NG | NG | B | B | B | |
| 38 | NG | NG | OK | G1 | B | B | |
| 39 | NG | OK | OK | G1 | B | B | |
| 40 | NG | NG | OK | G1 | B | B | |
| 41 | NG | OK | OK | G1 | B | B | |
| 42 | NG | NG | OK | G1 | B | B | |
| 43 | OK | OK | OK | G1 | A | A | |
| 44 | OK | OK | OK | G1 | A++ | A++ | |
| 45 | OK | OK | OK | G1 | A++ | A++ | |
| 46 | OK | OK | OK | G1 | A++ | A++ | |
| 47 | NG | OK | OK | G1 | B | B | |
| 48 | NG | OK | OK | G1 | B | B | |
| 49 | NG | NG | OK | G1 | B | B | |
| 50 | OK | NG | OK | G1 | A | A | |
| 51 | OK | NG | NG | B | B | B | |
| 52 | OK | NG | NG | B | B | B | |
| 53 | OK | NG | OK | G1 | A+ | A+ | |
| 54 | OK | OK | OK | G1 | A++ | A++ | |
| 55 | OK | OK | OK | G1 | A++ | A++ | |
| 56 | NG | OK | OK | G1 | A | A | |
| 57 | NG | OK | OK | G1 | B | B | |
| 58 | NG | NG | OK | G1 | B | B | |
| 59 | OK | NG | OK | G1 | B | B | |
| 60 | OK | NG | OK | G1 | B | B | |
| 61 | OK | NG | OK | G1 | B | B | |
| 62 | OK | NG | OK | G1 | A++ | A++ | |
| 63 | OK | OK | OK | G1 | A++ | A++ | |
| 64 | OK | OK | OK | G1 | A++ | A++ | |
| 65 | NG | NG | OK | G1 | B | B | |
| 66 | NG | NG | OK | G1 | B | B | |
| 67 | OK | NG | OK | G1 | A | A | |
| 68 | OK | NG | OK | G1 | A | A | |
| 69 | OK | NG | OK | G1 | A | A | |
| 70 | OK | OK | OK | G1 | A++ | A++ | |
| 71 | OK | OK | OK | G1 | A+ | A+ | |

TABLE 2-1

| No. | Classification | Tmelt (° C.) | Production method | Zn | Al | Mg | Sn group | | | Ca group | | | | Si |
|---|---|---|---|---|---|---|---|---|---|---|---|---|---|---|
| | | | | | | | Sn | Bi | In | Ca | Y | La | Ce | |
| 72 | Example | 470 | B | 72.65 | 20 | 6.5 | 0.2 | 0 | 0 | 0.45 | 0 | 0 | 0 | 0.1 |
| 73 | Example | 470 | B | 72.6 | 20 | 6.5 | 0.2 | 0 | 0 | 0.5 | 0 | 0 | 0 | 0.1 |
| 74 | Example | 471 | B | 73.1 | 20 | 6.5 | 0.2 | 0 | 0 | 0 | 0 | 0 | 0 | 0.1 |
| 75 | Example | 470 | B | 71.6 | 21 | 7 | 0.25 | 0 | 0 | 0.05 | 0 | 0 | 0 | 0 |
| 76 | Example | 470 | B | 71.58 | 21 | 7 | 0.25 | 0 | 0 | 0.07 | 0 | 0 | 0 | 0 |
| 77 | Example | 470 | B | 71.52 | 21 | 7 | 0.25 | 0 | 0 | 0.13 | 0 | 0 | 0 | 0 |
| 78 | Example | 470 | B | 71.45 | 21 | 7 | 0.25 | 0 | 0 | 0.2 | 0 | 0 | 0 | 0 |
| 79 | Example | 470 | B | 71.35 | 21 | 7 | 0.25 | 0 | 0 | 0.3 | 0 | 0 | 0 | 0 |
| 80 | Example | 470 | B | 71.2 | 21 | 7 | 0.25 | 0 | 0 | 0.45 | 0 | 0 | 0 | 0 |
| 81 | Example | 470 | B | 71.15 | 21 | 7 | 0.25 | 0 | 0 | 0.5 | 0 | 0 | 0 | 0 |
| 82 | Comparative Example | 480 | B | 66.2 | 19 | 12 | 1.5 | 0 | 0 | 0.5 | 0 | 0 | 0 | 0.2 |
| 83 | Comparative Example | 460 | B | 69.1 | 22 | 6 | 2 | 0 | 0 | 0.5 | 0 | 0 | 0 | 0.2 |
| 84 | Example | 490 | B | 66.1 | 22 | 9 | 2 | 0 | 0 | 0.5 | 0 | 0 | 0 | 0.2 |
| 85 | Example | 490 | B | 67.3 | 22 | 9 | 1 | 0 | 0 | 0.3 | 0 | 0 | 0 | 0.2 |
| 86 | Example | 490 | B | 67.9 | 22 | 9 | 0.5 | 0 | 0 | 0.2 | 0 | 0 | 0 | 0.2 |
| 87 | Example | 490 | B | 68.1 | 22 | 9 | 0.3 | 0 | 0 | 0.2 | 0 | 0 | 0 | 0.2 |
| 88 | Example | 490 | B | 68.3 | 22 | 9 | 0.1 | 0 | 0 | 0.2 | 0 | 0 | 0 | 0.2 |
| 89 | Example | 490 | B | 68.35 | 22 | 9 | 0.05 | 0 | 0 | 0.2 | 0 | 0 | 0 | 0.2 |
| 90 | Example | 490 | B | 67.85 | 22 | 9 | 0.25 | 0 | 0 | 0.5 | 0 | 0 | 0 | 0.2 |
| 91 | Example | 490 | B | 68 | 22 | 9 | 0.1 | 0 | 0 | 0.5 | 0 | 0 | 0 | 0.2 |
| 92 | Example | 490 | B | 68.05 | 22 | 9 | 0.05 | 0 | 0 | 0.5 | 0 | 0 | 0 | 0.2 |
| 93 | Comparative Example | 510 | B | 63.1 | 22 | 12 | 2 | 0 | 0 | 0.5 | 0 | 0 | 0 | 0.2 |
| 94 | Example | 470 | B | 64 | 25 | 7 | 2 | 0 | 0 | 1 | 0 | 0 | 0 | 0.4 |
| 95 | Example | 500 | B | 61 | 25 | 10 | 2 | 0 | 0 | 1 | 0 | 0 | 0 | 0.4 |
| 96 | Comparative Example | 510 | B | 58 | 25 | 13 | 2 | 0 | 0 | 1 | 0 | 0 | 0 | 0.4 |
| 97 | Comparative Example | 500 | B | 60.3 | 28 | 7 | 2 | 0 | 0 | 1.5 | 0 | 0 | 0 | 1 |
| 98 | Example | 500 | B | 57.3 | 28 | 10 | 2 | 0 | 0 | 1.5 | 0 | 0 | 0 | 1 |
| 99 | Example | 500 | B | 54.3 | 28 | 13 | 2 | 0 | 0 | 1.5 | 0 | 0 | 0 | 1 |
| 100 | Comparative Example | 500 | B | 53.9 | 28 | 13 | 2 | 0 | 0 | 1.5 | 0 | 0 | 0 | 1 |
| 101 | Comparative Example | 500 | B | 53.8 | 28 | 13 | 2 | 0 | 0 | 1.5 | 0 | 0 | 0 | 1 |
| 102 | Comparative Example | 500 | B | 53.8 | 28 | 13 | 2 | 0 | 0 | 1.5 | 0 | 0 | 0 | 1 |
| 103 | Comparative Example | 500 | B | 55.2 | 31 | 8 | 2 | 0 | 0 | 2 | 0 | 0 | 0 | 1.5 |
| 104 | Example | 490 | B | 52.2 | 31 | 11 | 2 | 0 | 0 | 2 | 0 | 0 | 0 | 1.5 |
| 105 | Example | 500 | B | 49.2 | 31 | 14 | 2 | 0 | 0 | 2 | 0 | 0 | 0 | 1.5 |

TABLE 2-1-continued

| No. | Classification | Tmelt (° C.) | Production method | Zn | Al | Mg | Sn group | | | Ca group | | | | Si |
|---|---|---|---|---|---|---|---|---|---|---|---|---|---|---|
| | | | | | | | Sn | Bi | In | Ca | Y | La | Ce | |
| 106 | Comparative Example | 500 | B | 49.1 | 31 | 14 | 2 | 0 | 0 | 2 | 0 | 0 | 0 | 1.5 |
| 107 | Comparative Example | 500 | B | 50 | 34 | 9 | 2 | 0 | 0 | 2.5 | 0 | 0 | 0 | 2.4 |
| 108 | Example | 500 | A | 47 | 34 | 12 | 2 | 0 | 0 | 2.5 | 0 | 0 | 0 | 2.4 |
| 109 | Example | 500 | B | 47 | 34 | 12 | 2 | 0 | 0 | 2.5 | 0 | 0 | 0 | 2.4 |
| 110 | Example | 500 | C | 47 | 34 | 12 | 2 | 0 | 0 | 2.5 | 0 | 0 | 0 | 2.4 |
| 111 | Example | 500 | D | 47 | 34 | 12 | 2 | 0 | 0 | 2.5 | 0 | 0 | 0 | 2.4 |
| 112 | Comparative Example | 500 | E | 47 | 34 | 12 | 2 | 0 | 0 | 2.5 | 0 | 0 | 0 | 2.4 |
| 113 | Comparative Example | 500 | F | 47 | 34 | 12 | 2 | 0 | 0 | 2.5 | 0 | 0 | 0 | 2.4 |
| 114 | Comparative Example | 500 | G | 47 | 34 | 12 | 2 | 0 | 0 | 2.5 | 0 | 0 | 0 | 2.4 |
| 115 | Comparative Example | 500 | B | 46.9 | 34 | 12 | 2 | 0 | 0 | 2.5 | 0 | 0 | 0 | 2.5 |
| 116 | Comparative Example | 520 | B | 44 | 34 | 15 | 2 | 0 | 0 | 2.5 | 0 | 0 | 0 | 2.4 |
| 117 | Comparative Example | 510 | B | 51.4 | 35 | 9 | 2 | 0 | 0 | 2.5 | 0 | 0 | 0 | 0 |
| 118 | Comparative Example | 500 | B | 48.4 | 35 | 12 | 2 | 0 | 0 | 2.5 | 0 | 0 | 0 | 0 |
| 119 | Comparative Example | 500 | B | 48.4 | 35 | 12 | 2 | 0 | 0 | 2.5 | 0 | 0 | 0 | 0 |
| 120 | Comparative Example | 500 | B | 45.4 | 35 | 15 | 2 | 0 | 0 | 2.5 | 0 | 0 | 0 | 0 |
| 121 | Example | 430 | D | 79.8 | 12 | 5 | 3 | 0 | 0 | 0.1 | 0 | 0 | 0 | 0 |
| 122 | Comparative Example | 420 | B | 77.8 | 12 | 5 | 5 | 0 | 0 | 0.1 | 0 | 0 | 0 | 0 |
| 123 | Example | 430 | B | 80.3 | 12 | 5 | 2 | 0.5 | 0 | 0.1 | 0 | 0 | 0 | 0 |
| 124 | Comparative Example | 430 | B | 79.8 | 12 | 5 | 2 | 1 | 0 | 0.1 | 0 | 0 | 0 | 0 |
| 125 | Example | 430 | B | 80.1 | 12 | 5 | 2 | 0 | 0.3 | 0.5 | 0 | 0 | 0 | 0 |
| 126 | Comparative Example | 430 | B | 79.9 | 12 | 5 | 2 | 0 | 0.5 | 0.5 | 0 | 0 | 0 | 0 |
| 127 | Comparative Example | 430 | B | 80.3 | 12 | 5 | 1 | 0.8 | 0.3 | 0.5 | 0 | 0 | 0 | 0 |
| 128 | Example | 490 | C | 65.4 | 22 | 9 | 3 | 0 | 0 | 0.5 | 0 | 0 | 0 | 0 |
| 129 | Example | 490 | C | 64.4 | 22 | 9 | 4 | 0 | 0 | 0.5 | 0 | 0 | 0 | 0 |
| 130 | Example | 480 | B | 63.6 | 22 | 9 | 4.8 | 0 | 0 | 0.5 | 0 | 0 | 0 | 0 |
| 131 | Example | 470 | B | 64.6 | 25 | 7 | 2 | 0 | 0 | 1 | 0.3 | 0 | 0 | 0 |
| 132 | Comparative Example | 470 | B | 64.4 | 25 | 7 | 2 | 0 | 0 | 1 | 0.5 | 0 | 0 | 0 |
| 133 | Example | 470 | B | 64.6 | 25 | 7 | 2 | 0 | 0 | 1 | 0 | 0.3 | 0 | 0 |
| 134 | Comparative Example | 470 | B | 64.4 | 25 | 7 | 2 | 0 | 0 | 1 | 0 | 0.5 | 0 | 0 |
| 135 | Example | 470 | B | 64.6 | 25 | 7 | 2 | 0 | 0 | 1 | 0 | 0 | 0.3 | 0 |
| 136 | Comparative Example | 470 | B | 64.6 | 25 | 7 | 2 | 0 | 0 | 1 | 0 | 0 | 0.5 | 0 |
| 137 | Example | 470 | B | 64 | 25 | 7 | 2 | 0 | 0 | 1 | 0.3 | 0.3 | 0.3 | 0 |
| 138 | Comparative Example | 470 | B | 63.9 | 25 | 7 | 2 | 0 | 0 | 1 | 0.4 | 0.3 | 0.3 | 0 |
| 139 | Example | 500 | B | 57.4 | 28 | 10 | 2 | 0 | 0 | 1.5 | 0 | 0 | 0 | 1 |
| 140 | Example | 500 | B | 57.4 | 28 | 10 | 2 | 0 | 0 | 1.5 | 0 | 0 | 0 | 1 |
| 141 | Example | 500 | B | 57.4 | 28 | 10 | 2 | 0 | 0 | 1.5 | 0 | 0 | 0 | 1 |
| 142 | Example | 490 | B | 45 | 34 | 12 | 4 | 0 | 0 | 2.5 | 0 | 0 | 0 | 2.4 |
| 143 | Comparative Example | 480 | B | 44 | 34 | 12 | 5 | 0 | 0 | 2.5 | 0 | 0 | 0 | 2.4 |
| 144 | Comparative Example | 500 | B | 44.5 | 34 | 12 | 4 | 0 | 0 | 3 | 0 | 0 | 0 | 2.4 |

TABLE 2-2

| No. | Classification | Cr group | | | | | | | | Sr group | | | | Total of Cr group | Total of Sr group | XRD Mg2Sn |
|---|---|---|---|---|---|---|---|---|---|---|---|---|---|---|---|---|
| | | Cr | Ti | Ni | Co | V | Nb | Cu | Mn | Fe | Sr | Sb | Pb | B | | | |
| 72 | Example | 0 | 0 | 0 | 0 | 0 | 0 | 0 | 0 | 0.1 | 0 | 0 | 0 | 0 | 0 | 0 | OK |
| 73 | Example | 0 | 0 | 0 | 0 | 0 | 0 | 0 | 0 | 0.1 | 0 | 0 | 0 | 0 | 0 | 0 | OK |
| 74 | Example | 0 | 0 | 0 | 0 | 0 | 0 | 0 | 0 | 0.1 | 0 | 0 | 0 | 0 | 0 | 0 | OK |
| 75 | Example | 0 | 0 | 0 | 0 | 0 | 0 | 0 | 0 | 0.1 | 0 | 0 | 0 | 0 | 0 | 0 | OK |
| 76 | Example | 0 | 0 | 0 | 0 | 0 | 0 | 0 | 0 | 0.1 | 0 | 0 | 0 | 0 | 0 | 0 | OK |
| 77 | Example | 0 | 0 | 0 | 0 | 0 | 0 | 0 | 0 | 0.1 | 0 | 0 | 0 | 0 | 0 | 0 | OK |
| 78 | Example | 0 | 0 | 0 | 0 | 0 | 0 | 0 | 0 | 0.1 | 0 | 0 | 0 | 0 | 0 | 0 | OK |
| 79 | Example | 0 | 0 | 0 | 0 | 0 | 0 | 0 | 0 | 0.1 | 0 | 0 | 0 | 0 | 0 | 0 | OK |
| 80 | Example | 0 | 0 | 0 | 0 | 0 | 0 | 0 | 0 | 0.1 | 0 | 0 | 0 | 0 | 0 | 0 | OK |
| 81 | Example | 0 | 0 | 0 | 0 | 0 | 0 | 0 | 0 | 0.1 | 0 | 0 | 0 | 0 | 0 | 0 | OK |
| 82 | Comparative Example | 0 | 0 | 0 | 0 | 0.1 | 0 | 0 | 0 | 0.1 | 0 | 0 | 0 | 0.4 | 0.1 | 0.4 | OK |
| 83 | Comparative Example | 0 | 0 | 0 | 0 | 0 | 0.1 | 0 | 0 | 0.1 | 0 | 0 | 0 | 0 | 0.1 | 0 | OK |
| 84 | Example | 0 | 0 | 0 | 0 | 0 | 0 | 0.1 | 0 | 0.1 | 0 | 0 | 0 | 0 | 0.1 | 0 | OK |
| 85 | Example | 0 | 0 | 0 | 0 | 0 | 0 | 0.1 | 0 | 0.1 | 0 | 0 | 0 | 0 | 0.1 | 0 | OK |
| 86 | Example | 0 | 0 | 0 | 0 | 0 | 0 | 0.1 | 0 | 0.1 | 0 | 0 | 0 | 0 | 0.1 | 0 | OK |
| 87 | Example | 0 | 0 | 0 | 0 | 0 | 0 | 0.1 | 0 | 0.1 | 0 | 0 | 0 | 0 | 0.1 | 0 | OK |
| 88 | Example | 0 | 0 | 0 | 0 | 0 | 0 | 0.1 | 0 | 0.1 | 0 | 0 | 0 | 0 | 0.1 | 0 | OK |
| 89 | Example | 0 | 0 | 0 | 0 | 0 | 0 | 0.1 | 0 | 0.1 | 0 | 0 | 0 | 0 | 0.1 | 0 | OK |
| 90 | Example | 0 | 0 | 0 | 0 | 0 | 0 | 0.1 | 0 | 0.1 | 0 | 0 | 0 | 0 | 0.1 | 0 | OK |
| 91 | Example | 0 | 0 | 0 | 0 | 0 | 0 | 0.1 | 0 | 0.1 | 0 | 0 | 0 | 0 | 0.1 | 0 | OK |
| 92 | Example | 0 | 0 | 0 | 0 | 0 | 0 | 0.1 | 0 | 0.1 | 0 | 0 | 0 | 0 | 0.1 | 0 | OK |
| 93 | Comparative Example | 0 | 0 | 0 | 0 | 0 | 0 | 0.1 | 0 | 0.1 | 0 | 0 | 0 | 0 | 0.1 | 0 | OK |
| 94 | Example | 0 | 0 | 0 | 0 | 0 | 0 | 0.1 | 0 | 0.1 | 0.4 | 0 | 0 | 0 | 0.1 | 0.4 | OK |
| 95 | Example | 0 | 0 | 0 | 0 | 0 | 0 | 0.1 | 0 | 0.1 | 0.4 | 0 | 0 | 0 | 0.1 | 0.4 | OK |
| 96 | Comparative Example | 0 | 0 | 0 | 0 | 0 | 0 | 0.1 | 0 | 0.1 | 0.4 | 0 | 0 | 0 | 0.1 | 0.4 | OK |
| 97 | Comparative Example | 0 | 0 | 0 | 0 | 0 | 0 | 0 | 0.1 | 0.1 | 0 | 0 | 0 | 0 | 0.1 | 0 | OK |

TABLE 2-2-continued

| No. | Classification | Cr group | | | | | | | | Sr group | | | | Total of Cr group | Total of Sr group | XRD Mg2Sn |
|---|---|---|---|---|---|---|---|---|---|---|---|---|---|---|---|---|
| | | Cr | Ti | Ni | Co | V | Nb | Cu | Mn | Fe | Sr | Sb | Pb | B | | | |
| 98 | Example | 0 | 0 | 0 | 0 | 0 | 0 | 0 | 0.1 | 0.1 | 0 | 0 | 0 | 0 | 0.1 | 0 | OK |
| 99 | Example | 0 | 0 | 0 | 0 | 0 | 0 | 0 | 0.1 | 0.1 | 0 | 0 | 0 | 0 | 0.1 | 0 | OK |
| 100 | Comparative Example | 0 | 0 | 0 | 0 | 0 | 0 | 0 | 0 | 0.1 | 0.5 | 0 | 0 | 0 | 0 | 0.5 | OK |
| 101 | Comparative Example | 0 | 0 | 0 | 0 | 0 | 0 | 0 | 0 | 0.1 | 0.4 | 0.2 | 0 | 0 | 0 | 0.6 | OK |
| 102 | Comparative Example | 0 | 0 | 0 | 0 | 0 | 0 | 0 | 0 | 0.1 | 0.4 | 0 | 0 | 0.2 | 0 | 0.6 | OK |
| 103 | Comparative Example | 0.1 | 0 | 0.1 | 0 | 0 | 0 | 0 | 0 | 0.1 | 0 | 0 | 0 | 0 | 0.2 | 0 | OK |
| 104 | Example | 0.1 | 0 | 0.1 | 0 | 0 | 0 | 0 | 0 | 0.1 | 0 | 0 | 0 | 0 | 0.2 | 0 | OK |
| 105 | Example | 0.1 | 0 | 0.1 | 0 | 0 | 0 | 0 | 0 | 0.1 | 0 | 0 | 0 | 0 | 0.2 | 0 | OK |
| 106 | Comparative Example | 0.1 | 0 | 0.2 | 0 | 0 | 0 | 0 | 0 | 0.1 | 0 | 0 | 0 | 0 | 0.3 | 0 | OK |
| 107 | Comparative Example | 0 | 0 | 0 | 0 | 0 | 0 | 0 | 0 | 0.1 | 0 | 0 | 0 | 0 | 0 | 0 | OK |
| 108 | Example | 0 | 0 | 0 | 0 | 0 | 0 | 0 | 0 | 0.1 | 0 | 0 | 0 | 0 | 0 | 0 | OK |
| 109 | Example | 0 | 0 | 0 | 0 | 0 | 0 | 0 | 0 | 0.1 | 0 | 0 | 0 | 0 | 0 | 0 | OK |
| 110 | Example | 0 | 0 | 0 | 0 | 0 | 0 | 0 | 0 | 0.1 | 0 | 0 | 0 | 0 | 0 | 0 | OK |
| 111 | Example | 0 | 0 | 0 | 0 | 0 | 0 | 0 | 0 | 0.1 | 0 | 0 | 0 | 0 | 0 | 0 | OK |
| 112 | Comparative Example | 0 | 0 | 0 | 0 | 0 | 0 | 0 | 0 | 0.1 | 0 | 0 | 0 | 0 | 0 | 0 | OK |
| 113 | Comparative Example | 0 | 0 | 0 | 0 | 0 | 0 | 0 | 0 | 0.1 | 0 | 0 | 0 | 0 | 0 | 0 | OK |
| 114 | Comparative Example | 0 | 0 | 0 | 0 | 0 | 0 | 0 | 0 | 0.1 | 0 | 0 | 0 | 0 | 0 | 0 | OK |
| 115 | Comparative Example | 0 | 0 | 0 | 0 | 0 | 0 | 0 | 0 | 0.1 | 0 | 0 | 0 | 0 | 0 | 0 | OK |
| 116 | Comparative Example | 0 | 0 | 0 | 0 | 0 | 0 | 0 | 0 | 0.1 | 0 | 0 | 0 | 0 | 0 | 0 | OK |
| 117 | Comparative Example | 0 | 0 | 0 | 0 | 0 | 0 | 0 | 0 | 0.1 | 0 | 0 | 0 | 0 | 0 | 0 | OK |
| 118 | Comparative Example | 0 | 0 | 0 | 0 | 0 | 0 | 0 | 0 | 0.1 | 0 | 0 | 0 | 0 | 0 | 0 | OK |
| 119 | Comparative Example | 0 | 0 | 0 | 0 | 0 | 0 | 0 | 0 | 0.1 | 0 | 0 | 0 | 0 | 0 | 0 | OK |
| 120 | Comparative Example | 0 | 0 | 0 | 0 | 0 | 0 | 0 | 0 | 0.1 | 0 | 0 | 0 | 0 | 0 | 0 | OK |
| 121 | Example | 0 | 0 | 0 | 0 | 0 | 0 | 0 | 0 | 0.1 | 0 | 0 | 0 | 0 | 0 | 0 | OK |
| 122 | Comparative Example | 0 | 0 | 0 | 0 | 0 | 0 | 0 | 0 | 0.1 | 0 | 0 | 0 | 0 | 0 | 0 | OK |
| 123 | Example | 0 | 0 | 0 | 0 | 0 | 0 | 0 | 0 | 0.1 | 0 | 0 | 0 | 0 | 0 | 0 | OK |
| 124 | Comparative Example | 0 | 0 | 0 | 0 | 0 | 0 | 0 | 0 | 0.1 | 0 | 0 | 0 | 0 | 0 | 0 | OK |
| 125 | Example | 0 | 0 | 0 | 0 | 0 | 0 | 0 | 0 | 0.1 | 0 | 0 | 0 | 0 | 0 | 0 | OK |
| 126 | Comparative Example | 0 | 0 | 0 | 0 | 0 | 0 | 0 | 0 | 0.1 | 0 | 0 | 0 | 0 | 0 | 0 | OK |
| 127 | Comparative Example | 0 | 0 | 0 | 0 | 0 | 0 | 0 | 0 | 0.1 | 0 | 0 | 0 | 0 | 0 | 0 | OK |
| 128 | Example | 0 | 0 | 0 | 0 | 0 | 0 | 0 | 0 | 0.1 | 0 | 0 | 0 | 0 | 0 | 0 | OK |
| 129 | Example | 0 | 0 | 0 | 0 | 0 | 0 | 0 | 0 | 0.1 | 0 | 0 | 0 | 0 | 0 | 0 | OK |
| 130 | Example | 0 | 0 | 0 | 0 | 0 | 0 | 0 | 0 | 0.1 | 0 | 0 | 0 | 0 | 0 | 0 | OK |
| 131 | Example | 0 | 0 | 0 | 0 | 0 | 0 | 0 | 0 | 0.1 | 0 | 0 | 0 | 0 | 0 | 0 | OK |
| 132 | Comparative Example | 0 | 0 | 0 | 0 | 0 | 0 | 0 | 0 | 0.1 | 0 | 0 | 0 | 0 | 0 | 0 | OK |
| 133 | Example | 0 | 0 | 0 | 0 | 0 | 0 | 0 | 0 | 0.1 | 0 | 0 | 0 | 0 | 0 | 0 | OK |
| 134 | Comparative Example | 0 | 0 | 0 | 0 | 0 | 0 | 0 | 0 | 0.1 | 0 | 0 | 0 | 0 | 0 | 0 | OK |
| 135 | Example | 0 | 0 | 0 | 0 | 0 | 0 | 0 | 0 | 0.1 | 0 | 0 | 0 | 0 | 0 | 0 | OK |
| 136 | Comparative Example | 0 | 0 | 0 | 0 | 0 | 0 | 0 | 0 | 0.1 | 0 | 0 | 0 | 0 | 0 | 0 | OK |
| 137 | Example | 0 | 0 | 0 | 0 | 0 | 0 | 0 | 0 | 0.1 | 0 | 0 | 0 | 0 | 0 | 0 | OK |
| 138 | Comparative Example | 0 | 0 | 0 | 0 | 0 | 0 | 0 | 0 | 0.1 | 0 | 0 | 0 | 0 | 0 | 0 | OK |
| 139 | Example | 0 | 0 | 0 | 0 | 0 | 0 | 0 | 0 | 0.1 | 0 | 0 | 0 | 0 | 0 | 0 | OK |
| 140 | Example | 0 | 0 | 0 | 0 | 0 | 0 | 0 | 0 | 0.1 | 0 | 0 | 0 | 0 | 0 | 0 | OK |
| 141 | Example | 0 | 0 | 0 | 0 | 0 | 0 | 0 | 0 | 0.1 | 0 | 0 | 0 | 0 | 0 | 0 | OK |
| 142 | Example | 0 | 0 | 0 | 0 | 0 | 0 | 0 | 0 | 0.1 | 0 | 0 | 0 | 0 | 0 | 0 | OK |
| 143 | Comparative Example | 0 | 0 | 0 | 0 | 0 | 0 | 0 | 0 | 0.1 | 0 | 0 | 0 | 0 | 0 | 0 | OK |
| 144 | Comparative Example | 0 | 0 | 0 | 0 | 0 | 0 | 0 | 0 | 0.1 | 0 | 0 | 0 | 0 | 0 | 0 | OK |

TABLE 2-3

| No. | Classification | Determination of Formulae 1 to 5 | | | | | | |
|---|---|---|---|---|---|---|---|---|
| | | Sn − (Bi + In) | Ca − (Y + La + Ce) | −0.25 + Cr + Ti + Ni + Co + V + Nb + Cu + Mn | −0.5 + Sr + Sb + Pb + B | Formula 5 Lower limit | Formula 5 Upper limit | Formula 5 Determination |
| 72 | Example | 0.2 | 0.45 | −0.25 | −0.5 | 5.7203 | 10.4263 | OK |
| 73 | Example | 0.2 | 0.5 | −0.25 | −0.5 | 5.7203 | 10.4263 | OK |
| 74 | Example | 0.2 | 0 | −0.25 | −0.5 | 5.7203 | 10.4263 | OK |
| 75 | Example | 0.25 | 0.05 | −0.25 | −0.5 | 5.9561 | 10.8221 | OK |
| 76 | Example | 0.25 | 0.07 | −0.25 | −0.5 | 5.9561 | 10.8221 | OK |
| 77 | Example | 0.25 | 0.13 | −0.25 | −0.5 | 5.9561 | 10.8221 | OK |
| 78 | Example | 0.25 | 0.2 | −0.25 | −0.5 | 5.9561 | 10.8221 | OK |
| 79 | Example | 0.25 | 0.3 | −0.25 | −0.5 | 5.9561 | 10.8221 | OK |
| 80 | Example | 0.25 | 0.45 | −0.25 | −0.5 | 5.9561 | 10.8221 | OK |
| 81 | Example | 0.25 | 0.5 | −0.25 | −0.5 | 5.9561 | 10.8221 | OK |
| 82 | Comparative Example | 1.5 | 0.5 | −0.15 | −0.1 | 5.4913 | 10.0181 | NG |
| 83 | Comparative Example | 2 | 0.5 | −0.15 | −0.5 | 6.1987 | 11.2055 | NG |

TABLE 2-3-continued

| | | | | | | | | |
|---|---|---|---|---|---|---|---|---|
| 84 | Example | 2 | 0.5 | −0.15 | −0.5 | 6.1987 | 11.2055 | OK |
| 85 | Example | 1 | 0.3 | −0.15 | −0.5 | 6.1987 | 11.2055 | OK |
| 86 | Example | 0.5 | 0.2 | −0.15 | −0.5 | 6.1987 | 11.2055 | OK |
| 87 | Example | 0.3 | 0.2 | −0.15 | −0.5 | 6.1987 | 11.2055 | OK |
| 88 | Example | 0.1 | 0.2 | −0.15 | −0.5 | 6.1987 | 11.2055 | OK |
| 89 | Example | 0.05 | 0.2 | −0.15 | −0.5 | 6.1987 | 11.2055 | OK |
| 90 | Example | 0.25 | 0.5 | −0.15 | −0.5 | 6.1987 | 11.2055 | OK |
| 91 | Example | 0.1 | 0.5 | −0.15 | −0.5 | 6.1987 | 11.2055 | OK |
| 92 | Example | 0.05 | 0.5 | −0.15 | −0.5 | 6.1987 | 11.2055 | OK |
| 93 | Comparative Example | 2 | 0.5 | −0.15 | −0.5 | 6.1987 | 11.2055 | NG |
| 94 | Example | 2 | 1 | −0.15 | −0.1 | 6.9673 | 12.2813 | OK |
| 95 | Example | 2 | 1 | −0.15 | −0.1 | 6.9673 | 12.2813 | OK |
| 96 | Comparative Example | 2 | 1 | −0.15 | −0.1 | 6.9673 | 12.2813 | NG |
| 97 | Comparative Example | 2 | 1.5 | −0.15 | −0.5 | 7.7971 | 13.2455 | NG |
| 98 | Example | 2 | 1.5 | −0.15 | −0.5 | 7.7971 | 13.2455 | OK |
| 99 | Example | 2 | 1.5 | −0.15 | −0.5 | 7.7971 | 13.2455 | OK |
| 100 | Comparative Example | 2 | 1.5 | −0.25 | 0 | 7.7971 | 13.2455 | OK |
| 101 | Comparative Example | 2 | 1.5 | −0.25 | 0.1 | 7.7971 | 13.2455 | OK |
| 102 | Comparative Example | 2 | 1.5 | −0.25 | 0.1 | 7.7971 | 13.2455 | OK |
| 103 | Comparative Example | 2 | 2 | −0.05 | −0.5 | 8.6881 | 14.0981 | NG |
| 104 | Example | 2 | 2 | −0.05 | −0.5 | 8.6881 | 14.0981 | OK |
| 105 | Example | 2 | 2 | −0.05 | −0.5 | 8.6881 | 14.0981 | OK |
| 106 | Comparative Example | 2 | 2 | 0.05 | −0.5 | 8.6881 | 14.0981 | OK |
| 107 | Comparative Example | 2 | 2.5 | −0.25 | −0.5 | 9.6403 | 14.8391 | NG |
| 108 | Example | 2 | 2.5 | −0.25 | −0.5 | 9.6403 | 14.8391 | OK |
| 109 | Example | 2 | 2.5 | −0.25 | −0.5 | 9.6403 | 14.8391 | OK |
| 110 | Example | 2 | 2.5 | −0.25 | −0.5 | 9.6403 | 14.8391 | OK |
| 111 | Example | 2 | 2.5 | −0.25 | −0.5 | 9.6403 | 14.8391 | OK |
| 112 | Comparative Example | 2 | 2.5 | −0.25 | −0.5 | 9.6403 | 14.8391 | OK |
| 113 | Comparative Example | 2 | 2.5 | −0.25 | −0.5 | 9.6403 | 14.8391 | OK |
| 114 | Comparative Example | 2 | 2.5 | −0.25 | −0.5 | 9.6403 | 14.8391 | OK |
| 115 | Comparative Example | 2 | 2.5 | −0.25 | −0.5 | 9.6403 | 14.8391 | OK |
| 116 | Comparative Example | 2 | 2.5 | −0.25 | −0.5 | 9.6403 | 14.8391 | NG |
| 117 | Comparative Example | 2 | 2.5 | −0.25 | −0.5 | 9.9713 | 15.0613 | NG |
| 118 | Comparative Example | 2 | 2.5 | −0.25 | −0.5 | 9.9713 | 15.0613 | OK |
| 119 | Comparative Example | 2 | 2.5 | −0.25 | −0.5 | 9.9713 | 15.0613 | OK |
| 120 | Comparative Example | 2 | 2.5 | −0.25 | −0.5 | 9.9713 | 15.0613 | OK |
| 121 | Example | 3 | 0.1 | −0.25 | −0.5 | 4.0787 | 6.8135 | OK |
| 122 | Comparative Example | 5 | 0.1 | −0.25 | −0.5 | 4.0787 | 6.8135 | OK |
| 123 | Example | 1.5 | 0.1 | −0.25 | −0.5 | 4.0787 | 6.8135 | OK |
| 124 | Comparative Example | 1 | 0.1 | −0.25 | −0.5 | 4.0787 | 6.8135 | OK |
| 125 | Example | 1.7 | 0.5 | −0.25 | −0.5 | 4.0787 | 6.8135 | OK |
| 126 | Comparative Example | 1.5 | 0.5 | −0.25 | −0.5 | 4.0787 | 6.8135 | OK |
| 127 | Comparative Example | −0.1 | 0.5 | −0.25 | −0.5 | 4.0787 | 6.8135 | OK |
| 128 | Example | 3 | 0.5 | −0.25 | −0.5 | 6.1987 | 11.2055 | OK |
| 129 | Example | 4 | 0.5 | −0.25 | −0.5 | 6.1987 | 11.2055 | OK |
| 130 | Example | 4.8 | 0.5 | −0.25 | −0.5 | 6.1987 | 11.2055 | OK |
| 131 | Example | 2 | 0.7 | −0.25 | −0.5 | 6.9673 | 12.2813 | OK |
| 132 | Comparative Example | 2 | 0.5 | −0.25 | −0.5 | 6.9673 | 12.2813 | OK |
| 133 | Example | 2 | 0.7 | −0.25 | −0.5 | 6.9673 | 12.2813 | OK |
| 134 | Comparative Example | 2 | 0.5 | −0.25 | −0.5 | 6.9673 | 12.2813 | OK |
| 135 | Example | 2 | 0.7 | −0.25 | −0.5 | 6.9673 | 12.2813 | OK |
| 136 | Comparative Example | 2 | 0.5 | −0.25 | −0.5 | 6.9673 | 12.2813 | OK |
| 137 | Example | 2 | 0.1 | −0.25 | −0.5 | 6.9673 | 12.2813 | OK |

TABLE 2-3-continued

| | | | | | | | | |
|---|---|---|---|---|---|---|---|---|
| 138 | Comparative Example | 2 | 0 | −0.25 | −0.5 | 6.9673 | 12.2813 | OK |
| 139 | Example | 2 | 1.5 | −0.25 | −0.5 | 7.7971 | 13.2455 | OK |
| 140 | Example | 2 | 1.5 | −0.25 | −0.5 | 7.7971 | 13.2455 | OK |
| 141 | Example | 2 | 1.5 | −0.25 | −0.5 | 7.7971 | 13.2455 | OK |
| 142 | Example | 4 | 2.5 | −0.25 | −0.5 | 9.6403 | 14.8391 | OK |
| 143 | Comparative Example | 5 | 2.5 | −0.25 | −0.5 | 9.6403 | 14.8391 | OK |
| 144 | Comparative Example | 4 | 3 | −0.25 | −0.5 | 9.6403 | 14.8391 | OK |

| No. | Area proportion % | | | Al phase circumferential length (mm/mm$^2$) | Frequency in number of Al phase (Number) |
|---|---|---|---|---|---|
| | Al + MgZn2 | Zn | others | | |
| 72 | 90 | 5 | 5 | 30 | G1 |
| 73 | 90 | 5 | 5 | 30 | G1 |
| 74 | 90 | 5 | 5 | 30 | G1 |
| 75 | 90 | 5 | 5 | 35 | G1 |
| 76 | 90 | 5 | 5 | 35 | G1 |
| 77 | 90 | 5 | 5 | 35 | G1 |
| 78 | 90 | 5 | 5 | 35 | G1 |
| 79 | 90 | 5 | 5 | 35 | G1 |
| 80 | 90 | 5 | 5 | 35 | G1 |
| 81 | 90 | 5 | 5 | 35 | G1 |
| 82 | 95 | 0 | 5 | 90 | NG |
| 83 | 85 | 15 | 0 | 140 | NG |
| 84 | 90 | 10 | 0 | 50 | G1 |
| 85 | 90 | 10 | 0 | 50 | G1 |
| 86 | 90 | 10 | 0 | 50 | G1 |
| 87 | 90 | 10 | 0 | 50 | G1 |
| 88 | 90 | 10 | 0 | 50 | G1 |
| 89 | 90 | 10 | 0 | 50 | G1 |
| 90 | 90 | 10 | 0 | 50 | G1 |
| 91 | 90 | 10 | 0 | 50 | G1 |
| 92 | 90 | 10 | 0 | 50 | G1 |
| 93 | 95 | 5 | 0 | 120 | NG |
| 94 | 85 | 15 | 0 | 85 | G1 |
| 95 | 90 | 10 | 0 | 75 | G1 |
| 96 | 95 | 5 | 0 | 110 | NG |
| 97 | 90 | 10 | 0 | 120 | NG |
| 98 | 95 | 5 | 0 | 80 | G2 |
| 99 | 100 | 0 | 0 | 85 | G2 |
| 100 | 90 | 10 | 0 | 110 | NG |
| 101 | 95 | 5 | 0 | 115 | NG |
| 102 | 100 | 0 | 0 | 110 | NG |
| 103 | 90 | 10 | 0 | 155 | NG |
| 104 | 95 | 5 | 0 | 70 | G1 |
| 105 | 100 | 0 | 0 | 80 | G2 |
| 106 | 100 | 0 | 0 | 100 | NG |
| 107 | 85 | 10 | 5 | 150 | NG |
| 108 | 90 | 5 | 5 | 85 | G1 |
| 109 | 90 | 5 | 5 | 85 | G1 |
| 110 | 90 | 5 | 5 | 85 | G2 |
| 111 | 90 | 5 | 5 | 85 | G3 |
| 112 | 90 | 5 | 5 | 90 | NG |
| 113 | 90 | 5 | 5 | 35 | NG |
| 114 | 90 | 5 | 5 | 40 | NG |
| 115 | 95 | 0 | 5 | 85 | G2 |
| 116 | 95 | 0 | 5 | 110 | NG |
| 117 | 100 | 0 | 0 | 120 | NG |
| 118 | 100 | 0 | 0 | 130 | NG |
| 119 | 100 | 0 | 0 | 130 | NG |
| 120 | 100 | 0 | 0 | 85 | NG |
| 121 | 80 | 20 | 0 | 55 | G3 |
| 122 | 75 | 20 | 5 | 100 | NG |
| 123 | 80 | 20 | 0 | 65 | G1 |
| 124 | 75 | 20 | 5 | 95 | NG |
| 125 | 80 | 20 | 0 | 55 | G2 |
| 126 | 75 | 20 | 5 | 115 | NG |
| 127 | 80 | 20 | 0 | 125 | NG |
| 128 | 90 | 10 | 0 | 60 | G3 |
| 129 | 90 | 10 | 0 | 60 | G3 |
| 130 | 90 | 10 | 0 | 65 | G2 |
| 131 | 85 | 15 | 0 | 80 | G2 |
| 132 | 80 | 15 | 5 | 80 | NG |
| 133 | 85 | 15 | 0 | 75 | G2 |
| 134 | 85 | 15 | 0 | 85 | NG |

TABLE 2-3-continued

| | | | | | |
|---|---|---|---|---|---|
| 135 | 85 | 15 | 0 | 80 | G1 |
| 136 | 85 | 15 | 0 | 75 | NG |
| 137 | 85 | 15 | 0 | 80 | G1 |
| 138 | 80 | 15 | 5 | 120 | NG |
| 139 | 95 | 5 | 0 | 80 | G1 |
| 140 | 95 | 5 | 0 | 80 | G1 |
| 141 | 95 | 5 | 0 | 80 | G1 |
| 142 | 95 | 0 | 5 | 85 | G1 |
| 143 | 95 | 0 | 5 | 85 | NG |
| 144 | 95 | 0 | 5 | 85 | NG |

TABLE 2-4

| No. | Classification | Formula 6 Lsurface/Lboard | Formula 6 determination | Formula 7 Lmedium/Lboard | Formula 7 determination | Mg ≥ 5.0 | Formula 8 0.01 ≤ Sn < 0.25 |
|---|---|---|---|---|---|---|---|
| 72 | Example | 1.04 | OK | 1.03 | OK | OK | OK |
| 73 | Example | 1.04 | OK | 1.02 | OK | OK | OK |
| 74 | Example | 2.04 | OK | 2.02 | NG | OK | OK |
| 75 | Example | 1 | OK | 1 | OK | OK | NG |
| 76 | Example | 1.03 | OK | 1.02 | OK | OK | NG |
| 77 | Example | 0.99 | OK | 1 | OK | OK | NG |
| 78 | Example | 0.98 | OK | 0.99 | OK | OK | NG |
| 79 | Example | 1 | OK | 1.03 | OK | OK | NG |
| 80 | Example | 1.02 | OK | 1.03 | OK | OK | NG |
| 81 | Example | 1.03 | OK | 1.04 | OK | OK | NG |
| 82 | Comparative Example | 0.99 | OK | 1.18 | NG | OK | NG |
| 83 | Comparative Example | 1.22 | OK | 1.13 | NG | OK | NG |
| 84 | Example | 1.03 | OK | 1.05 | OK | OK | NG |
| 85 | Example | 1.05 | OK | 1.09 | OK | OK | NG |
| 86 | Example | 1.02 | OK | 1.07 | OK | OK | NG |
| 87 | Example | 1.03 | OK | 1.02 | OK | OK | NG |
| 88 | Example | 1.04 | OK | 1.05 | OK | OK | OK |
| 89 | Example | 1.06 | OK | 1.03 | OK | OK | OK |
| 90 | Example | 1.03 | OK | 1.05 | OK | OK | NG |
| 91 | Example | 1.03 | OK | 1.05 | OK | OK | OK |
| 92 | Example | 1.03 | OK | 1.05 | OK | OK | OK |
| 93 | Comparative Example | 1.21 | OK | 1.11 | NG | OK | NG |
| 94 | Example | 1.02 | OK | 1.02 | OK | OK | NG |
| 95 | Example | 0.95 | OK | 0.98 | OK | OK | NG |
| 96 | Comparative Example | 1.21 | OK | 1.13 | NG | OK | NG |
| 97 | Comparative Example | 1.13 | OK | 1.15 | NG | OK | NG |
| 98 | Example | 1.03 | OK | 1.08 | OK | OK | NG |
| 99 | Example | 1.09 | OK | 1.05 | OK | OK | NG |
| 100 | Comparative Example | 1.22 | OK | 1.23 | NG | OK | NG |
| 101 | Comparative Example | 0.88 | NG | 1.42 | NG | OK | NG |
| 102 | Comparative Example | 1.18 | OK | 0.77 | OK | OK | NG |
| 103 | Comparative Example | 1.25 | OK | 1.36 | NG | OK | NG |
| 104 | Example | 1.02 | OK | 1.03 | OK | OK | NG |
| 105 | Example | 1.09 | OK | 1.07 | OK | OK | NG |
| 106 | Comparative Example | 0.87 | NG | 1.23 | NG | OK | NG |
| 107 | Comparative Example | 1.15 | OK | 1.23 | NG | OK | NG |
| 108 | Example | 1.03 | OK | 1.02 | OK | OK | NG |
| 109 | Example | 1 | OK | 1.02 | OK | OK | NG |
| 110 | Example | 1.09 | OK | 1.11 | NG | OK | NG |
| 111 | Example | 0.88 | NG | 0.91 | OK | OK | NG |
| 112 | Comparative Example | 0.75 | NG | 0.66 | OK | OK | NG |
| 113 | Comparative Example | 0.9 | OK | 0.88 | OK | OK | NG |
| 114 | Comparative Example | 0.75 | NG | 1.12 | NG | OK | NG |

TABLE 2-4-continued

| No. | | | | | | | |
|---|---|---|---|---|---|---|---|
| 115 | Comparative Example | 1.03 | OK | 1.08 | OK | OK | NG |
| 116 | Comparative Example | 1.23 | OK | 1.35 | NG | OK | NG |
| 117 | Comparative Example | 1.11 | OK | 1.45 | NG | OK | NG |
| 118 | Comparative Example | 1.18 | OK | 1.15 | NG | OK | NG |
| 119 | Comparative Example | 1.35 | OK | 1.15 | NG | OK | NG |
| 120 | Comparative Example | 1.13 | OK | 1.11 | NG | OK | NG |
| 121 | Example | 1.23 | OK | 1.19 | NG | OK | NG |
| 122 | Comparative Example | 1.18 | OK | 1.12 | NG | OK | NG |
| 123 | Example | 0.98 | OK | 1.04 | OK | OK | NG |
| 124 | Comparative Example | 1.25 | OK | 0.75 | OK | OK | NG |
| 125 | Example | 0.91 | OK | 0.94 | OK | OK | NG |
| 126 | Comparative Example | 1.31 | OK | 0.88 | OK | OK | NG |
| 127 | Comparative Example | 1.21 | OK | 1.1 | OK | OK | NG |
| 128 | Example | 1.26 | OK | 1.22 | NG | OK | NG |
| 129 | Example | 1.3 | OK | 1.35 | NG | OK | NG |
| 130 | Example | 0.92 | OK | 0.95 | OK | OK | NG |
| 131 | Example | 0.93 | OK | 0.99 | OK | OK | NG |
| 132 | Comparative Example | 0.99 | OK | 1.32 | NG | OK | NG |
| 133 | Example | 0.96 | OK | 1.07 | OK | OK | NG |
| 134 | Comparative Example | 1.11 | OK | 1.01 | OK | OK | NG |
| 135 | Example | 1.05 | OK | 1.01 | OK | OK | NG |
| 136 | Comparative Example | 1.09 | OK | 1.22 | NG | OK | NG |
| 137 | Example | 1.03 | OK | 0.97 | OK | OK | NG |
| 138 | Comparative Example | 1.2 | OK | 1.3 | NG | OK | NG |
| 139 | Example | 1.02 | OK | 0.98 | OK | OK | NG |
| 140 | Example | 0.97 | OK | 0.99 | OK | OK | NG |
| 141 | Example | 0.99 | OK | 1.02 | OK | OK | NG |
| 142 | Example | 0.96 | OK | 1.05 | OK | OK | NG |
| 143 | Comparative Example | 1.03 | OK | 1.85 | NG | OK | NG |
| 144 | Comparative Example | 1.22 | OK | 1.03 | OK | OK | NG |

| No. | Formula 9 $0.05 < Ca < 0.5$ | Formulae 10 and 11 $Sn + 0.02 \leq Ca$ or $Sn < Ca$ | Presence of spangle | Investigation of 100 × 100 grid | Investigation of appearance | Corrosion resistance balance |
|---|---|---|---|---|---|---|
| 72 | OK | OK | OK | G1 | A | A |
| 73 | NG | OK | OK | G1 | B | B |
| 74 | NG | NG | OK | G1 | B | B |
| 75 | NG | NG | OK | G1 | B | B |
| 76 | OK | NG | OK | G1 | B | B |
| 77 | OK | NG | OK | G1 | B | B |
| 78 | OK | NG | OK | G1 | B | B |
| 79 | OK | NG | OK | G1 | B | B |
| 80 | OK | NG | OK | G1 | B | B |
| 81 | NG | NG | OK | G1 | B | B |
| 82 | NG | NG | OK | B | B | B |
| 83 | NG | NG | OK | B | B | B |
| 84 | NG | NG | OK | G1 | B | B |
| 85 | OK | NG | OK | G1 | B | B |
| 86 | OK | NG | OK | G1 | B | B |
| 87 | OK | NG | OK | G1 | B | B |
| 88 | OK | OK | OK | G1 | A++ | A++ |
| 89 | OK | OK | OK | G1 | A++ | A++ |
| 90 | NG | NG | OK | G1 | B | B |
| 91 | NG | OK | OK | G1 | B | B |
| 92 | NG | OK | OK | G1 | B | B |
| 93 | NG | NG | OK | B | B | B |
| 94 | NG | NG | OK | G1 | B | B |
| 95 | NG | NG | OK | G1 | B | B |
| 96 | NG | NG | OK | B | B | B |
| 97 | NG | NG | OK | B | B | B |
| 98 | NG | NG | OK | G2 | B | B |

TABLE 2-4-continued

| | | | | | | |
|---|---|---|---|---|---|---|
| 99 | NG | NG | OK | G2 | B | B |
| 100 | NG | NG | NG | B | B | B |
| 101 | NG | NG | NG | B | B | B |
| 102 | NG | NG | NG | B | B | B |
| 103 | NG | NG | OK | B | B | B |
| 104 | NG | NG | OK | G1 | B | B |
| 105 | NG | NG | OK | G2 | B | B |
| 106 | NG | NG | NG | B | B | B |
| 107 | NG | NG | OK | B | B | B |
| 108 | NG | NG | OK | G1 | B | B |
| 109 | NG | NG | OK | G1 | B | B |
| 110 | NG | NG | OK | G2 | B | B |
| 111 | NG | NG | OK | G3 | B | B |
| 112 | NG | NG | NG | B | B | B |
| 113 | NG | NG | NG | B | B | B |
| 114 | NG | NG | NG | B | B | B |
| 115 | NG | NG | NG | B | B | B |
| 116 | NG | NG | NG | B | B | B |
| 117 | NG | NG | NG | B | B | B |
| 118 | NG | NG | NG | B | B | B |
| 119 | NG | NG | NG | B | B | B |
| 120 | NG | NG | NG | B | B | B |
| 121 | OK | NG | OK | G3 | B | B |
| 122 | OK | NG | NG | B | B | B |
| 123 | OK | NG | OK | G1 | B | B |
| 124 | OK | NG | NG | B | B | B |
| 125 | NG | NG | OK | G2 | B | B |
| 126 | NG | NG | NG | B | B | B |
| 127 | NG | NG | NG | B | B | B |
| 128 | NG | NG | OK | G3 | B | B |
| 129 | NG | NG | OK | G3 | B | B |
| 130 | NG | NG | OK | G2 | B | B |
| 131 | NG | NG | OK | G2 | B | B |
| 132 | NG | NG | NG | B | B | B |
| 133 | NG | NG | OK | G2 | B | B |
| 134 | NG | NG | NG | B | B | B |
| 135 | NG | NG | OK | G1 | B | B |
| 136 | NG | NG | NG | B | B | B |
| 137 | NG | NG | OK | G1 | B | B |
| 138 | NG | NG | NG | B | B | B |
| 139 | NG | NG | OK | G1 | B | B |
| 140 | NG | NG | OK | G1 | B | B |
| 141 | NG | NG | OK | G1 | B | B |
| 142 | NG | NG | OK | G1 | B | B |
| 143 | NG | NG | NG | B | B | B |
| 144 | NG | NG | NG | B | B | B |

The above results show that even when the coated steel products in the Examples corresponding to the coated steel product of the disclosure have a coating layer which is a multi-element type containing at least Zn, Al, and Mg and has an Al amount of less than 35.0% by mass, spangles are formed and appearance defects are effectively concealed by the spangles, as compared with the Comparative Examples.

Preferred embodiments of the disclosure have been described in detail above with reference to the attached drawings, but the disclosure is not limited to such embodiments. It is obvious that various changes or modifications can be reached by those having common knowledge in the technical field to which the disclosure pertains within the scope of the technical idea described in the claims, and it is understood that these are naturally within the technical scope of the disclosure.

The entire contents of the disclosures by Japanese Patent Application No. 2019-119451 are incorporated herein by reference.

All the literature, patent application, and technical standards cited herein are incorporated to the same extent as provided for specifically and severally with respect to an individual literature, patent application, and technical standard to the effect that the same should be so incorporated by reference.

The invention claimed is:

1. A coated steel product comprising: a steel product; and a coating layer including a Zn—Al—Mg alloy layer disposed on a surface of the steel product,
wherein the Zn—Al—Mg alloy layer includes a Zn phase, an Al phase, and a $MgZn_2$ phase, and contains a Mg—Sn intermetallic compound phase in the Zn phase, and
the coating layer consists of, in terms of an average composition and % by mass:
Zn: 45.00% or more;
Al: more than 5.0% and less than 35.0%;
Mg: more than 3.0% and less than 15.0%;
Sn: from 0.01% to less than 5.00%;
Bi: from 0% to less than 1.0%;
In: from 0% to less than 0.5%;
Ca: from 0% to less than 3.00%;
Y: from 0% to less than 0.5%;
La: from 0% to less than 0.5%;
Ce: from 0% to less than 0.5%;
Si: from 0% to less than 2.5%;
Cr: from 0% to less than 0.25%;
Ti: from 0% to less than 0.25%;
Ni: from 0% to less than 0.25%;
Co: from 0% to less than 0.25%;
V: from 0% to less than 0.25%;

Nb: from 0% to less than 0.25%;
Cu: from 0% to less than 0.25%;
Mn: from 0% to less than 0.25%;
Fe: from 0% to 5.0%;
Sr: from 0% to less than 0.5%;
Sb: from 0% to less than 0.5%;
Pb: from 0% to less than 0.5%;
B: from 0% to less than 0.5%; and
impurities, and
wherein the coating layer has a chemical composition that satisfies the following Formulae 1 to 5:

$$Bi+In<Sn; \quad \text{Formula 1:}$$

$$Y+La+Ce<Ca; \quad \text{Formula 2:}$$

$$0 \leq Cr+Ti+Ni+Co+V+Nb+Cu+Mn<0.25; \quad \text{Formula 3:}$$

$$0 \leq Sr+Sb+Pb+B<0.5; \text{ and} \quad \text{Formula 4:}$$

$$0.0034\times(Al)^2+0.0964\times(Al)+2.4323 \leq (Mg) \leq -0.0062\times(Al)^2+0.65\times(Al)-0.0937, \quad \text{Formula 5:}$$

wherein, in Formulae 1 to 5, each element symbol represents a content of each element in terms of % by mass, wherein, in a backscattered electron image of the Zn—Al—Mg alloy layer obtained in a case in which a field of view of 1000 μm×700 μm is observed with a scanning electron microscope at a magnification of 500 times after a surface of the Zn—Al—Mg alloy layer is polished to an extent of one-half of a layer thickness, a total area proportion of the Al phase and the MgZn$_2$ phase is 70% or more, and an area proportion of the Zn phase is 30% or less, and wherein, in a backscattered electron image of the Zn—Al—Mg alloy layer obtained in a case in which a field of view of 1000 μm×700 μm is observed with a scanning electron microscope at a magnification of 500 times after a surface of the Zn—Al—Mg alloy layer is polished to an extent of one-half of a layer thickness, an average value of cumulative circumferential lengths of the Al phase is less than 88 mm/mm$^2$ and a total frequency in number of the Al phase having a circumferential length of 50 μm or more is less than 100.

2. The coated steel product according to claim 1,
wherein, in a backscattered electron image of the coating layer obtained by observing a cross-section of the coating layer, the cross-section being cut in a thickness direction, at a field of view of 250 μm×700 μm and a magnification of 500 times with a scanning electron microscope, a proportion of lengths occupied by the Al phase and the MgZn$_2$ phase at a surface side of the Zn—Al—Mg alloy layer ($L_{surface}$), a proportion of lengths occupied by the Al phase and the MgZn$_2$ phase at a thickness center of the Zn—Al—Mg alloy layer ($L_{medium}$), and a proportion of lengths occupied by the Al phase and the MgZn$_2$ phase at a steel product side of the Zn—Al—Mg alloy layer ($L_{/boarder}$) satisfy the following Formulae 6 and 7:

$$0.90 \leq (L_{surface})/(L_{boarder}); \text{ and} \quad \text{Formula 6:}$$

$$(L_{medium})/(L_{boarder}) \leq 1.10. \quad \text{Formula 7:}$$

3. The coated steel product according to claim 2, wherein the coating layer has an average composition and a Mg concentration of 5.0% or more in terms of % by mass, and satisfies the following Formulae 8 to 11:

$$0.01 \leq Sn<0.25; \quad \text{Formula 8:}$$

$$0.05<Ca<0.5; \quad \text{Formula 9:}$$

$$Sn+0.02 \leq Ca \text{ in a case in which } 0.01 \leq Sn \leq 0.05; \text{ and} \quad \text{Formula 10:}$$

$$Sn<Ca \text{ in a case in which } 0.05<Sn<0.25; \quad \text{Formula 11:}$$

wherein, in Formulae 8 to 11, each element symbol represents a content of each element in terms of % by mass.

4. The coated steel product according to claim 1, wherein the coating layer has an average composition and a Mg concentration of 5.0% or more in terms of % by mass, and satisfies the following Formulae 8 to 11:

$$0.01 \leq Sn<0.25; \quad \text{Formula 8:}$$

$$0.05<Ca<0.5; \quad \text{Formula 9:}$$

$$Sn+0.02 \leq Ca \text{ in a case in which } 0.01 \leq Sn \leq 0.05; \text{ and} \quad \text{Formula 10:}$$

$$Sn<Ca \text{ in a case in which } 0.05<Sn<0.25; \quad \text{Formula 11:}$$

wherein, in Formulae 8 to 11, each element symbol represents a content of each element in terms of % by mass.

* * * * *